(12) United States Patent
Como et al.

(10) Patent No.: US 12,020,056 B2
(45) Date of Patent: Jun. 25, 2024

(54) INDUSTRIAL AUTOMATION CONTROL PROJECT CONVERSION

(71) Applicant: Rockwell Automation Technologies, Inc., Mayfield Heights, OH (US)

(72) Inventors: Christopher Wayne Como, Mayfield Heights, OH (US); John E Belcher, Mayfield Heights, OH (US); Ryan P Dunn, Mayfield Heights, OH (US); Nathaniel S Sandler, Mayfield Heights, OH (US); Scott A. Miller, Mayfield Heights, OH (US); Bruce T. McCleave, Jr., Mayfield Heights, OH (US); Nathan Reynolds, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 361 days.

(21) Appl. No.: 17/374,162

(22) Filed: Jul. 13, 2021

(65) Prior Publication Data

US 2023/0012832 A1   Jan. 19, 2023

(51) Int. Cl.
*G06F 3/00* (2006.01)
*G06F 9/455* (2018.01)
*G05B 19/418* (2006.01)

(52) U.S. Cl.
CPC .... *G06F 9/45558* (2013.01); *G05B 19/41835* (2013.01); *G06F 2009/4557* (2013.01)

(58) Field of Classification Search
CPC ..................................................... G06F 9/455
(Continued)

(56) References Cited

U.S. PATENT DOCUMENTS 8,763,091 B1 *   6/2014   Singh .................... H04L 63/083
                                                          726/4
8,990,804 B1 *   3/2015   Lissack ............... G06F 9/45533
                                                          718/1
(Continued)

FOREIGN PATENT DOCUMENTS

CA            2796554 A1 * 10/2011  ............. G06F 16/22
CN        103514023 A   *  1/2014
(Continued)

OTHER PUBLICATIONS

Xun Zhao, Liquid: A Scalable Deduplication File System for Virtual Machine Images. (Year: 2014).*
(Continued)

*Primary Examiner* — Lechi Truong
(74) *Attorney, Agent, or Firm* — Amin, Turocy & Watson, LLP

(57) ABSTRACT

An industrial development hub (IDH) supports industrial development and testing capabilities that are offered as a cloud-based service. The IDH comprises an enhanced storage platform and associated design tools that serve as a repository on which customers can store control project code, device configurations, and other digital aspects of an industrial automation project. The IDH system can facilitate discovery and management of digital content associated with control systems, and can be used for system backup and restore, code conversion, and version management. The IDH also supports storage and instantiation of virtual machine images preconfigured with digital engineering applications or project conversion that can be instantiated and executed remotely as part of a digital engineering services framework.

20 Claims, 39 Drawing Sheets

(58) Field of Classification Search
USPC .......................................................... 718/1
See application file for complete search history.

(56) References Cited

U.S. PATENT DOCUMENTS

| | | | |
|---|---|---|---|
| 9,148,408 | B1 | 9/2015 | Glazemakers et al. |
| 9,471,352 | B1* | 10/2016 | Mauer ................. G06F 9/45558 |
| 9,766,912 | B1* | 9/2017 | Jorgensen ............. G06F 9/4856 |
| 9,858,105 | B1* | 1/2018 | Upadhyay ........... G06F 9/45558 |
| 9,996,381 | B1 | 6/2018 | Raju et al. |
| 10,317,868 | B2 | 6/2019 | Schroeter et al. |
| 10,965,737 | B1* | 3/2021 | Parulkar ............... H04L 67/141 |
| 2007/0142926 | A1 | 6/2007 | Hopsecger |
| 2011/0046754 | A1 | 2/2011 | Bromley et al. |
| 2012/0226786 | A1* | 9/2012 | Nekkar .............. G05B 19/0426 709/220 |
| 2013/0133043 | A1 | 5/2013 | Barkie et al. |
| 2013/0227089 | A1* | 8/2013 | McLeod ............. G06F 9/45558 709/220 |
| 2014/0280433 | A1* | 9/2014 | Messerli ................. H04L 67/10 709/201 |
| 2015/0058467 | A1 | 2/2015 | Douglas et al. |
| 2016/0179993 | A1 | 6/2016 | Maturana et al. |
| 2016/0234186 | A1 | 8/2016 | Leblond et al. |
| 2016/0274553 | A1 | 9/2016 | Strohmenger et al. |
| 2016/0274930 | A1* | 9/2016 | Mani .................... G05B 19/042 |
| 2017/0076235 | A1* | 3/2017 | Noto .................... G06F 9/4843 |
| 2017/0192414 | A1 | 7/2017 | Mukkamala et al. |
| 2018/0262388 | A1 | 9/2018 | Johnson et al. |
| 2018/0316729 | A1 | 11/2018 | Chauvet et al. |
| 2019/0041830 | A1 | 2/2019 | Yarvis et al. |
| 2019/0182106 | A1 | 6/2019 | Gibson et al. |
| 2019/0245856 | A1 | 8/2019 | Irwan et al. |
| 2019/0266497 | A1* | 8/2019 | Yuan ........................ G06N 7/01 |
| 2019/0317481 | A1 | 10/2019 | Glas et al. |
| 2019/0340269 | A1* | 11/2019 | Biernat ..................... H04L 9/50 |
| 2020/0057664 | A1* | 2/2020 | Durham .................. G06F 21/53 |
| 2020/0125352 | A1 | 4/2020 | Kannan et al. |
| 2020/0310849 | A1 | 10/2020 | Laurence et al. |
| 2020/0389437 | A1 | 12/2020 | Miller et al. |
| 2021/0058473 | A1* | 2/2021 | Yerli ................... H04L 41/0816 |
| 2021/0138651 | A1 | 5/2021 | Mcgregor et al. |
| 2021/0377018 | A1 | 12/2021 | Lawrence et al. |

FOREIGN PATENT DOCUMENTS

| | | |
|---|---|---|
| EP | 2 846 208 A2 | 3/2015 |
| EP | 3 121 667 A1 | 1/2017 |
| WO | 2011/128596 A1 | 10/2011 |
| WO | 2020/198539 A1 | 10/2020 |

OTHER PUBLICATIONS

Anjali Pandey, An Approach for Virtual Machine Image Security . (Year: 2014).*
Notice of Allowance received for U.S. Appl. No. 17/376,909 dated Feb. 1, 2023, 39 pages.
Extended European Search Report received for European Patent Application Serial No. 22184683.5 dated Nov. 30, 2022, 9 pages.
Extended European Search Report received for European Patent Application Serial No. 22184689.2 dated Dec. 1, 2022, 8 pages.
Extended European Search Report received for European Patent Application Serial No. 22185306.2 dated Nov. 24, 2022, 7 pages.
Communication pursuant to Rule 69 EPC received for European Patent Application Serial No. 22184689.2 dated Jan. 23, 2023, 2 pages.
Communication pursuant to Rule 69 EPC received for European Patent Application Serial No. 22184683.5 dated Jan. 23, 2023, 2 pages.
Communication pursuant to Rule 69 EPC received for European Patent Application Serial No. 22184684.3 dated Jan. 23, 2023, 2 pages.
Extended European Search Report received for European Patent Application Serial No. 22184684.3 dated Dec. 9, 2022, 8 pages.
Communication pursuant to Rule 69 EPC received for European Patent Application Serial No. 22185306.2 dated Jan. 23, 2023, 2 pages.
Communication Pursuant to Article 94(3) EPC received for EP Patent Application Serial No. 22184684.3 dated Oct. 16, 2023, 4 pages.
Notice of Allowance received for U.S. Appl. No. 17/374,122 dated Jan. 31, 2024, 141 pages.
Non Final Office Action received for U.S. Appl. No. 17/374,193 dated Jan. 30, 2024, 51 pages.

* cited by examiner

INDUSTRIAL ASSET

INDUSTRIAL AUTOMATION CONTROL PROJECT CONVERSION

BACKGROUND

The subject matter disclosed herein relates generally to industrial automation systems, and, for example, to industrial information services.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for provisioning industrial project conversion services is provided, comprising an image registry configured to store, on a cloud platform, virtual machine images that are configured with respective project conversion services; and a provisioning component configured to instantiate a virtual machine image, selected from the multiple virtual machine images, on which a project conversion service is installed to yield a virtual machine that executes the project conversion service on the cloud platform, wherein the project conversion service is configured to perform a conversion of an industrial control project from a first version to a second version.

Also, one or more embodiments provide a method, comprising storing, by a system comprising a processor, virtual machine images on a cloud platform, wherein the virtual machine images are configured with respective project conversion services; instantiating, by the system, a virtual machine image, selected from the multiple virtual machine images, on which a project conversion service is installed to yield a virtual machine that executes the project conversion service on the cloud platform; and converting, by the system using the project conversion service, an industrial control project from a first version to a second version.

Also, according to one or more embodiments, a non-transitory computer-readable medium is provided having stored thereon instructions that, in response to execution, cause a system executing on a cloud platform and comprising a processor to perform operations, the operations comprising storing virtual machine images on a cloud platform, wherein the virtual machine images have respective project conversion services pre-installed thereon; instantiating, on the cloud platform, a virtual machine image, selected from the multiple virtual machine images, on which a project conversion service is installed, yielding a virtual machine that executes the project conversion service on the cloud platform; and converting, using the project conversion service, an industrial control project from a first version to a second version.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
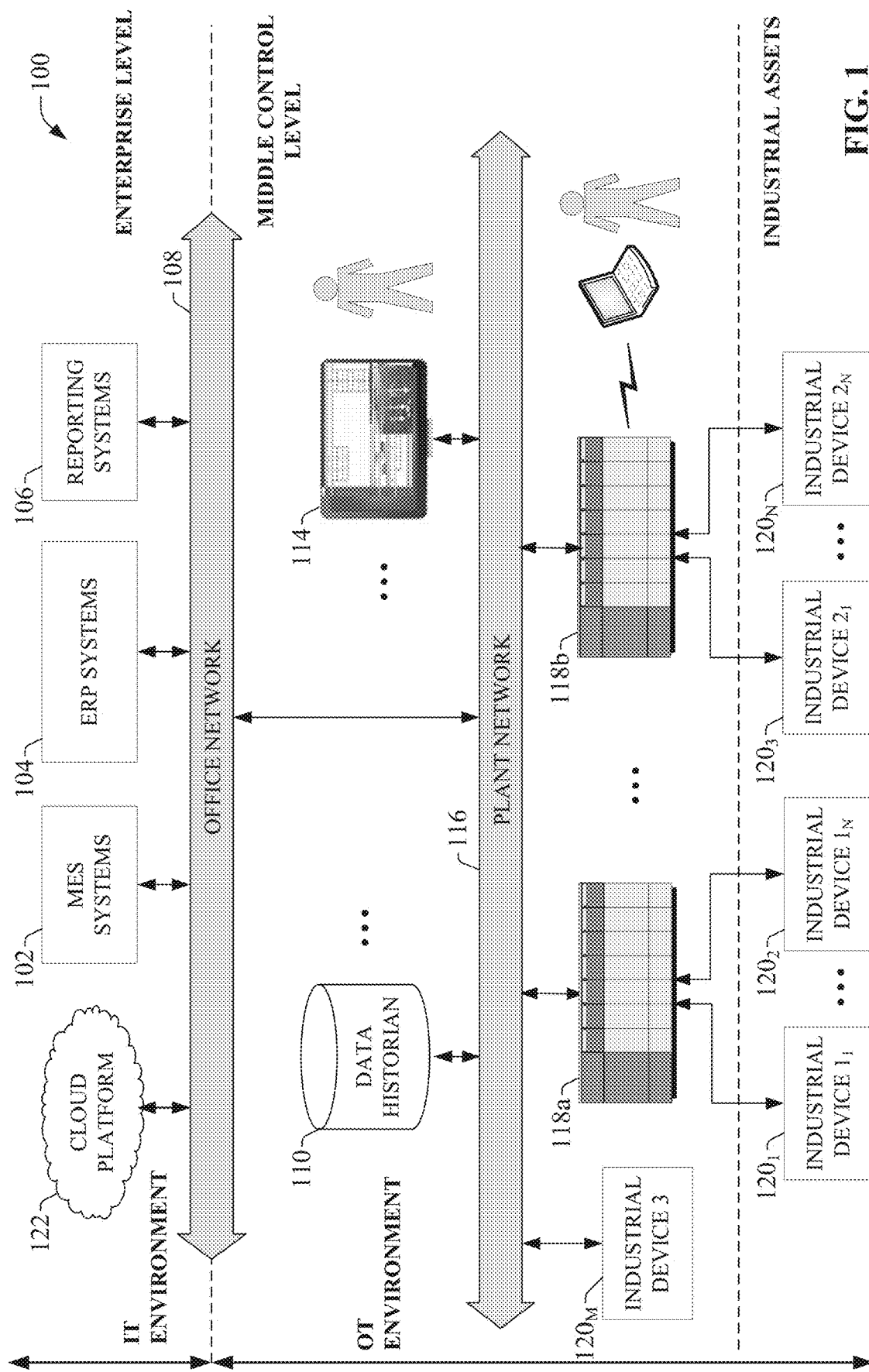
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer, on a server blade, or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, structured text, C++, Python, Javascript, etc.

Industrial devices 120 may include input devices that provide data relating to the controlled industrial systems to the industrial controllers 118, output devices that respond to control signals generated by the industrial controllers 118 to control aspects of the industrial systems, or devices that act as both input and output devices. Example input devices can include telemetry devices (e.g., temperature sensors, flow meters, level sensors, pressure sensors, etc), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired connections or over wired or wireless networks. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, EtherNet/IP, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

OT level systems can be disparate and complex, and may integrate with many physical devices. This challenging environment, together with domain-specific programming and development languages, can make development of control systems on the OT level difficult, resulting in long development cycles in which new control system designs are developed, tested, and finally deployed. Moreover, given the general lack of current virtualization and simulation capabilities, industrial automation systems must be purchased, programmed, and installed in the physical operating environment before realistic testing or optimization can begin. This workflow often results in project delays or cost overruns. Moreover, the inherent complexity and custom nature of installed industrial monitoring and control systems can make it difficult for owners of industrial assets—e.g., plant owners or industrial enterprise entities—to manage their OT-level systems and to protect their proprietary intellectual property from catastrophic failures or cyber-attacks.

To address these and other issues, one or more embodiments described herein provide a cloud-based Industrial Development Hub (IDH) that supports development and testing capabilities for industrial customers that are easy to use and offered as a service. The IDH comprises an enhanced storage platform and associated design tools—collectively referred to as the Vault—which serves as a repository on which customers can store control project code, device configurations, and other digital aspects of an industrial automation project. The IDH system can facilitate easy discovery and management of digital content associated with control systems, and can be used for system backup and restore, code conversion, and version management.

Figure 2:
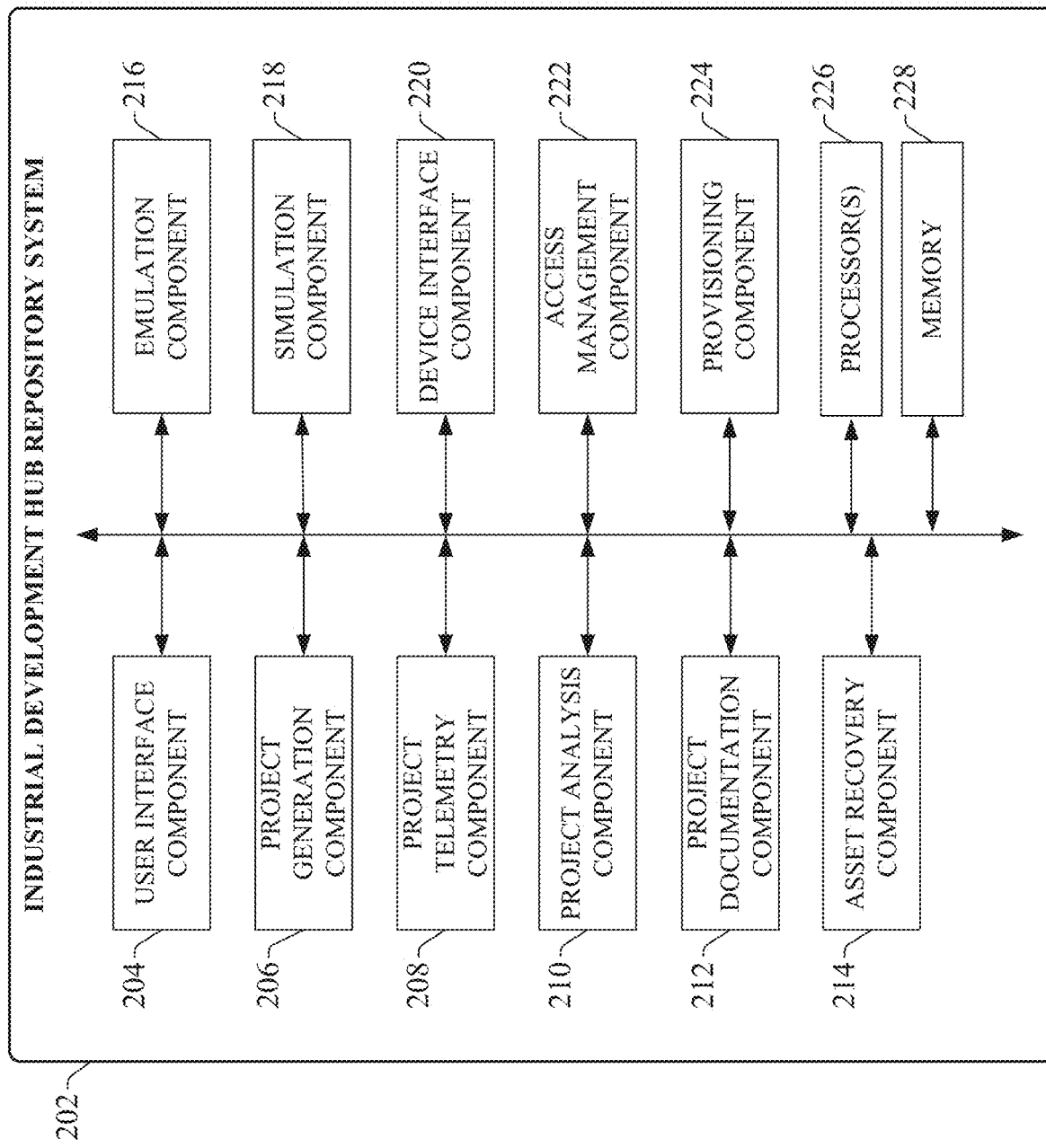
FIG. 2 is a block diagram of an example industrial development hub (IDH) repository system.

FIG. 2 is a block diagram of an example industrial development hub (IDH) repository system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDH repository system 202 can include a user interface component 204, a project generation component 206, a project telemetry component 208, a project analysis component 210, a project documentation component 212, an asset recovery component 214, an emulation component 216, a simulation component 218, a device interface component 220, an access management component 222, a provisioning component 224, one or more processors 226, and memory 228. In various embodiments, one or more of the user interface component 204, project generation component 206, project telemetry component 208, project analysis component 210, project documentation component 212, asset recovery component 214, emulation component 216, simulation component 218, device interface component 220, access management component 222, provisioning component 224, the one or more processors 226, and memory 228 can be electrically and/or communicatively coupled to one another to perform one or more of the functions of the IDH repository system 202. In some embodiments, components 204, 206, 208, 210, 212, 214, 216, 218, 220, 222, and 2242 can comprise software instructions stored on memory 228 and executed by processor(s) 226. IDH repository system 202 may also interact with other hardware and/or software components not depicted in FIG. 2. For example, processor(s) 226 may interact with one or more external user interface devices, such as a keyboard, a mouse, a display monitor, a touchscreen, or other such interface devices.

IDH repository system 202 can be implemented on a cloud platform as a set of cloud-based services to facilitate access by a diverse range of users having business or technical relationships, including industrial equipment owners (e.g., industrial enterprise entities or plant owners), equipment vendors, original equipment manufacturers (OEMs), system integrators, or other such user entities. The cloud platform on which the system 202 executes can be any infrastructure that allows shared computing services to be accessed and utilized by cloud-capable devices. The cloud platform can be a public cloud accessible via the Internet by devices having Internet connectivity and appropriate authorizations to utilize the IDH repository services. In some scenarios, the cloud platform can be provided by a cloud provider as a platform-as-a-service (PaaS), and the IDH repository system 202 can reside and execute on the cloud platform as a cloud-based service. In some such configurations, access to the cloud platform and associated IDH repository services can be provided to customers as a subscription service by an owner of the IDH repository system 202. Alternatively, the cloud platform can be a private cloud operated internally by the industrial enterprise (the owner of the plant facility). An example private cloud platform can comprise a set of servers hosting the IDH repository system 202 and residing on a corporate network protected by a firewall.

User interface component 204 can be configured to receive user input and to render output to the user in any suitable format (e.g., visual, audio, tactile, etc.). In some embodiments, user interface component 204 can be configured to communicatively interface with a client device (e.g., a laptop computer, tablet computer, smart phone, etc.) that is communicatively connected to the IDH repository system 202 (e.g., via a hardwired or wireless connection). The user interface component 204 can then serve an IDH interface environment to the client device, through which the system 202 receives user input data and renders output data. In other embodiments, user interface component 204 can be configured to generate and serve suitable interface screens to the client device (e.g., program development screens, project submission screens, analysis result screens, etc.), and exchange data via these interface screens. Input data that can be received via various embodiments of user interface component 204 can include, but is not limited to, programming code (including industrial control programming, such as ladder logic programming), device configuration data, engineering drawings, HMI applications, or other such input. Output data rendered by various embodiments of user interface component 204 can include program code, programming feedback (e.g., error and highlighting, coding suggestions, etc.), control project telemetry and recommendations, project testing results, etc.

Project generation component 206 can be configured to create a control system project comprising one or more project files based on design input received via the user interface component 204, as well as industrial knowledge, predefined code modules, and asset models maintained by the IDH repository system 202. The control system project can comprise one or more of industrial control code (e.g., ladder logic, structured text, function block diagrams, etc.), HMI applications comprising one or more HMI interface screen definitions, device configuration files, or other such project files.

Project telemetry component 208 can be configured to analyze an industrial control project submitted by a user and generate project telemetry, or statistical information, for the submitted project based on the analysis. Example project telemetry data that can be generated by the project telemetry component 208 can include, but is not limited to, an inventory of devices used in the project, information regarding how the devices are being used, reports indicating how close to hardware or software capacity limitations the devices or associated software will be operating, how much memory or energy is expected to be consumed by the project during runtime, or other such statistics.

Project analysis component 210 is configured to analyze the project telemetry data generated by the project telemetry component 208 and generate design recommendations or warnings based on this analysis. Project analysis component 210 can also generate device or equipment usage statistics inferred from multiple projects submitted by multiple end customers for use by equipment vendors or OEMs.

Project documentation component 212 can be configured to generate a variety of project hand-off or validation documents based on analysis of the control system project, including but not limited to approval documents, safety validation checklists, I/O checkout documents, audit documentation, or other such documents. Asset recovery component 214 can be configured to collect and archive backups of control project files and device configurations, and deploy these archived project files as needed for disaster recovery or remote deployment purposes. Emulation component 216 can be configured to emulate execution of an industrial control project being testing on a virtualized (or emulated) industrial controller. Simulation component 218 can be configured to simulate operation of a virtualized model of an industrial automation system under control of an industrial control project being emulated. Device interface component 220 can be configured to receive real-time operational and status data from industrial devices that make up an automation system during run-time, and to deploy control commands to selected devices of the automation system.

Access management component 222 can be configured to manage remote access to registered resources, such as industrial assets that have been registered via a gateway device. Provisioning component 224 can be configured to deploy instances of virtual machine images as executable virtual machines within a customer's designated digital engineering space.

The one or more processors 226 can perform one or more of the functions described herein with reference to the systems and/or methods disclosed. Memory 228 can be a computer-readable storage medium storing computer-executable instructions and/or information for performing the functions described herein with reference to the systems and/or methods disclosed.

Figure 3:
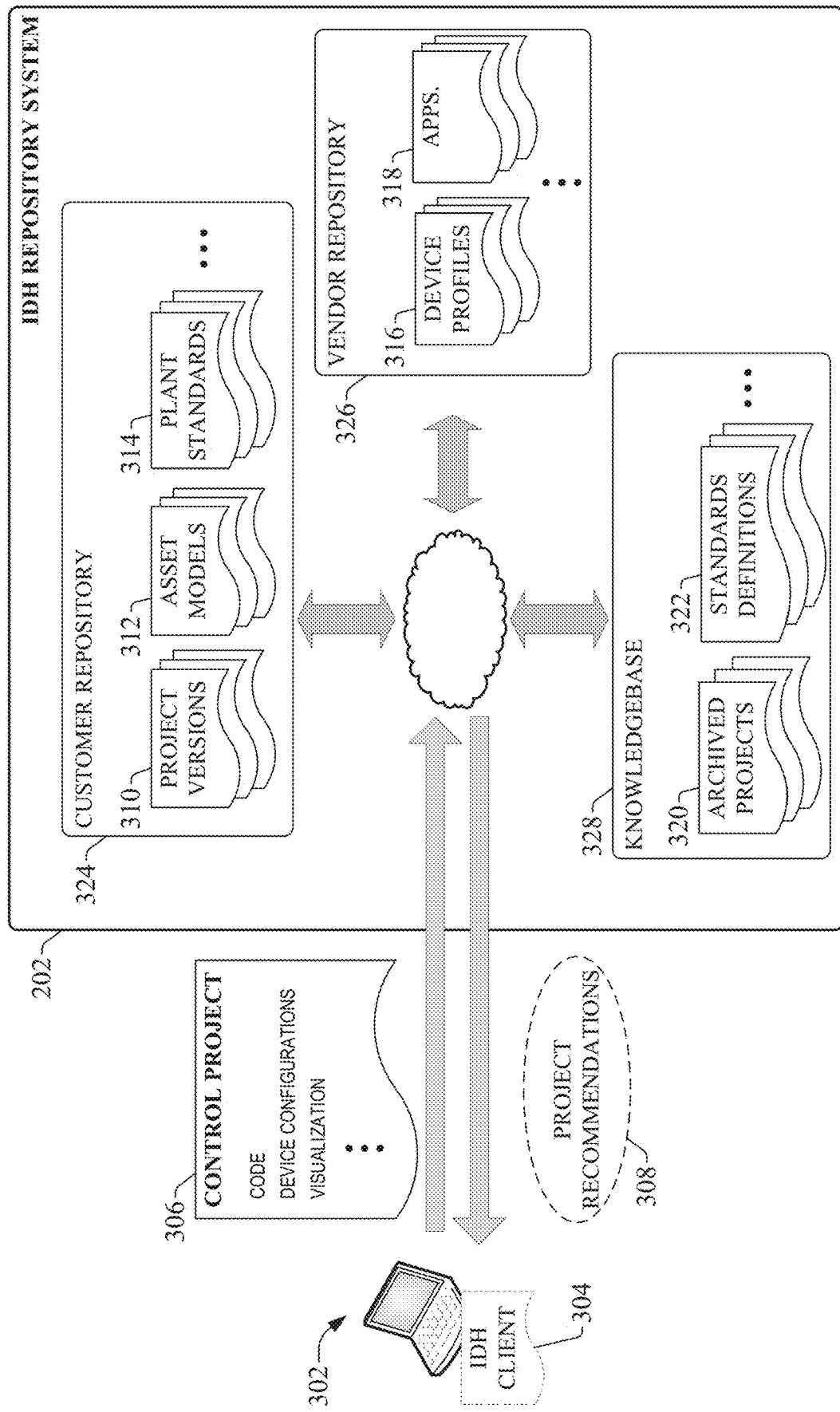
FIG. 3 is a diagram illustrating a generalized architecture of the IDH repository system.

FIG. 3 is a diagram illustrating a generalized architecture of the IDH repository system 202 according to one or more embodiments. As noted above, IDH repository system 202 can execute on a cloud platform as a set of cloud-based storage, analysis, and project editing services. A client device 302 (e.g., a laptop computer, tablet computer, desktop computer, mobile device, wearable AR/VR appliance, etc.) can access the repository system's project development and analysis tools and leverage these tools to either upload or create a control project for an automation system being developed. To this end, the system's user interface component 204 can remotely serve an IDH client 304 to the client device 302. The IDH client 304 comprises a number of interface displays that serve as an interface to the system 202.

Using the tools offered by the repository system 202, the user can submit a control project 306 to the repository system 202. In general, a control project 306 comprises digital data or files that, when executed on corresponding industrial devices deployed within an industrial environment, facilitate monitoring and control of an automation system or industrial process. Control project 306 can comprise control code intended for execution on an industrial controller (e.g., ladder logic, sequential function charts, structured text, function block diagrams, etc.), device configuration data (e.g., industrial controller configuration files, motor drive configuration files, etc.), visualization applications (e.g., HMI applications, AR/VR content, etc.), or other such control project data. In some scenarios, control project 306 may also comprise engineering documentation for its associated automation system, including engineering drawings (e.g., CAD files), support documents, maintenance plans, or other such documentation. In some scenarios in which the design tools offered by the IDH repository system 202 are used to perform project development, control project 306 can be submitted as ongoing project development input; e.g., as control code submitted to the repository system 202 as a designer is writing the code. Alternatively, users can submit completed control projects to the repository for storage, analysis, and feedback. Both scenarios will be described in more detail herein.

In addition to serving as a cloud-based storage for submitted control project 306, repository system 202 applies a variety of analytics on the submitted control project 306, and generates project recommendations 308 for improving aspect of the submitted control project. This analysis can be based on customer-specific and vendor-specific information contained in a customer repository 324 and a vendor repository 326 maintained on the repository system 202, as well as general industrial expertise stored in a knowledgebase 328.

Repository system 202 can maintain multiple customer repositories 324 designated for respective different end user entities (e.g., equipment or plant owners, industrial enterprises, etc.). Owners of industrial assets can submit and archive project versions 310 in their designated customer repositories 324. Users can also define customized plant standards 314, which can be stored in the customer repository 324 and applied to submitted control projects to ensure that the projects comply with the defined standards. Customer repository 324 can also store digital asset models 312 corresponding to industrial assets in use at the customer facility. These asset models 312 can be used for a variety of purposes, including but not limited to digital simulations of the submitted control project.

The repository system 202 can also analyze control project 306 based on vendor-specific data submitted by equipment or device vendors and stored on one or more vendor repositories 326. Similar to customer repository 324, repository system 202 can maintain multiple vendor repositories 326 assigned to respective different equipment vendors or OEMs. Vendors can submit device profiles 316 or other types of digital models of their equipment or devices for storage in their designated vendor repository 326. These device profiles 316 can be used in connection with building a digital twin of a customer's automation system or plant environment, or to compare a customer's usage of their equipment with defined equipment capacities. Vendors can also submit and store applications 318 or code segments that can be executed in connection with operation of their equipment (e.g., control logic, HMI interface displays, reporting tools, etc.).

The submitted control project 306 can also be analyzed in view of other archived projects 320 submitted by other customers and deemed similar to the submitted project. This analysis may be useful for identifying portions of the submitted control project 306—e.g., code used to program a particular type of industrial machine or procedure—that deviate from more common approaches used by other designers. Knowledgebase 328 can also store a number of industry-specific standards definitions against which the submitted control project 306 can be checked. Other types of information can be stored and managed by the repository system in the various storage designations and used to analyze and optimize submitted control project data, as will be described herein.

Figure 4:
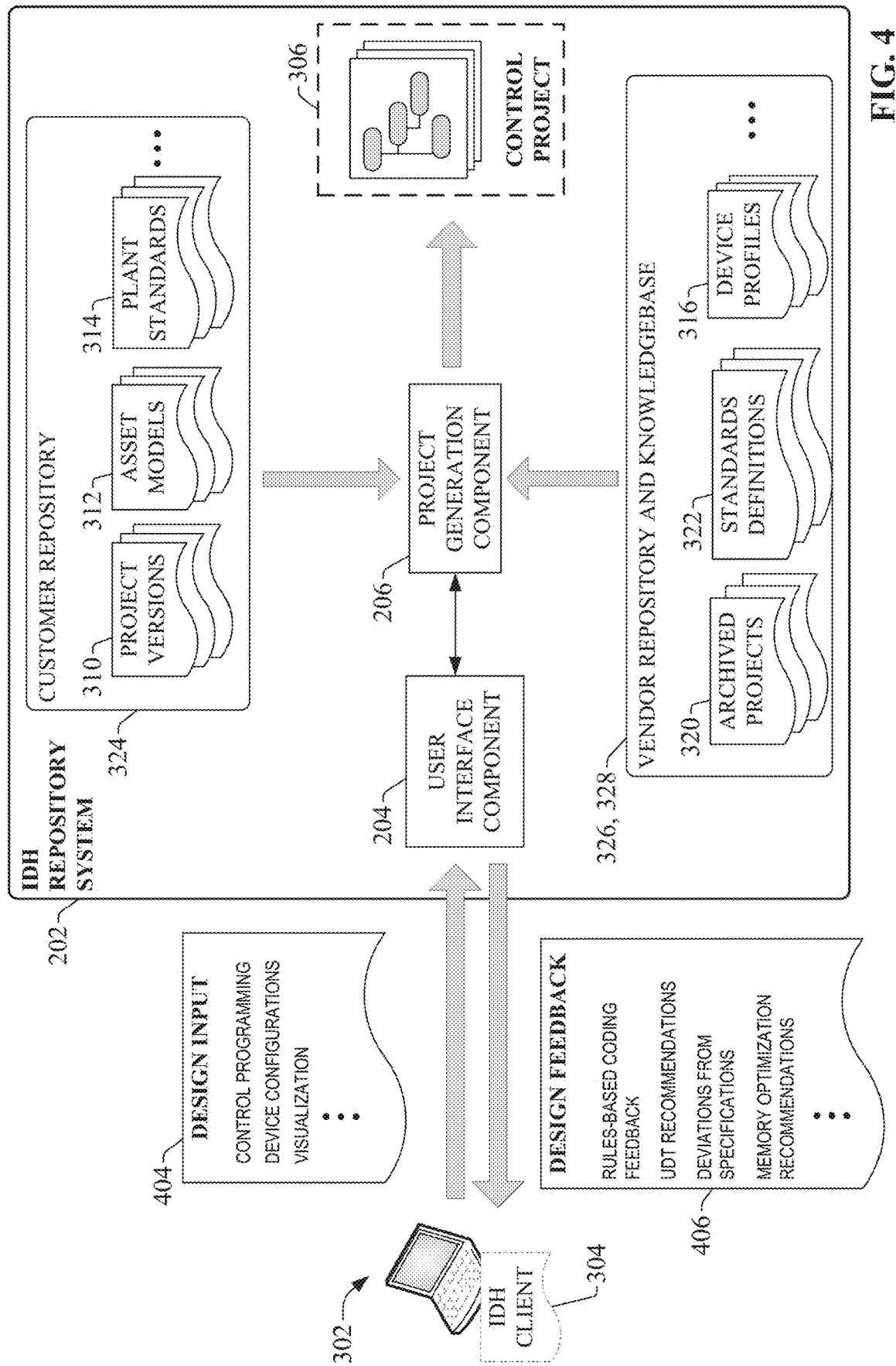
FIG. 4 is a diagram illustrating example data flows associated with creation of a new control project for an automation system being designed using an IDH repository system.

As noted above, control project 306 can be submitted as one or more completed project files for a given industrial control project to be stored and analyzed, or, if the repository system's native project development tools are being used to create a new project, may be submitted as design input during development of the project. FIG. 4 is a diagram illustrating example data flows associated with creation of a new control project 306 for an automation system being designed using repository system 202 according to one or more embodiments. In this example, client device 302 accesses the repository system's project development tools and leverages these tools to create a control project 306 for an automation system being developed. Control project 306 may comprise one or more of industrial controller code, (e.g., control logic, structured text, sequential function charts, etc.), device configuration files or parameter settings, HMI applications defining HMI screens or AR/VR visualizations for visualizing the automation system's operation, or other such aspects of a control project.

Accordingly, to facilitate project development, user interface component 204 can serve development interface displays to the client device 302 that allow a user to submit design input 404 to the repository system 202 in various supported formats, including but not limited to control programming for execution on an industrial controller, device configuration settings to be downloaded to respective industrial devices (e.g., motor drives, sensors, industrial controllers, etc.) to facilitate configuration of those devices, HMI screen development data, or other such design input 404. Based on this design input 404, project generation component 206 generates a control project 306 comprising one or more of compiled controller code, device configuration data, HMI application files, or other such executable control project data that can be deployed and executed on the appropriate industrial devices to carry out the programmed control functions.

In some embodiments, the repository system 202 can assist the developer in devising a hybrid project development approach, such that design functions are split between a local workstation and the cloud-based design services. In this regard, the repository system 202 can assist the designer to delineate which portions of project development are executed locally and which portions are executed on the cloud platform.

Also, during development of the control project 306, project generation component 206 can generate design feedback 406 intended to assist the developer in connection with developing and optimizing the control project 306, and this design feedback 406 can be rendered by the user interface component 204 as real-time feedback to the designer. This design feedback 406 can be generated based on the analysis of the design input 404 itself, as well as information stored in the customer repository 324, vendor repository 326, and knowledgebase 328.

For example, as the designer is entering, as design input 404, control code to be compiled and executed on an industrial controller, project generation component 206 can perform code analysis on the code and provide recommendations, notifications, or predictions based on the analysis relative to a variety of code or project quality metrics. This analysis can include determining whether the control code conforms to the engineering standards and practices used at the plant facility for which the code is being developed. To aid in this analysis, engineers at the plant facility can submit control code standards definitions defining the coding standards that all control code is expected to adhere to before being permitted to execute within the plant facility. These coding standards can be stored in the customer's repository 324 as plant standards 314, and can be referenced by the project generation component 206 as the designer submits design input 404 to determine whether the submitted control code is in conformance with plant standards.

Plant standards 314 can define coding standards both in terms of preferred control behaviors (e.g., preferred control sequences to be used or interlocks that must be recognized when carrying out a particular type of control action, preferred maximum or minimum control setpoints for particular machine operations, etc.) as well as in terms of preferred code formatting. Plant standards 314 may also define preferred parameters or configurations for particular types of devices (e.g., motor drives, network infrastructure devices, etc.), and project generation component 206 can monitor the submitted design input 404 during development to ensure that any device configurations submitted by the designer conform to the defined standards. Upon determining, based on this assessment, that the designer has entered a non-compliant device configuration, project generation component 206 can generate design feedback notifying the user of the deviation and indicating the allowable configuration parameters.

Plant standards 314 may also include project-specific standards, including functional specifications or safety validation requirements. Project generation component 206 can monitor the design input 404 with reference to the functional project requirements defined by the plant standards 314 and, upon determining that any portion of the submitted design input 404 deviates from the defined functional specifications or safety validation requirements, generate design feedback notifying the user of the deviation and offering recommendations as to how the deviant portion of the control project can be brought within compliance. Plant standards 314 can define functional specifications in terms of manufacturing functions to be carried out, preferred equipment vendors, equipment to be used, product output requirements, energy consumption requirements, network utilization requirements, or other such specifications. Depending on the functional specifications set forth by the plant standards 314, project generation component 206 can infer relevant properties of the control project based on the design input 404 and notify the user if any aspect of the project deviates from these standards. For example, if the functional specification dictates that only motor drives from an indicated preferred vendor are to be used for the new installation, project generation component 206 may infer from the design input 404 (e.g., from the I/O configuration of an industrial controller, or from device configuration data included in the design input 404) that devices from a non-approved vendor are being included in the control project design, and notify the user that other devices from an approved vendor must be substituted.

In some embodiments, project generation component 206 can also compare control code submitted as part of the design input 404 with previously submitted control code included in archived project versions 310 for the same control project or different control projects developed by the same customer. Based on analysis of other control code submitted by the customer and archived in the customer repository 324, project generation component 206 can learn or infer typical coding styles or design approaches used by that customer. This can include, for example, code indentation preferences, preferences regarding the use of call statements, rung commenting standards, variable or I/O naming standards, or other such preferred programming characteristics. In addition to control coding standards, the project generation component 206 can also identify the customer's preferred manner of programming certain control operations. For example, project generation component 206 may identify, based on analysis of archived project versions 310, that the customer uses a particular control sequence in order to move material from a source container to a tank, or that the customer typically associates a particular control operation with a set of interlocks that must be satisfied before the control operation can be performed.

Based on these learned customer programming preferences, the project generation component 206 can identify whether the control programming being submitted as part of design input 404 deviates from either the plant's preferred coding practices or the plant's preferred manner of controlling certain industrial operations based on comparison with the project versions 310, and generate design feedback 406 notifying of these deviations and recommending alternative control coding that will bring the current project into conformity with previous design strategies. This feedback 406 may include, for example, a recommendation to add one or more interlocks to the control programming for a particular control operation, a recommendation to re-order a sequence of operations for control of a particular type of machine, a recommendation to rename a variable or an I/O point to conform with the plant's preferred nomenclature, a recommendation to add or revise a rung comment, a recommendation to change an indentation for a portion of control code, a recommendation to replace repeated instances of code with a CALL statement, or other such feedback.

Project generation component 206 can also reference vendor-specific equipment or device data in one or more vendor repositories 326 to predict whether the user's submitted design input 404 will cause equipment integration or compatibility issues. This determination can be based, for example, on device profiles 316 submitted by the equipment vendor for access by the project generation component 206. Each device profiles 316 may comprise digital specification data for a given device, and may also record known compatibility issues for the device. Using this information, project generation component 206 can assess the submitted design input 404 to determine whether any portion of the submitted control programming or device configurations will result in a performance or integration issue given known limitations of one or more devices. This assessment may also consider inferred interactions between sets of devices that the user is designing for collaborative operation. For example, if the design input 404 suggests that the designer is intending to configure two non-compatible devices for collaborative operation (as determined based on known compatibility issues recorded in the device profiles 316), project generation component 206 can generate design feedback 406 indicating the two non-compatible devices.

The analysis applied by the project generation component 206 can also identify improper or non-optimal coding practices within submitted control code. This determination can be based in part on preferred coding practices defined in the standards definitions 322 maintained in the repository system's knowledgebase 328. Coding concerns that can be identified by the project generation component 206 can include, but are not limited to, excessive levels of nesting, excessive repeated code, improper code indentations, etc. In response to detecting such coding issues within the user's submitted code, the project generation component 206 can provide design feedback recommending alternative programming approaches that would bring the control code into conformance with preferred coding standards (e.g. a recommendation to employ case statements to eliminate excessive ladder logic).

Project generation component 206 may also identify modifications or substitutions that can be made within the control project 306 that may improve memory or network utilization associated with execution of the control project 306. This may include, for example, identifying alternative control code programming—or making another modification to the control project 306—that may reduce the processing load on an industrial controller without changing the intended control functions. In another example, the project generation component 206 may determine that utilizing a currently unused function of a device (e.g., an operating mode or a configuration parameter setting), or substituting a device currently used in the control project 306 with a different device model, may reduce energy consumption or network bandwidth utilization.

Figure 5:
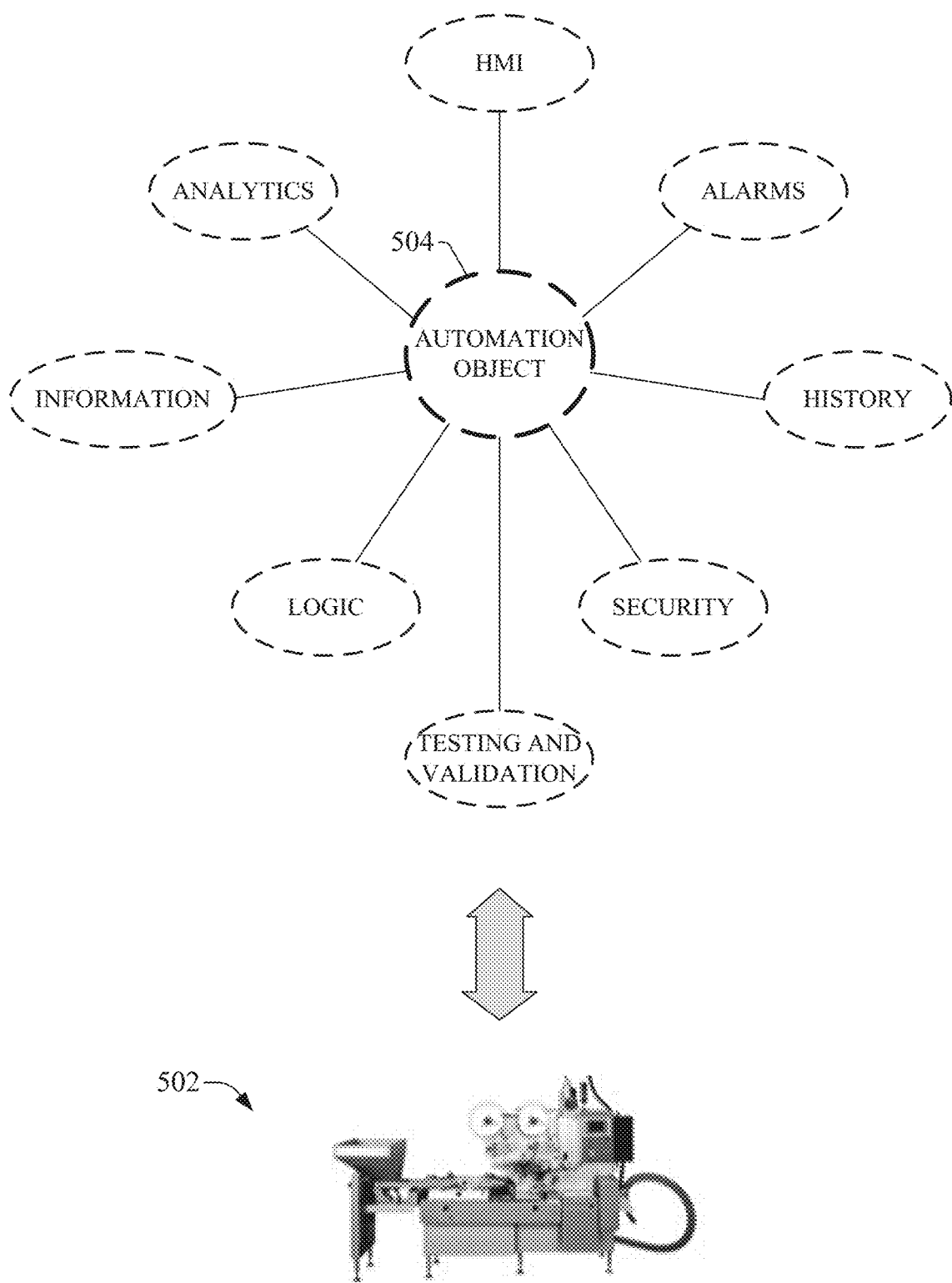
FIG. 5 is a diagram illustrating several example automation object properties that can be leveraged by an IDH repository system in connection with building, deploying, and executing a control project.

To support enhanced development capabilities, some embodiments of IDH repository system 202 can support control programming based on an object-based data model rather than a tag-based architecture. Automation objects can serve as the building block for this object-based development architecture. FIG. 5 is a diagram illustrating several example automation object properties that can be leveraged by the repository system 202 in connection with building, deploying, and executing a control project 306. Automation objects 504 can be created and augmented during design, integrated into larger data models, and consumed during runtime. These automation objects 504 provide a common data structure across the repository system 202 and can be stored in an object library (e.g., part of memory 228) for reuse. The object library can store predefined automation objects 504 representing various classifications of real-world industrial assets 502, including but not limited to pumps, tanks, values, motors, motor drives (e.g., variable frequency drives), industrial robots, actuators (e.g., pneumatic or hydraulic actuators), or other such assets. Automation objects 504 can represent elements at substantially any level of an industrial enterprise, including individual devices, machines made up of many industrial devices and components (some of which may be associated with their own automation objects 504), and entire production lines or process control systems.

An automation object 504 for a given type of industrial asset can encode such aspects as 2D or 3D visualizations, alarms, control coding (e.g., logic or other type of control programming), analytics, startup procedures, testing protocols and scripts, validation procedures and reports, simulations, schematics, security protocols, and other such properties associated with the industrial asset 502 represented by the object 504. Automation objects 504 can also be geotagged with location information identifying the location of the associated asset. During runtime of the control project 306, the automation object 504 corresponding to a given real-world asset 502 can also record status or operational history data for the asset. In general, automation objects 504 serve as programmatic representations of their corresponding industrial assets 502, and can be incorporated into a control project 306 as elements of control code, a 2D or 3D visualization, a knowledgebase or maintenance guidance system for the industrial assets, or other such aspects.

Some embodiments of project analysis component 210 can also predict network traffic or load statistics based on the device configuration information obtained from analysis of the control project 306 and generate network configuration recommendations based on these predictions. This analysis can be based on a comparison of the customer's network configuration with known or recommended network configurations. Project analysis component 210 may also generate a network risk report indicating risks of network failure as a result of implementing the proposed control design.

Completed control projects 306—either developed using the repository system's project editing tools (as described above in connection with FIG. 4) or using separate control project development platforms (e.g., ladder logic development platforms, HMI application development platforms, device configuration applications, etc.)—can be submitted to the repository system 202 for analysis, archival, or upgrade purposes, as depicted in FIG. 3. In this regard, the IDH repository system 202 serves as a secure and intelligent industrial control project repository open to any number of participating industrial customers, which offers both secure archival of control projects 306 as well as analysis of these projects 306 for the purposes of generating project recommendations 308 intended to optimize the control design, or to guide the designer to previously unknown and unused device features that, if utilized, may improve performance of the control project.

Figure 6:
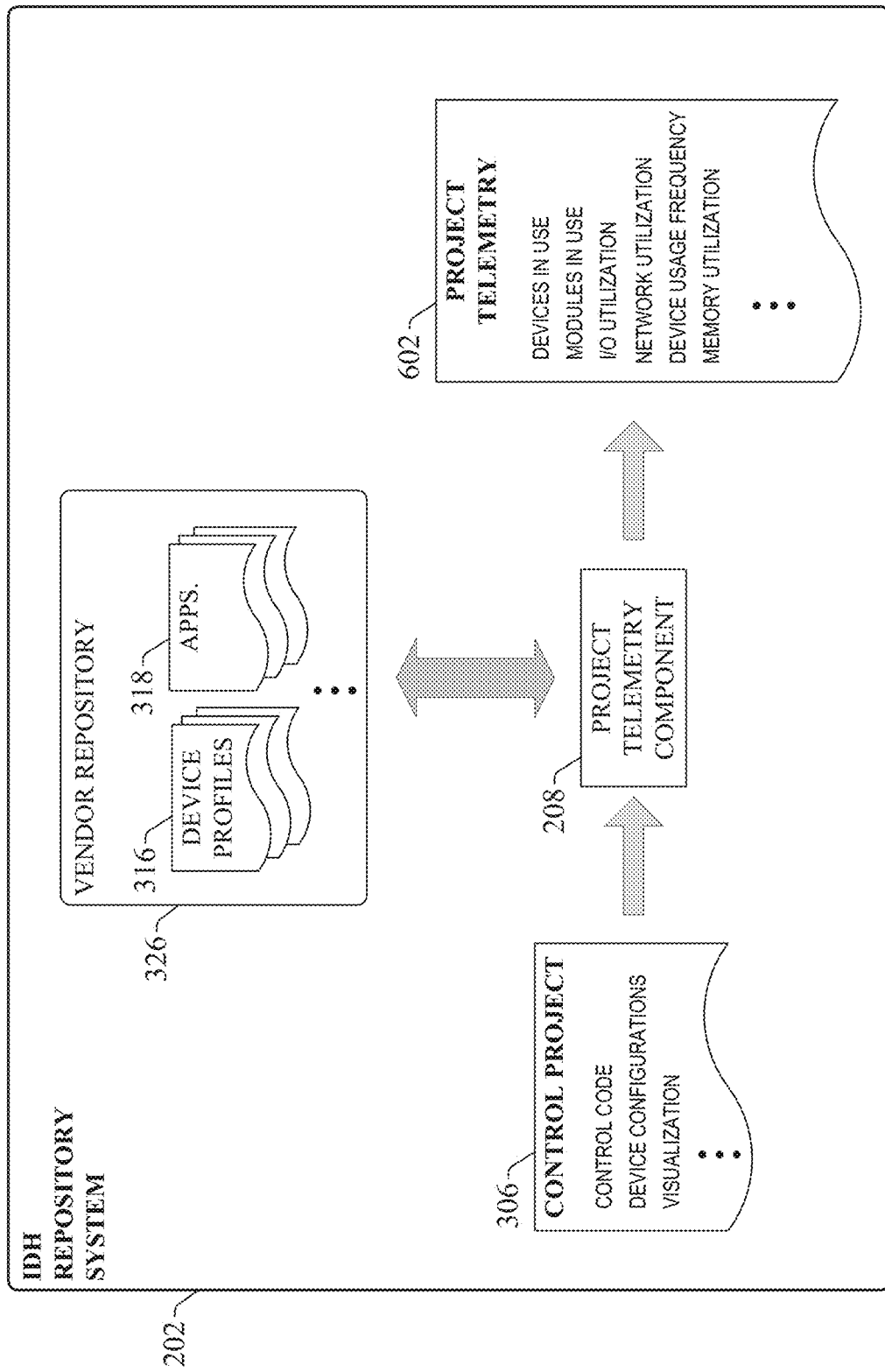
FIG. 6 is a diagram illustrating extraction of project telemetry data from a control project submitted to an IDH repository system.

To facilitate intelligent analysis of a submitted control project 306, IDH repository system 202 can include a project telemetry component 208 that generates project telemetry data for a submitted control project 306, which can offer insights into both the control project itself as well as the equipment and device topology of the automation system for which the control project 306 is being designed. FIG. 6 is a diagram illustrating extraction of project telemetry data 602 from a control project 306 submitted to the repository system 202. Based on analysis of the control project 306 project telemetry component 208 can determine or infer characteristics of the control project itself, information regarding the devices or equipment that makes up automation system to be monitored and controlled by the control projects 306, predictions regarding performance or resource utilization of the controlled system, the control design's estimated impacts on device lifecycle for one or more devices, or other such project metrics.

For example, based on analysis of an industrial controller program file—which may include control code, I/O configuration data, and networking configuration data for an industrial controller—the project telemetry component 208 may identify input or output devices connected to the industrial controller (e.g., based on examination of the I/O configuration or the control code itself), and record an inventory of these devices in the project telemetry data 602. Similar analysis can be used to determine I/O or control modules configured for use, as well as information regarding how the controller's I/O is being utilized. Project telemetry component 208 can also record inferred functional or topological relationships between any two or more of the devices or equipment identified as being part of the automation system. Project telemetry component 208 can also estimate a total amount of network bandwidth or energy that the automation system is expected to consume. To yield further insights into how the devices that make up the control system are being used, project telemetry data 602 can also record which subset of the available features of a device are currently being used by the control project 306.

In addition to metrics for the automation system to be controlled, the project telemetry component 208 can also estimate performance metrics for the control code itself, such as an estimated amount of memory or processing power required to execute aspects of the control project 306.

In some cases, project telemetry component 208 can enhance the project telemetry data 602 generated for the control project 306 by referencing vendor-specific device information stored in device profiles 316 on the vendor repository 326. For example, the project telemetry component 208 may identify, based on analysis of the control project 306, that a particular device model (e.g., an I/O module, a network infrastructure device, a motor drive, a servo, an actuator, etc.) is being used as a component of the automation system. Based on identification of this device, project telemetry component 208 can access the vendor repository 326 corresponding to the vendor of the device, determine whether a device profile is available for the device, and, if so, retrieve functional specification data for the device from the device profile 316 for inclusion in the project telemetry data 602. This functional specification data, which depends on the type of device, can include such information as the device's available I/O, available configuration parameters or functionalities, available memory or processing capacity, lifecycle information, response times, physical dimensions, rated power, networking capabilities, operational limitations (e.g., environmental requirements, such as ambient temperatures for which the device is rated), or other such supplemental device information.

Figure 7:
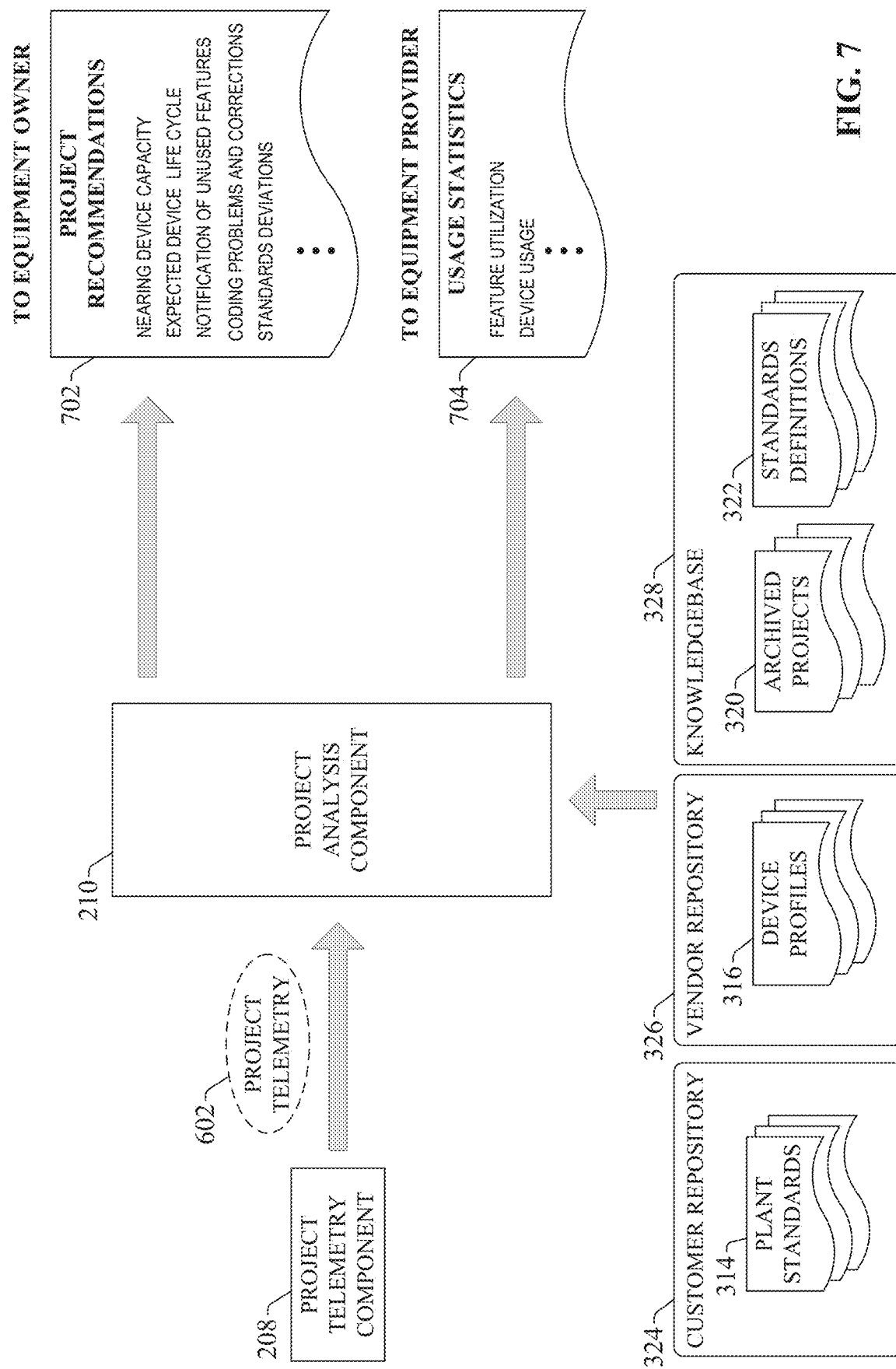
FIG. 7 is a diagram illustrating generation of project recommendations based on analysis of extracted project telemetry data.

Once project telemetry data 602 has been extracted for the control project 306, the repository system's project analysis component 210 can generate recommendations or notifications relevant to the project design based on analysis of this project telemetry as well as encoded industry expertise. FIG. 7 is a diagram illustrating generation of project recommendations 702 based on analysis of the extracted project telemetry data 602. By analyzing project telemetry data 602, project analysis component 210 can ascertain how the customer's industrial hardware and software assets are being used and generate recommendations or notifications based on this assessment. This can include determining whether the proposed control project—either due to control sequences defined by the control programming or the configuration parameters set for one or more industrial devices—will cause hardware or software used in the control project to operate near or above their rated operating thresholds. For example, based on the control project's I/O utilization, as recorded in the project telemetry data 602, as well as knowledge of the I/O capacity of devices used in the control project (which may be determined based on specification data for those devices as record in device profiles 316), project analysis component 210 may generate a notification that the proposed control design will cause one or more control devices (e.g., industrial controllers or I/O modules) to near or exceed its maximum I/O capacity. Based on this assessment, the project analysis component 210 may further recommend an alternative control device having a higher I/O capacity than that currently proposed in the control project in order to increase the number of spare I/O points for future expansion.

Project analysis component 210 may also estimate a degree of device utilization over time based on analysis of the project telemetry data 602 and cross-reference this information with lifecycle information for the device recorded in the device's profile 316, and generate a notification indicating an expected life cycle or time-to-failure for the device if used as proposed in the control project. If an equivalent device having a longer expected lifecycle is available, project analysis component 210 may also generate a recommendation to replace the currently proposed device with the equivalent. Alternatively, the project analysis component 210 may recommend a modification to the control project that may extend the lifespan of the device (e.g., by reducing the operating frequency of the device without otherwise impacting the control outcomes).

In some embodiments, project analysis component 210 may also identify unused features of a device which, if utilized, may improve one or more operating metrics of the control project. These may be features of the device (e.g., configuration parameters, latent functions that are inactive by default but can be activated or invoked, etc.) that are available but are unknown to the designer. In an example scenario, project analysis component 210 may discover available features of a device based on the functional specifications recorded in the device's profile 316, and determine whether any unused features may be relevant to an aspect of the control project 306, or may improve a performance metric for the control project 306. For example, the project analysis component 210 may determine that invoking a currently unused operating mode of a device may reduce the memory footprint or network bandwidth usage of the device, may improve the automation system's product throughput, may reduce energy or material consumption of the project as a whole, may reduce product waste, or may unlock another unforeseen improvement in the project's operation. If such possible design improvements are identified, user interface component 204 can send a notification to the designer (or another user entity associated with the customer) recommending the design modification. In an example scenario, based on submitted device configuration files as part of control project 306, project analysis component 210 may determine that an unused feature of a drive (e.g., regenerative braking) may reduce overall power consumption, and generate a notification identifying the drive and indicating the unused feature. The notification may also offer a recommendation regarding when, during the control sequence, the feature should be invoked in order to obtain the predicted benefit.

Project analysis component 210 may also determine whether any aspect of the control project 306 deviates from industry or plant standards. This can be based on a comparison between the project telemetry 602 and industry standards defined in the standards definitions 322 (stored in knowledgebase 328) or in-house standards defined in the plant standards 314 stored in the customer repository 324. In the case of industry standards, the particular set of standards against which the control project 306 is compared may be a function of the industrial vertical (e.g., automotive, pharmaceutical, food and drug, oil and gas, etc.) in which the control project 306 will operate, since some types of industries may require adherence to a vertical-specific set of control standards or requirements. Accordingly, the knowledgebase 328 may classify standards definitions 322 according to industrial vertical, allowing project analysis component 210 to select an appropriate set of standards to be applied to the control project 306. Standards definitions 322 may define such industry standards as a required amount of unused I/O that must be reserved as spare capacity, an emissions or energy consumption requirement, a safety integrity level (SIL) requirement, interlocks or permissives that should be associated with a given type of control operation (e.g., tying a "valve open" command to the fill level of a tank, preventing a machine start command until specified safety interlocks are satisfied) or other such standards.

Example in-house standards that can be recorded in the customer's plant standards 314 and applied to the control project 306 can include, but are not limited to, control coding standards (as described above in connection with FIG. 4), preferred vendors whose devices are approved for use within the plant, safety interlocks or permissives to be associated with certain control functions, or other such standards.

Project analysis component 210 may also perform any of the project analytics, and generate any of the design feedback 406, described above as being carried out by the project generation component 206. Some project analysis results may also trigger expert support review, such that the project analysis component 210 initiates remote review of the project, contingent on the designer's permission, by a technical support entity.

Since the control project analysis carried out by the project telemetry component 208 and project analysis component 210 can identify or infer devices and networks that will be used by the control project 306, project analysis component 210 can also generate an inventory of the devices or industrial assets used by the customer's project. Repository system 202 can store this asset inventory in the customer repository 324 associated with the owner of the control project 306. Moreover, if any of the discovered devices or industrial assets have associated digital device profiles 316 made available by the vendors of the assets and stored on the vendor repository 326, repository system 202 can retrieve these device profiles 316 from the vendor repository 326 and store the profiles 316 in the customer repository as asset models 312 corresponding to the devices. In this regard, the device profiles 316 may represent generic digital representations of their represented assets, and the project analysis component 210 may convert these generic device profiles 316 to customized asset models 312 representing the customer's uniquely configured assets based on the project telemetry data 602. A device profile 316 for a given industrial device (e.g., an industrial controller, a motor drive, a safety device, etc.) can be customized, for example, by applying the designer's particular configuration parameters for that device (as obtained from the project telemetry data 602) to the device profile 316 to yield the customized asset model 312 for the device. These asset models 312 can be used as the basis for a digital twin of the automation system, which can be used to simulate and test the control project 306 as will be described in more detail herein.

Results of the analysis performed on the project telemetry data 602 can also be formatted and filtered for use by equipment providers (e.g., equipment vendors, OEMs, etc.) who participate in the repository system ecosystem, and this information can be made available to equipment providers as equipment usage statistics 704. For example, for every equipment vendor whose equipment is being used in the control project 306, the project analysis component 210 can provide data to the vendor indicating which of their devices are being used, as well as which features of those devices are being used. This data can be provided to the vendor in a manner that anonymizes the end customer and prevents the vendor from being able to view the customer's proprietary information (e.g., recipe data, production statistics, etc.). In general, the repository system 202 protects a customer's proprietary data while affording enough access to provide the services. The user interface component 204 can allow the user to easily control how proprietary data is exposed to or hidden from outside entities who are also participating in the IDH platform.

For a given equipment provider, the user interface component 204 can compile these device or equipment statistics from multiple control projects 306 submitted by multiple different customers and present this aggregated equipment usage and feature utilization information in any suitable presentation format. For example, information regarding which of the equipment provider's devices or assets are being used can be presented as numbers of each asset in use at customer sites, geographic breakdowns indicating where the assets are being used, charts indicating relative popularities of the vendor's product line, etc. Similar presentations can be used to convey which features (e.g., operating modes, configuration parameters, etc.) of each of the vendor's products are being used, or how closely their products are being utilized to their functional capacities, as determined from aggregated project telemetry data 602 collected from multiple end customers using the vendor's products. Equipment providers can use these statistics 704 to make decisions regarding whether to discontinue a product due to lack of popularity; to identify potentially useful product features that are being underutilized by their customers and therefore should be more heavily promoted; to decide whether to increase or decrease memory, processing, or I/O resources of certain products based on a degree to which these resources are being used by the customers; or to make other informed decisions regarding product design and promotion.

While some equipment usage statistics 704 may be presented to the equipment providers in a manner that anonymizes the end customers (e.g., for the purposes of global product usage analysis), selected other such statistics 704 may be presented on a per-customer basis based on service or licensing agreements between the equipment provider and their customer. For example, some equipment providers, such as OEMs, may offer the use of their equipment as a subscription service in which the customer purchases a license for a specified degree of usage of the equipment (e.g., a specified number of operating cycles per month, a limited subset of available equipment features, etc.). In such scenarios, project analysis component 210 may determine an estimated frequency of usage of the provider's equipment based on analysis of the project telemetry data 602, and make this information available to the equipment provider for the purposes of license enforcement.

According to another type of analysis that can be applied to the project telemetry data 602, project analysis component 210 can compare the control project 306 or its extracted project telemetry data 602 with similar archived projects 320 submitted by other end customers, and identify aspects of the submitted control project 306 that deviate significantly from corresponding aspects of the similar archived projects 320. User interface component 204 can then render, as a project recommendation 702, a notification indicating the deviant aspects of the control project 306 and recommending a project modification that would bring the control project 306 in line with common practice. In this way, the repository system 202 can leverage collective industry expertise or common practice to provide recommendations regarding best practices relative to a submitted control project. Aspects of the submitted control project 306 that can be compared in this manner can include, but are not limited to, interlock designs for a given type of control operation, device configuration parameters (e.g., motor drive settings, network infrastructure device settings, safety device settings, etc.), control setpoints, orders of operations or timings for a given type of control operation or sequence, or other such project aspects.

Figure 8:
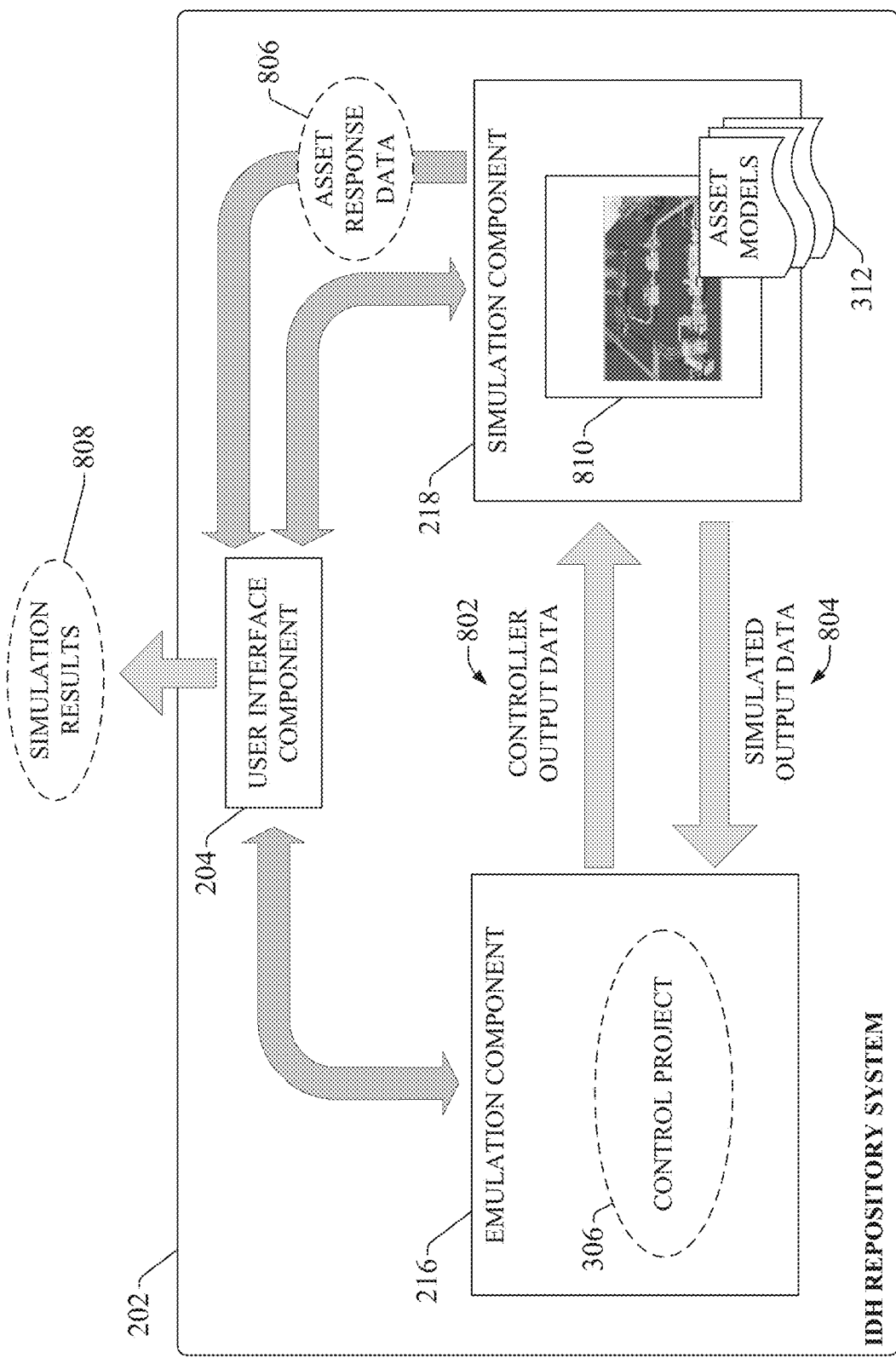
FIG. 8 is a diagram illustrating simulation of a control project by an IDH repository system.

Some embodiments of the repository system 202 can also simulate one or more aspects of the submitted control project 306 to predict whether the control project 306 will yield a desired outcome relative to one or more controlled machines. This allows the control project 306 to be pre-tested prior to execution on a physical machine. FIG. 8 is a diagram illustrating simulation of a control project 306 by the IDH repository system 202. In this example, the repository system's emulation component 216 acts as an industrial controller emulator to execute control programming defined as part of the control project 306 against digital twin 810 or other type of virtualization of the automation system for which the control project 306 is being developed and tested. In some embodiments, the simulation component 218, which builds and simulates the digital twin 810, can create the digital twin 810 based in part on the asset models 312 representing industrial devices or assets that make up the automation system. As noted above, these asset models 312 can be maintained on the customer repository 324, and may comprise device profiles 316 obtained from the vendor repository 326 and customized based on configuration data obtained from the project analysis. Using these asset models 312, and the functional and/or topological relationships between the industrial assets represented by the asset models 312 as inferred from analysis of the control project 306, simulation component 218 can generate a digital twin 810 of the automation system against which the control project 306 can be simulated and tested.

Simulation component 218 can leverage automation and mechanical characteristics modeled by the digital twin 810 to simulate various aspects of a physical automation system to be monitored and regulated by the control project 306. To this end, simulation component 218 can virtually interface the control project 306 with the digital twin 810 to facilitate exchange of simulated I/O data between the control project 306 (e.g., control code included in the control project 306) and digital twin 810, thereby simulating real-world control. Simulation component 218 generates digital and analog I/O values representing, for example, sensor outputs, metering outputs, or other plant data analogous to the data expected to be generated by the physical system based on the static and dynamic characteristics of the physical system modeled by the digital twin 810. This simulated output data 804 is provided to the emulation component 216, which receives this data 804 as one or more virtual physical inputs. Control project 306 processes these inputs according to the user-defined control code defined in the project 306 and generates digital and/or analog controller output data 802 based on the processing. This output data 802 represents the physical outputs that would be generated by an industrial controller or other type of control device executing the control code and transmitted to the hardwired field devices comprising the automation system (e.g., PID loop control outputs, solenoid energizing outputs, motor control outputs, actuator control outputs, robot control outputs, etc.). The controller output data 802 is provided to the appropriate input points of the digital twin 810, which updates the simulated output data 804 accordingly.

In addition to generating simulated output data 804, simulation component 218 can also generate asset response data 806 based on analysis of the simulated data exchange and expected behaviors of the modeled industrial assets in response to the simulated controller output data 802. For example, based on the automation and mechanical characteristics of the industrial assets modeled in the digital twin 810, simulation component 218 can predict expected behaviors of the modeled industrial assets, as well as behaviors of products being manufactured by the assets, in response to the controller output data 802, and convey this predicted behavior as asset response data 806. Example behaviors represented by asset response data 806 can include, but are not limited to, movement of product through the industrial assets (including speeds, accelerations, locations, lags, etc.), flow rates of fluids through the assets, expected energy consumption by the assets, an expected rate of degradation of mechanical components of the assets (based in part on coefficient of friction information defined in the asset models 312), expected forces applied to respective components of the assets during operation, or other such behaviors.

User interface component 204 can generate and render simulation results 808 on a client device based on performance results of the simulation. These simulation results 808 can include simulated operating statistics for the automation system (e.g., product throughput rates, expected machine downtime frequencies, energy consumption, network traffic, expected machine or device lifecycle, etc.). In some embodiments, asset response data 806 can be provided to the project analysis component 210, which can determine whether any of the simulated asset responses deviate from acceptable or expected ranges, which may be defined in the functional specifications stored on the customer repository 324. Based on results of this assessment, user interface component 204 can notify the user of any predicted deviations from the expected operating ranges and render recommendations regarding modifications to the control project 306 that may bring one or more predicted performance metrics within acceptable tolerances or ranges (e.g., as defined by design specifications for the project).

Figure 9:
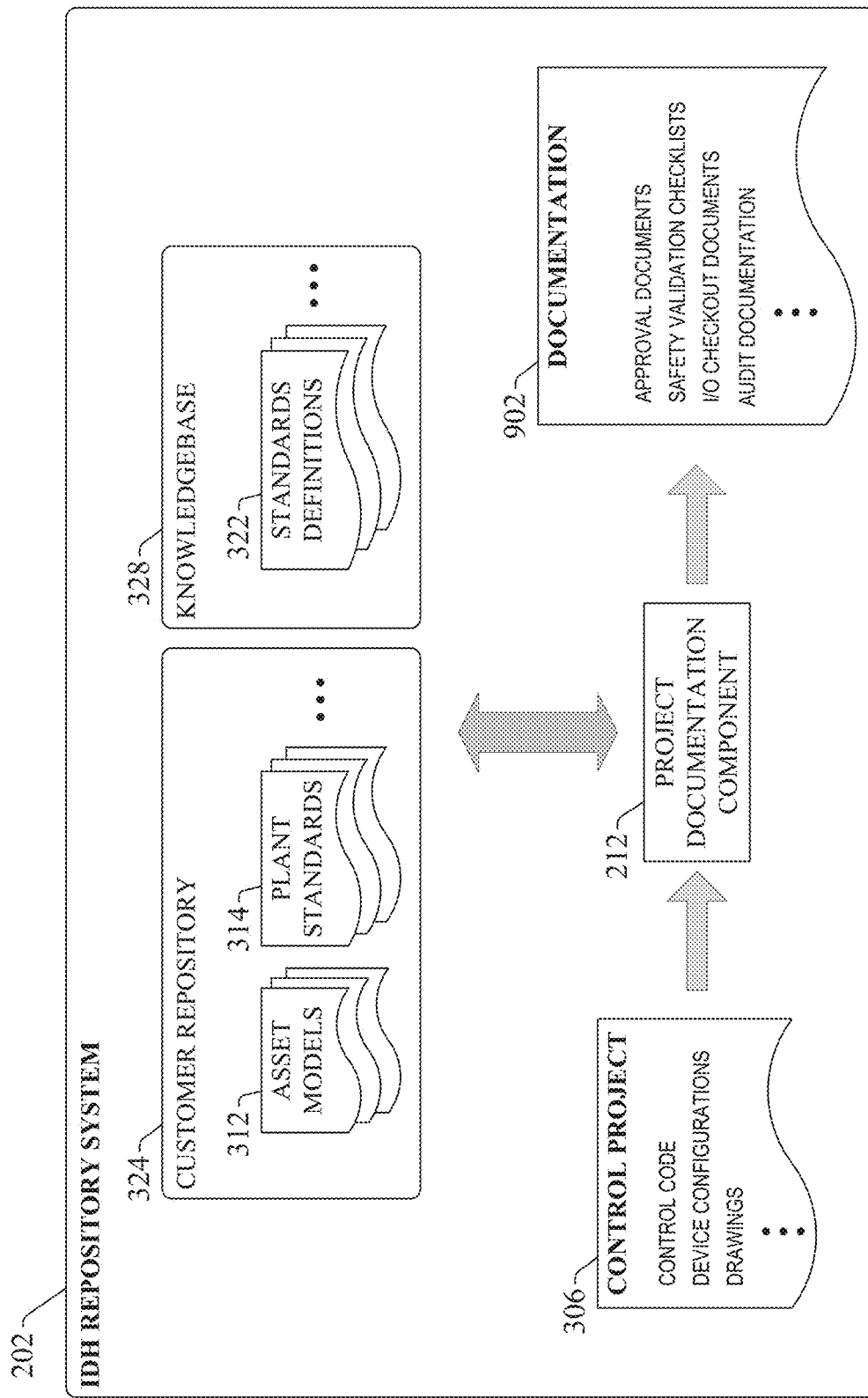
FIG. 9 is a diagram illustrating generation of handoff documentation by an IDH repository system.

At the end of a new design cycle, the repository system 202 can also generate project handoff and validation documents for the new control project. FIG. 9 is a diagram illustrating generation of handoff documentation 902 by the IDH repository system 202. Based on analysis of the completed control project 306, the repository system's project documentation component 212 can generate a variety of project documentation 902, including but not limited to approval documents, safety validation checklists, I/O checkout documents, and audit trails. At least some of this documentation 902 can be generated based on information stored in the customer repository 324. For example, project documentation component 212 may generate I/O checkout documents for the control project based on knowledge of the devices connected to the control system I/O—as determined from the control project 306—as well as information about these devices obtained from the asset models 312 corresponding to these devices. Similarly, safety validation checklists can be generated based on asset-specific safety requirements defined in the asset models 312. Some documentation 902 may also be generated based on in-house approval requirements defined in the plant standards 314. These approval requirements may specify, for example, the personnel who must sign their approval for various aspects of the control project.

Some documentation 212 may also be generated based on vertical-specific safety or auditing standards defined in the standards definitions 322 of the knowledgebase 328. In this regard, some industrial verticals may require compliance with regulations dictating how electronic records relating to engineering and operation of an automation system are collected and stored, how electronic signatures are obtained for the automation system, what types of documentation must be collected for auditing purposes, etc. For example, plant facilities operating within the food and drug industry are required to maintain records in compliance with Title 21 CFR Part 11. Accordingly, project documentation component 212 can identify types of project documentation required for the control project 306 based on the industrial vertical for which the project 306 is designed and the standards definitions 322 defining the documentation requirements for that vertical.

Figure 10:
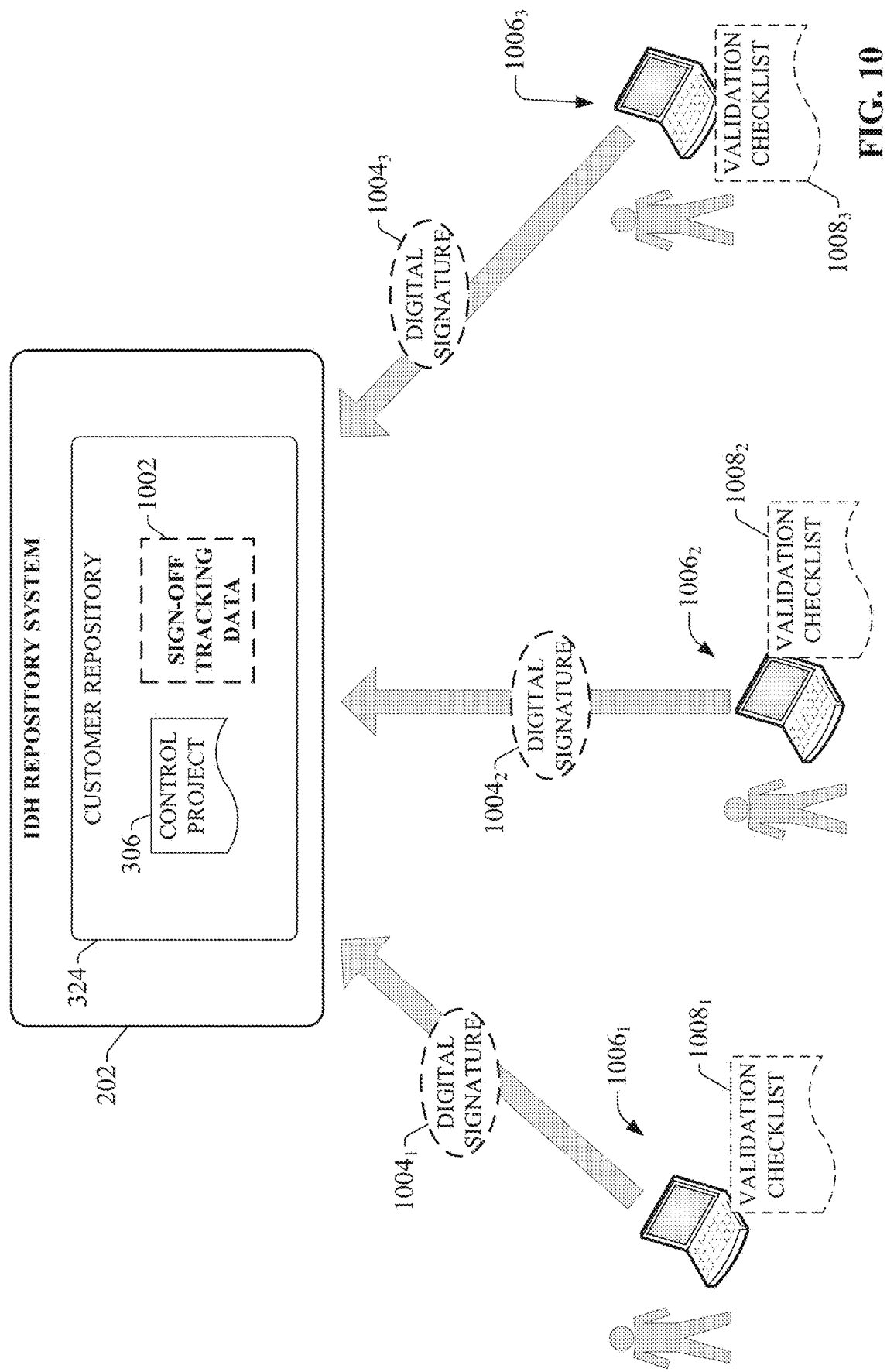
FIG. 10 is a diagram illustrating collection of digital signatures by an IDH repository system.

In some embodiments, the IDH repository system 202 can also manage digital or electronic signatures that are tied to the validation checklists generated by the project documentation component 212. FIG. 10 is a diagram illustrating collection of digital signatures by the repository system 202 according to one or more embodiments. In this example, digital validation checklists 1008 has been delivered to client devices 1006 associated with personnel who are required to sign off on aspects of the control project 302. The validation checklists are interactive, such that each user can submit a digital signature 1004 for respective items on the validation checklist 1008 via interaction with the checklist. At the repository system 202, the digital signatures 1004 are received from the client devices, and project documentation component 212 maintains a record of the received signatures 1004 as sign-off tracking data 1002, which tracks which signatures 1004 have been received for each item on the validation checklist, and from whom the signatures 1004 have been received. This sign-off tracking data 1002 can subsequently be referenced for auditing purposes. In some embodiments, the repository system can be configured to deploy components of control project 306 (e.g., control code, HMI visualization applications, device configurations, etc.) to their corresponding field devices only after all necessary signatures 1004 indicating approval of those components have been received.

Figure 11:
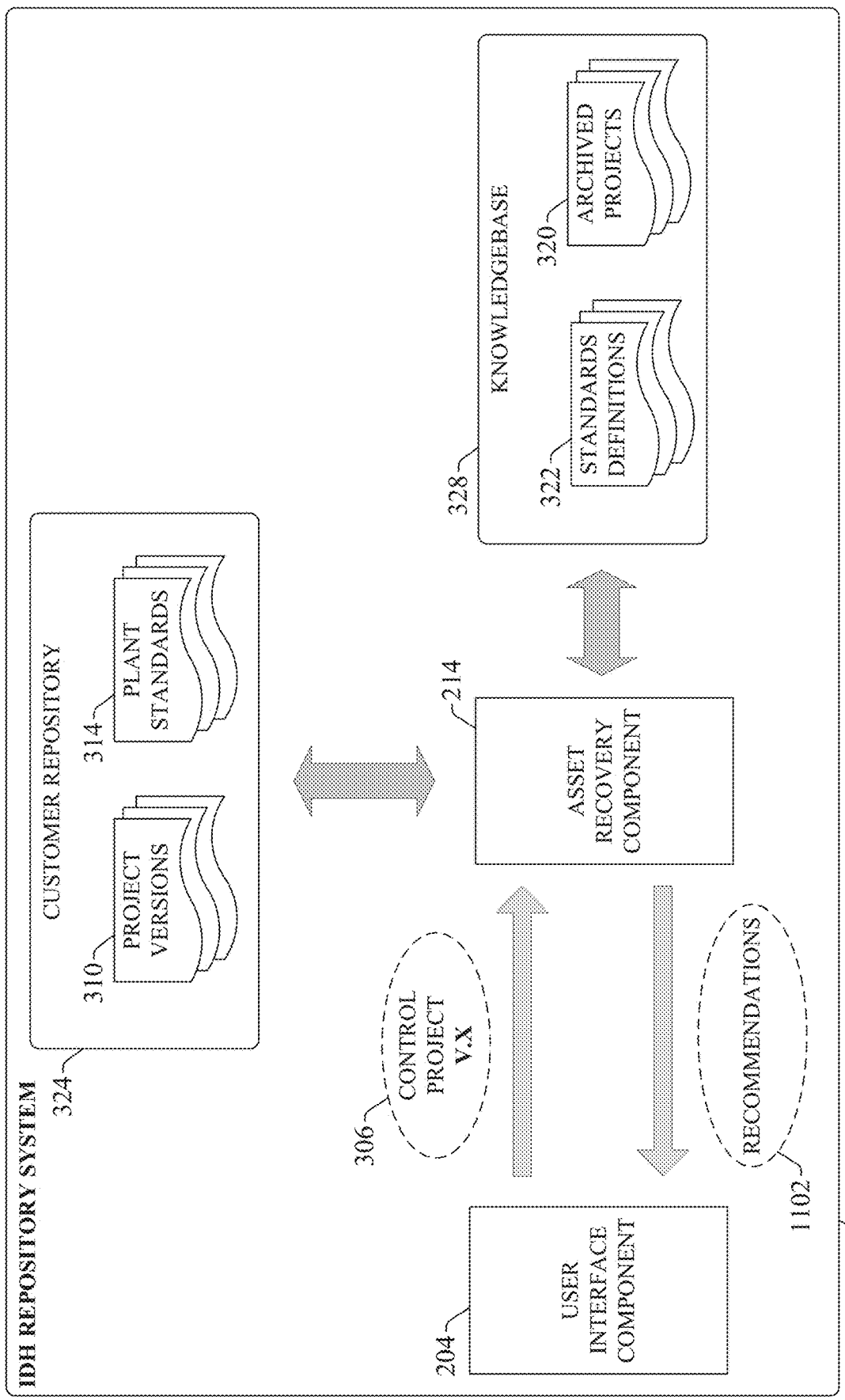
FIG. 11 is a diagram illustrating submission of a new version of a control project for archival with older project versions.

IDH repository system 202 can also be used to archive past and current versions of the control project 306 and perform related version control and analysis functions. FIG. 11 is a diagram illustrating submission of a new version of control project 306 for archival with older project versions 310. In this example, the customer repository 324 archives past and current versions of the control project 306 as project versions 310. New versions of the control project 306 may be the result of modification to the control code, device firmware upgrades, additions to the control project 306 to accommodate new equipment, or other such changes to the control project. Archiving current and past versions of the control project 306 allows project development to be journaled within the repository system, and also allows any version of the control project 306 to be selected and deployed to the automation system as part of a disaster recovery procedure in the event that portions of the control project executing on the plant floor are lost and must be reinstalled, or if a new version of the control project 306 is not performing as required and a previous version must be re deployed. These functions can be managed by the repository system's asset recovery component 214.

In some embodiments, when a new version of control project 306 is submitted to the IDH repository system 202, the asset recovery component 214 can analyze the new version of the control project 306 with one or more previous versions 310 stored in the customer repository 324 and identify any potential new problems introduced in the new version relative to previous versions. Asset recovery component 214 may also apply customer-defined project analysis queries defined in the plant standards to the new version of the control project 306, as well as generalized project analysis queries defined as part of standards definitions 322 stored in the repository system's knowledgebase 328. These generalized and custom queries can be configured to identify specific design scenarios within the control project 306 that may lead to non-optimal control performance Asset recovery component 214 can render results of these project analytics as recommendations 1102.

In some embodiments, if an upgrade to a software application used by the control project 306 is available, customers may submit a current version of their control project (e.g., v.X) for upgrade to the newest version (e.g., v.Y). Asset recovery component 214 can also be configured to manage these upgrades. When a control project 306 to be upgraded is uploaded to the repository system 202 by a customer, asset recovery component 214 can analyze the control project 306 and perform the upgrade, performing any file conversions necessary to perform the v.X-to-v.Y upgrade. As part of this upgrade, asset recovery component 214 can also apply any of the project analytics discussed above (e.g., analytics similar to that applied by the project analysis component 210) to the uploaded control project 306. Upon completion of the upgrade, asset recovery component 214 can provide the upgraded control project files together with recommendations (e.g., project recommendations 702 described above) for improving operation of the control system or optimizing resource utilization by the control project 306 itself.

By allowing multiple versions of a control project to be archived in the customer repository 324 and deployed to the plant floor devices on demand, the repository system's storage and deployment features can allow users to deploy different versions of the same control project at different industrial facilities. This functionality can be useful to system integrators or other control solution providers who serve multiple customers having different sets of industrial assets on which the control project 306 will be executed, since different versions of the control project 306 may be necessary for execution at different customer sites.

Asset recovery component 214 can also implement cybersecurity features that verify an authenticity of a submitted control project 306 to ensure that the project 306 was developed and submitted by a reliable source. This authentication can be based in part on program code similarity. For example, when a new version of a control project 306 is submitted, asset recovery component 214 can compare this new version with one or more previous project versions 310 previously submitted to and archived by the repository system 202. If this comparison yields a determination that the new version is drastically different from previous versions 310 uploaded by the same customer entity, the asset recovery component 214 can flag the newly submitted control project 305 and initiate delivery of a security notification to trusted personnel associated with the customer requesting that the new version be reviewed and authorized. In some embodiments, asset recovery component 214 may also prevent deployment of the new version of the control project unless authorization from a trusted person is received. Asset recovery component 214 may also authentication new control projects 306 based on adherence to or deviation from the customer's known coding style and standards, which can be recorded in the customer repository 324 as part of plant standards 314.

Figure 12:
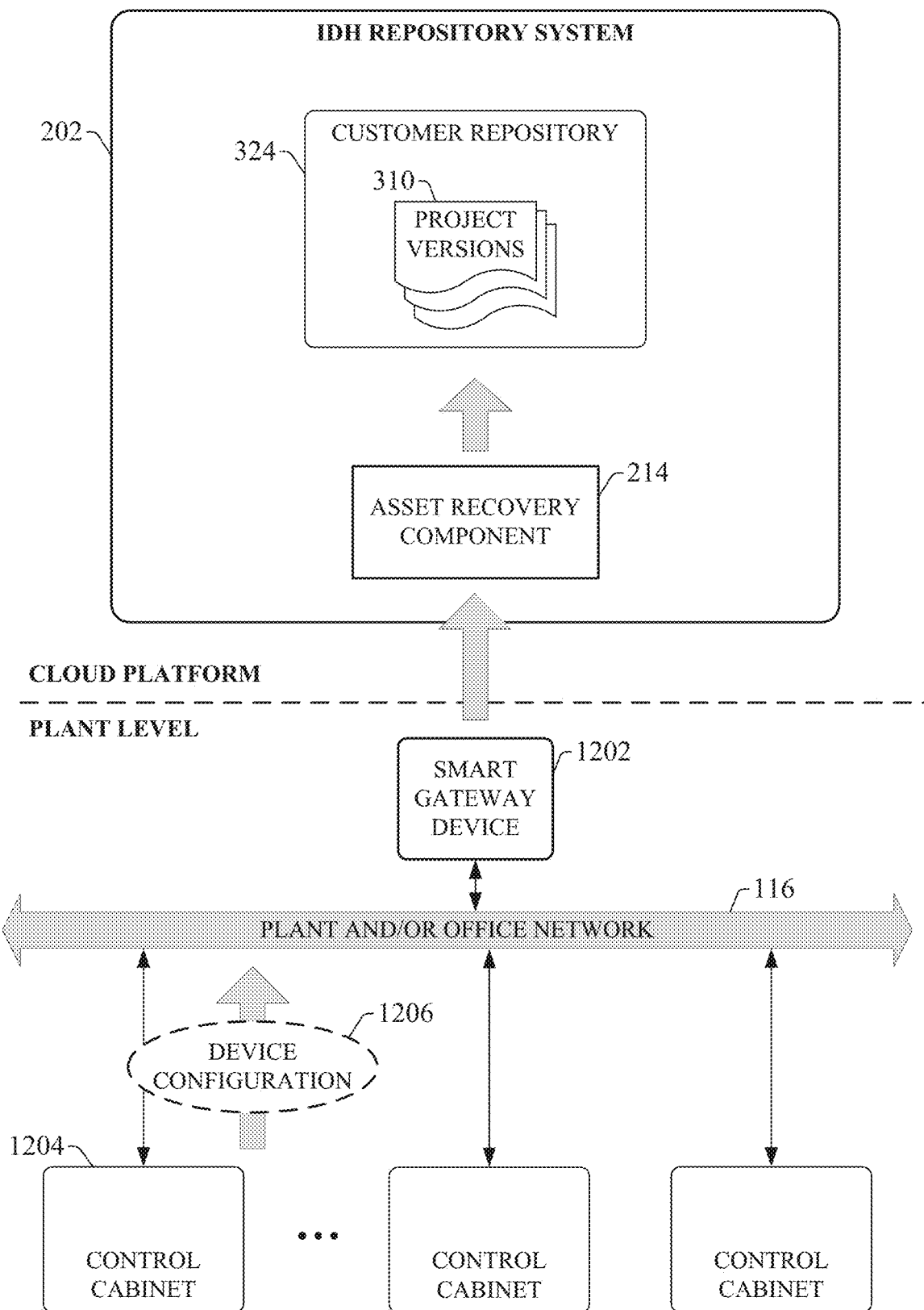
FIG. 12 is a diagram illustrating intelligent backup of device configuration data to an IDH repository system.

Some embodiments of the IDH repository system 202 can also offer "backup as a service" for industrial asset configuration files or project files. FIG. 12 is a diagram illustrating intelligent backup of device configuration data 1206 to the IDH repository system 202. In some embodiments, software agents on-premise at the customer facility can look for supported industrial devices or assets (e.g., assets installed in control cabinets 1204) and initiate backups of the device configuration data 1206 installed on those devices. Device configuration data 1206 can include control code, configuration parameter settings, HMI applications, or other such control project data. In some embodiments, these software agents can be deployed and managed by a smart gateway device 1202 that reside on the plant network 166 and serves as a gateway or edge device that connects the industrial assets on the plant floor with the IDH repository system 202. In such embodiments, smart gateway device 1202 can deliver copies of device configuration data 1206 to the IDH repository system 202, and the asset recovery component 214 can store a backup of the device configuration data 1206 in the customer repository 324 as part of the stored project versions 310 for that customer.

Project backups can also be configured to be version-driven, such that the asset recovery component 214 uploads and archives changes to the control project in response to detecting a modification to the project on the plant floor (e.g., when a plant engineer modifies the ladder logic on an industrial controller via a direct connection to the controller). In still another scenario, backups for asset configuration files can be scheduled, such that the asset recovery component 214 retrieves and archives the current device configurations at defined times or according to a defined backup frequency.

Figure 13:
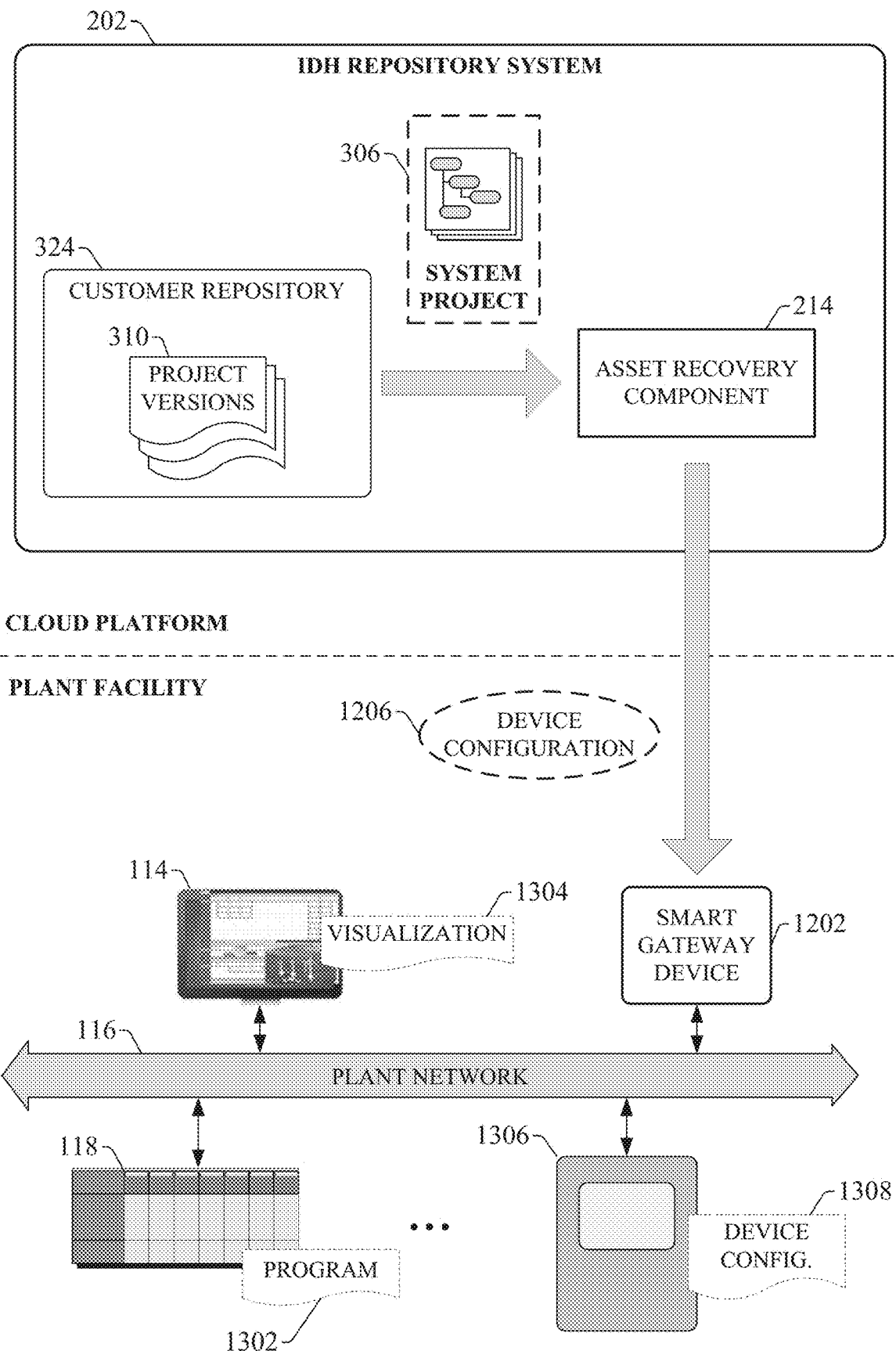
FIG. 13 is a diagram illustrating an example restore process that can be initiated by through an IDH repository system.

With backups of the control project archived in the customer repository 324, device configurations to be restored from the last known backup in the event of a disaster. FIG. 13 is a diagram illustrating an example restore process that can be initiated by through the IDH repository system 202. In this example, an industrial environment includes one or more industrial controllers 118, HMIs 114, motor drives 1306, servers running higher level applications (e.g., ERP, MES, etc.), and other such industrial assets. These industrial assets are connected to the plant network 116 (e.g., a common industrial protocol network, an Ethernet/IP network, etc.) that facilitates data exchange between industrial devices on the plant floor. Plant network 116 may be a wired or a wireless network.

When a control project 306 is to be deployed during a restore operation, the project 306 can be commissioned to the plant facility via a secure connection between the smart gateway device 1202 and the cloud platform on which the repository system 202 resides. Asset recovery component 214 can translate the archived control project 306 to one or more appropriate executable files—control program files 1302, visualization applications 1304, device configuration files 1308, system configuration file, etc.—and deploy these files to the appropriate devices in the plant facility to facilitate deployment or restore of the control project.

This backup and restore architecture can also be used to upload system configurations from one facility and deploy them at another facility, or to upload configurations from an OEM and deploy them to a customer site. As part of the deployment procedure, the asset recovery component 214 can first poll the target devices on the plant floor to verify that those devices are capable of supporting and executing the control project files that are being deployed.

By affording a common storage and analysis platform on which multiple customers can upload and assess their control solutions, the IDH repository system 202 can accelerate modern automation development by creating an open ecosystem for engineers to share and reuse code from private and public repositories, allowing them to easily manage and collaborate with their own content and from others they trust to accelerate core control development.

In addition to the features discussed above, embodiments of the IDH repository system 202 can support a variety of digital engineering tools that reduce the cost and complexity to acquire, configure, and maintain a digital twin of customers' OT environments, allowing simulation through a scalable, on-demand cloud workspace. In some embodiments, a digital twin of an enterprise's automation system, or a digital twin of a larger portion of an industrial environment, can be built using the asset models 312 stored on the customer repository 324. As noted above, these asset models 312 are digital representation of industrial devices or assets in use at a plant facility. An asset model 312 corresponding to a given industrial asset can define functional specifications for the asset, including, for example, functions the asset is defined to carry out, available I/O, memory or processing capacity, supported functionality, operating constraints, etc.); physical dimensions of the asset; a visual representation of the asset; physical, kinematic, or mechatronic properties that determine how the virtualized asset behaves within a simulation environment (including frictions, inertias, degrees of movement, etc.); three-dimensional animation properties of the asset, or other such asset information. Since the behavior of some industrial assets is a function of user-defined configuration parameters or control routines, asset models 312 for some types of industrial assets can also record application-specific device configuration parameters or control routines defined for the physical assets by a system designer.

Figure 14:
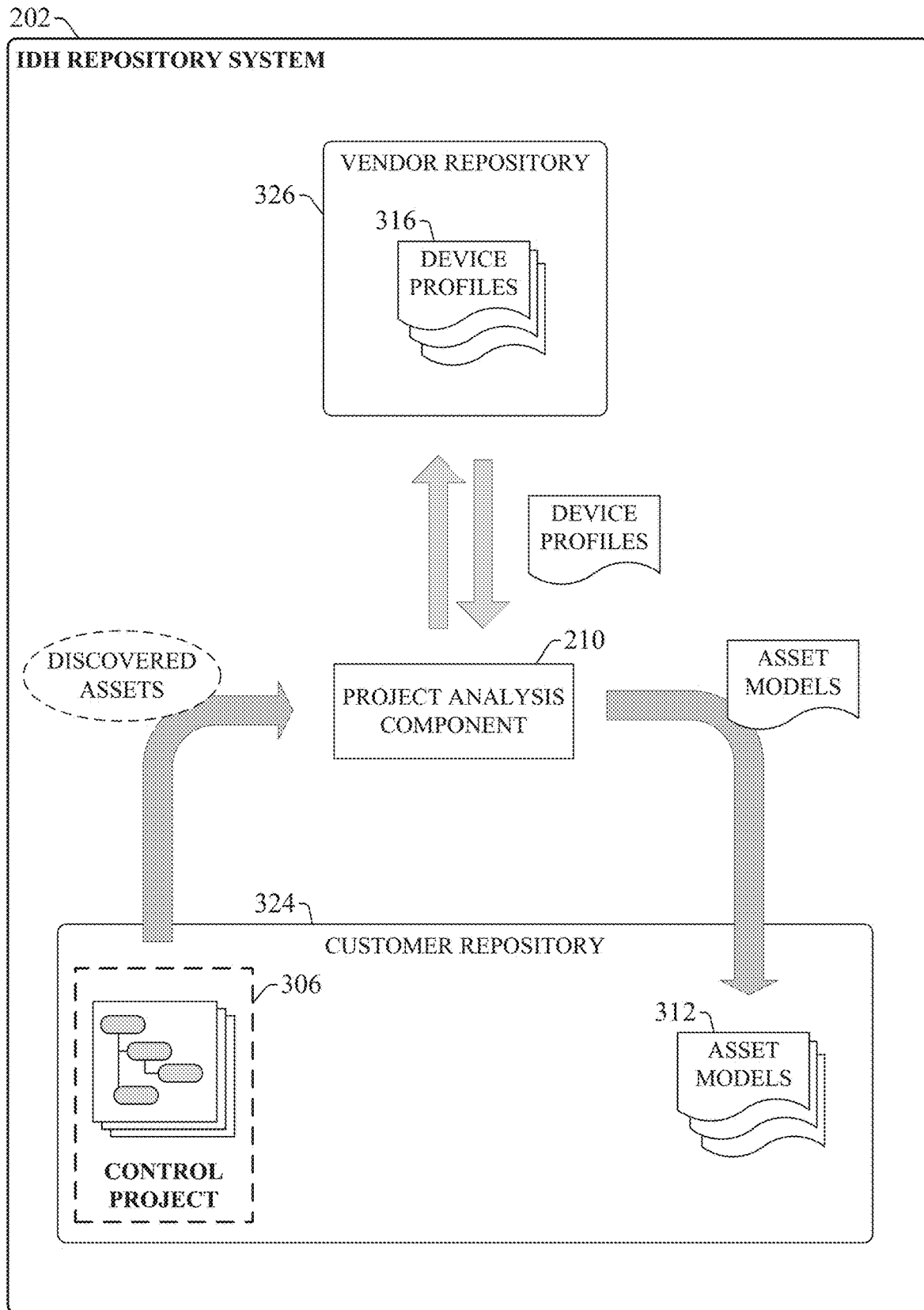
FIG. 14 is a diagram illustrating creation and storage of asset models based on device profiles submitted to a repository system by an equipment vendor.

At least some of the asset models 312 stored in the customer repository for a given customer can be created based on vendor-specific device profiles 316 made available on one or more vendor repositories 326. FIG. 14 is a diagram illustrating creation and storage of asset models 312 based on device profiles 316 submitted to the repository system 202 by an equipment vendor. As noted above, project analysis component 210 can identify industrial devices, assets, or equipment used or referenced in a customer's control project 306. This can include devices or assets on which portions of the control project 306 will execute (e.g., industrial controllers, motor drives, safety relays, etc.) as well as assets inferred to be connected to, or that otherwise have a relationship to, these primary control assets. For example, analysis of a configuration and programming file for an industrial controller can be examined by the project analysis component 210 to not only determine how the controller itself is configured and programmed, but also to identify devices or assets that are connected to the controller's I/O (e.g., based on analysis of the I/O module configuration data included as part of the controller's configuration and programming file, or data tags defined in the file's tag database). In another example, some industrial assets that make up the controlled automation system may also be inferred based on analysis of an HMI application included in the control project 306 (e.g., based on data tags defined in the HMI application, or definitions of graphical representations of industrial assets). In this way, analysis of the control project 306 can yield information of the larger automation system topology beyond the primary monitoring and control devices. Example industrial assets that can be discovered through analysis of the control project 306 can include, but are not limited to, industrial controllers, input and output devices connected to the industrial controllers' I/O, sensors, telemetry devices, machines, control panels, HMI terminals, safety relays or other safety devices, industrial robots, or other such industrial assets.

With this knowledge of industrial assets that make up the automation system, project analysis component 210 can determine, for each discovered industrial asset, whether a digital device profile 316 is available for the asset on the appropriate vendor repository 326 corresponding to the provider or seller of the asset. Device profiles 316 can be submitted to the repository system 202 by product vendors to support their products, and the system 202 makes these device profiles 316 available to asset owners for use in digital engineering, simulation, and testing. Project analysis component 210 can retrieve device profiles 316 corresponding to industrial assets being used or referenced in the control project 306 and store the profiles 316 in the customer repository 324 as asset models 312.

Since some device profiles 315 may represent generic digital representations of their corresponding physical assets—that is, representations that do not take into account application-specific configuration parameters or programming applied to the physical assets by the asset owners—project analysis component 210 can convert these generic device profiles 316 to customized asset models 312 representing the customer's uniquely configured assets. This customization can be based on configuration parameters or programming obtained from the control project 306 itself or from on the project telemetry data 602 generated for the project 306.

Figure 15:
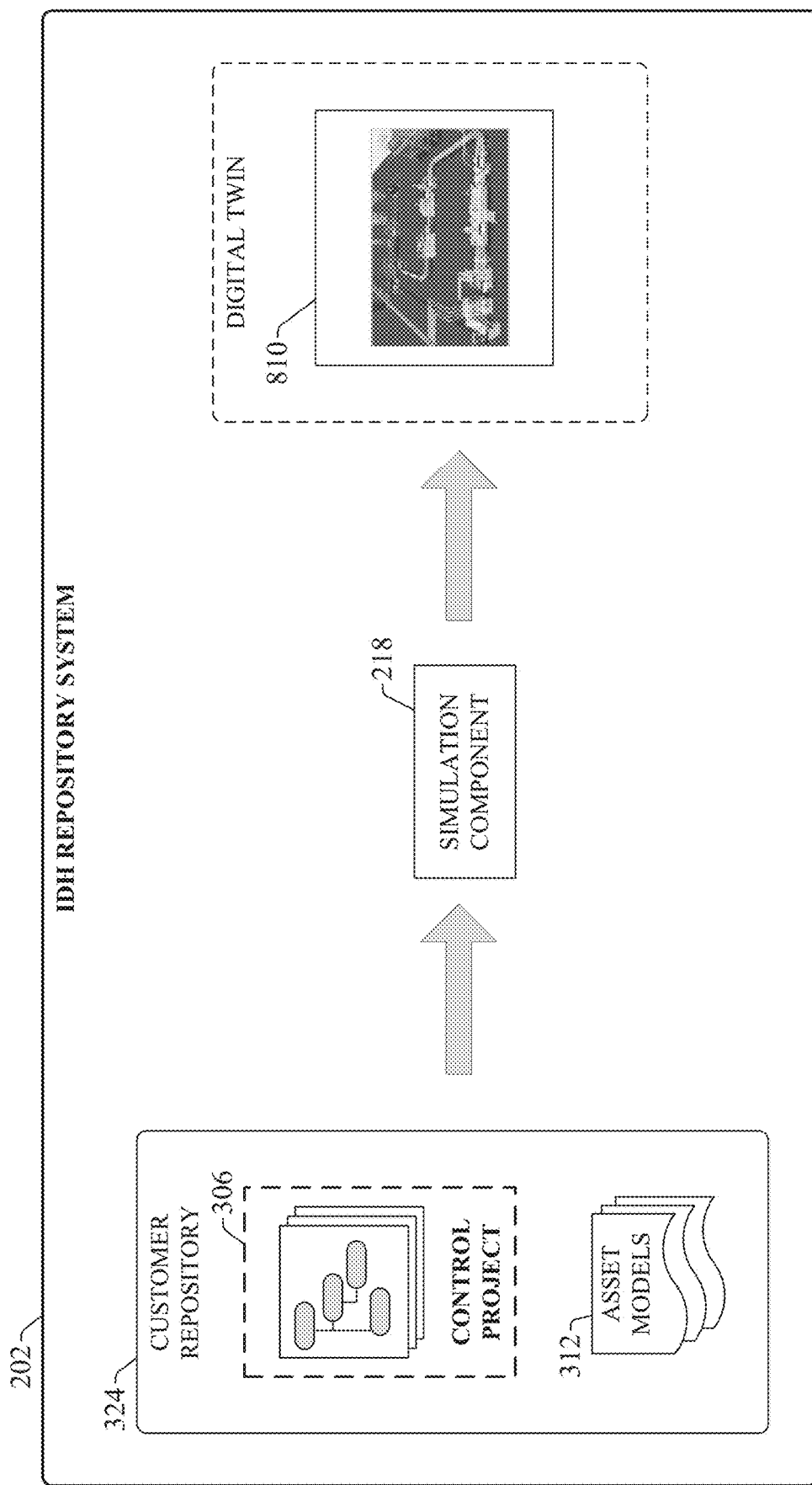
FIG. 15 is a diagram illustrating generation of a digital twin of an automation system or industrial environment based on a control project and corresponding asset models.

The resulting asset models 312 can be used as the basis for a digital twin 810 of the automation system, which can be used to simulate and test the control project 306, as discussed above in connection with FIG. 8. FIG. 15 is a diagram illustrating generation of a digital twin 810 of an automation system or industrial environment based on control project 306 and corresponding asset models 312. In some embodiments, simulation component 218 can aggregate the asset models 312 into a digital twin 810 based on learned or defined relationships between the corresponding physical assets represented by the asset models 312. The scope of the digital twin 810 can encompass a single automation system, a production line, an area within an industrial facility comprising multiple automation systems, or an entire industrial facility comprising multiple production areas and automation systems. In some scenarios, the digital twin 810 can be partially generated automatically by the simulation component 218 based on the control project 306 and the asset models 312, and digital design tools provided by the simulation component 218 can allow a user to modify or expand the digital twin 810 to improve the fidelity of the digital twin as needed. In some embodiments, a specialized digital twin definition language can be used for defining digital twins 810 for control simulation.

As described above in connection with FIG. 8, the digital twin 810 can be used to model interactions with a controller emulator to predict how control programming defined by the control project 306 will interact with a virtual plant. The digital twin 810 can also be refined as the design project progresses through the stages of commissioning, optimization, migration, and operator training.

Figure 16:
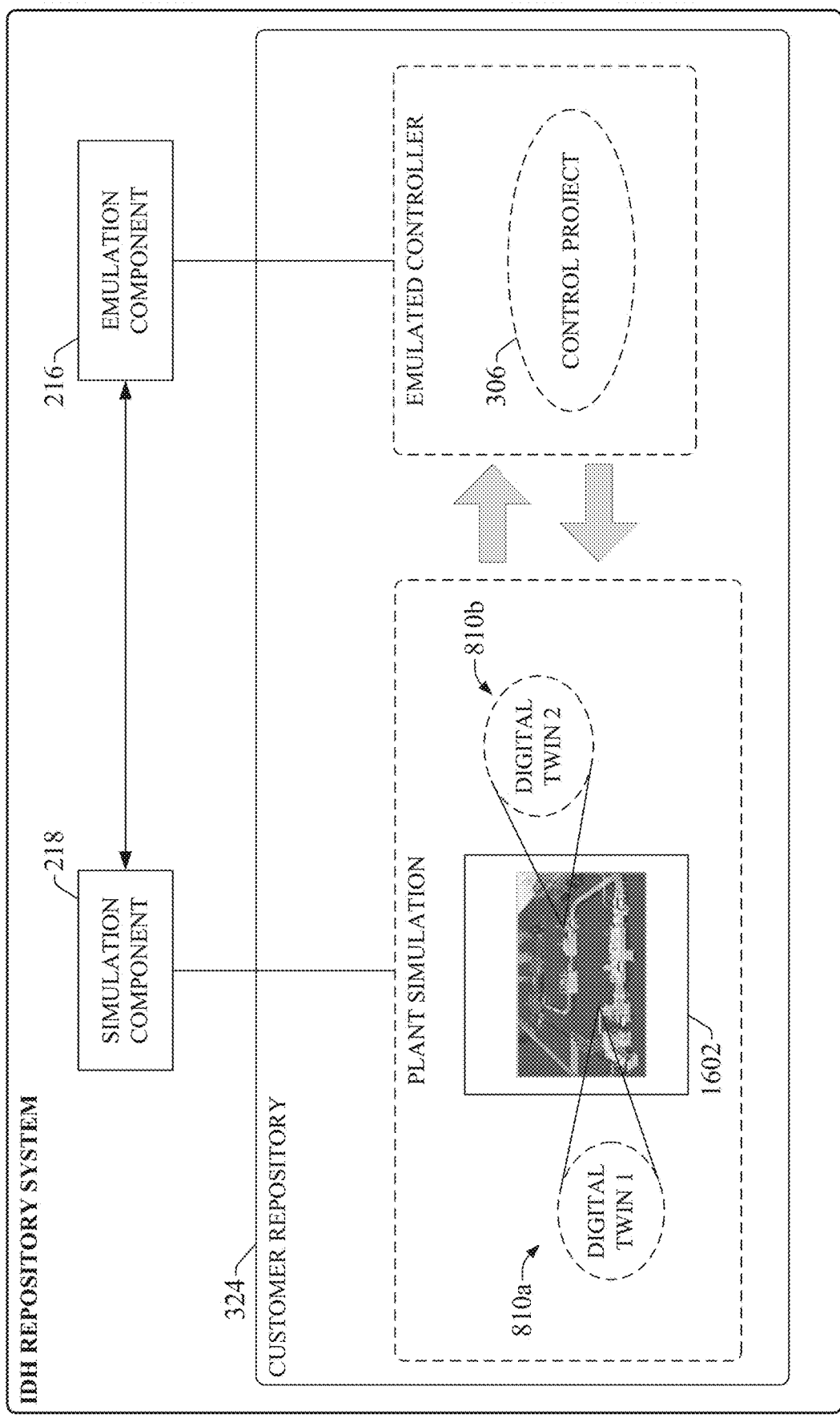
FIG. 16 is a diagram illustrating a simulation scenario that utilizes a virtualized plant comprising multiple digital twins.

FIG. 16 is a diagram illustrating a simulation scenario that utilizes a virtualized plant 1602 comprising multiple digital twins 810. Virtualized plant 1602 may represent a single automation system having multiple components that are each represented by a digital twin 810, or may represent a larger plant context in which different automation systems or industrial assets within the plant are represented by respective digital twins 810. Data exchanges between the virtualized plant 1602 (simulated by simulation component 218) and the emulated control project 306 are similar to those described above in connection with FIG. 8. In general, simulation component 218 supports creation of a virtualized plant 1602 using digital twins 810 having different degrees of fidelity or complexity depending on the needs of the simulation, where the fidelity of the digital twin 810 depends on the desired outcome or required level of accuracy. For example, a higher fidelity digital twin 810 (e.g., digital twin 810a) can be used for an automation system or industrial asset that is the focus of the simulation, while digital twins of lower fidelity (e.g., digital twin 810b) can be used to model automation systems or industrial contexts that are outside the system of focus but which must be modeled in order to accurately simulate operation of the main system. In an example of such a configuration, a higher fidelity digital twin 810 may be used to model a machining station for which control project 306 is being designed, while lower fidelity digital twins 810 may be used to model systems that are upstream from the machining station and which provide materials to the machining station. This aggregate virtual plant 1602 can yield an accurate simulation of the machining station—taking into account material feed rates—while reducing the amount of modeling effort that would otherwise have to be applied in order to model the entire system relative to modeling the entire system with high fidelity digital twins 810. In another example, higher fidelity digital twins 810 can also be used to model actual automation systems while lower fidelity digital twins 810 can be used for simpler functions such as state tracking analysis.

Figure 17:
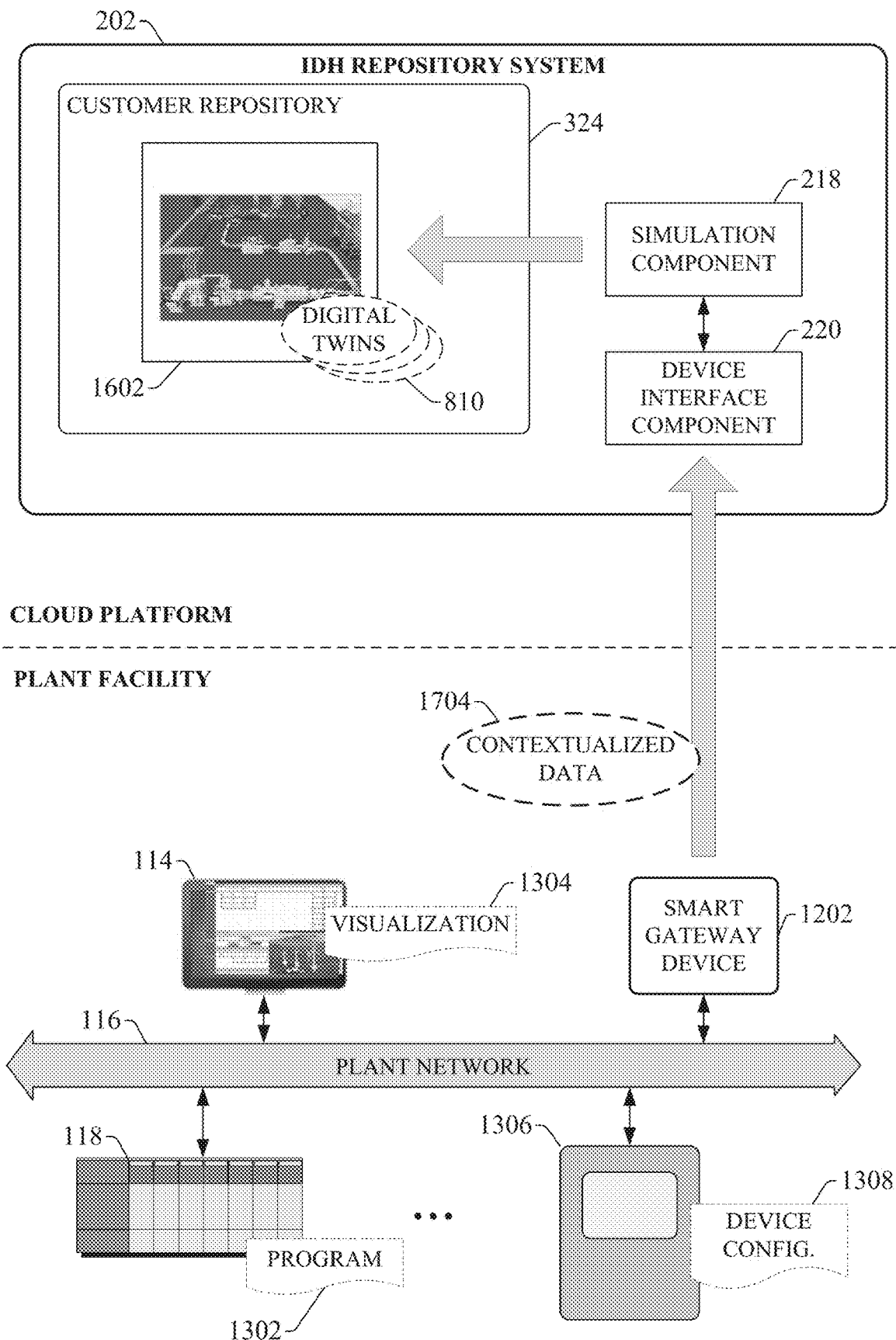
FIG. 17 is a diagram illustrating refinement of virtual plant using live data generated by automation system devices and collected by an IDH repository system.

After commissioning of the control project (as described above in connection with FIG. 13), the fidelity of the virtual plant 1602 can be improved over time based on actual performance data. FIG. 17 is a diagram illustrating refinement of virtual plant 1602 using live data 1704 generated by the automation system devices and collected by the IDH repository system 202. In this example, the repository system's device interface component 220 interfaces with the industrial system via smart gateway device 1202, which resides on a common network with industrial devices that make up the automation system. During automation system operation, smart gateway device 1202 collects status and operational data from devices that make up the automation system, including data read from data tags on one or more industrial controllers. In some embodiments, smart gateway device 1202 can contextualize the collected data prior to delivering the data to the repository system 202 and deliver the processed data to the repository system 202 as contextualized data 1704. This contextualization can include time-stamping that data, as well as normalizing or otherwise formatting the collected data for analysis by the simulation component 218 relative to the virtual plant 1602. Simulation component 218 can compare simulated expected behaviors of the virtual plant 1602 with actual behaviors determined from the contextualized data 1704 and update the virtualized plant 1602—including modifying any of the digital twins 810 as needed—to increase the fidelity of the virtualized plant 1602 in view of actual monitored behavior of the automation system.

Figure 18:
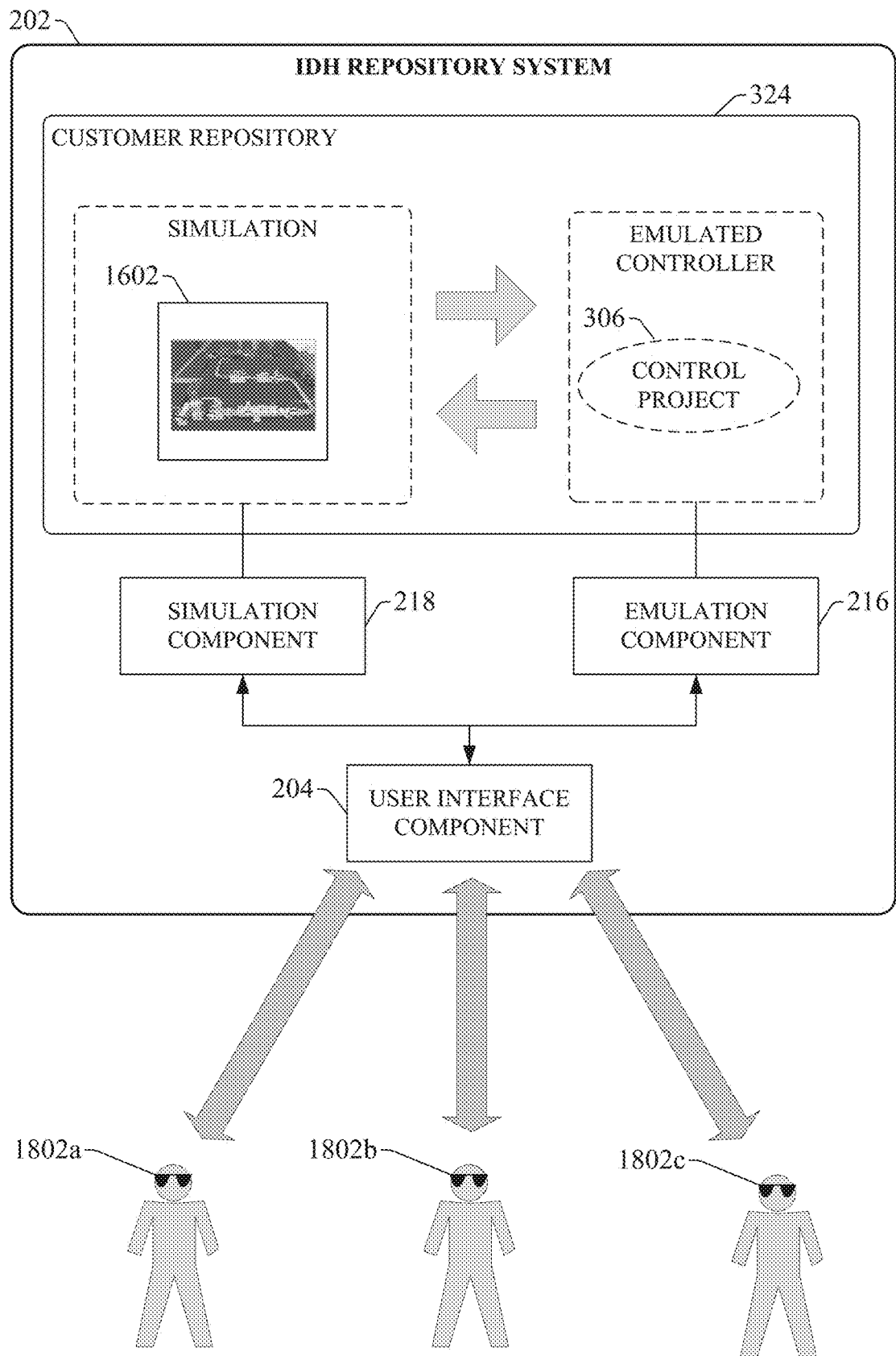
FIG. 18 is a diagram illustrating multi-user interaction with a virtualized plant.

The IDH repository system 202 can also support a multi-user simulation environment in which multiple users can interact with the virtual plant 1602, either during the design phase prior to deployment of the control project 306 or after the project 306 has been commissioned. FIG. 18 is a diagram illustrating multi-user interaction with the virtualized plant 1602. In this example, multiple users are able to interface with the repository system 202, via user interface component 204, using wearable appliances 1802 that render AR/VR presentations to the wearers of the appliances 1802. In some embodiments, user interface component 204 may be configured to verify an authorization of a wearable appliance 1802 to access the IDH repository system 202—and in particular to access the virtualized plant 1602 or other information stored on the wearer's customer repository 324—prior to allowing VR presentations to be delivered to the wearable appliance 1802. User interface component 204 may authenticate the wearable appliance 1802 or its owner using password verification, biometric identification (e.g., retinal scan information collected from the user by the wearable appliance 1802 and submitted to the user interface component 204), cross-referencing an identifier of the wearable appliance 1802 with a set of known authorized devices permitted to access the customer repository 324, or other such verification techniques. Although FIG. 18 illustrates access to the customer repository and viewing of the virtualized plant 1602 using wearable AR/VR appliances 1802, other types of client devices, including hand-held devices, can also be used to access the virtual simulation.

User interface component 204 has an associated virtual rendering component configured to generate virtual reality presentation data based on simulation of the virtualized plant 1602 under control of the emulated control project 306 for delivery to and execution on the authorized wearable appliances 1802. The presentation data, when received and executed by a wearable appliance 1802, renders an interactive three-dimensional (3D) virtual reality presentation of the virtualized plant 1602 on the wearable appliance's display. In general, the virtualized plant 1602—comprising one or more digital twins 810 as discussed above—can define a visual representation of the physical layout of the industrial facility or area represented by the virtualized plant 1602. For example, the virtualized plant 1602 can define graphical representations of the industrial assets—including machines, conveyors, control cabinets, and/or industrial devices—located within the plant, as well as the physical relationships between these industrial assets. For each industrial asset, the virtualized plant 1602 (e.g., the digital twin 810 representing the industrial asset) can define physical dimensions and colors for the asset, as well as any animation supported by the graphical representation (e.g., color change animations, position animations that reflect movement of the asset, etc.). The virtualized plant 1602 also define the physical relationships between the industrial assets, including relative positions and orientations of the assets on the plant floor, conduit or plumbing that runs between the assets, and other physical definitions.

Using wearable appliances 1802, users can submit interaction data to the user interface component 204 representing the users' virtual interactions with the virtualized plant 1602. These virtual interactions can include, for example, changing the user's viewing perspective within the virtual plant, virtually selecting or interacting with an industrial asset or device within the virtual plant, or other such interactions. Based on this interaction data, user interface component 204 can update the wearer's view of the virtualized plant 1602 to reflect the user's current virtual viewing perspective, to render simulated behaviors of industrial assets within the user's current virtual field of view, to render simulation data relating to a currently viewed asset within the wearer's field of view (e.g., status or operating statistics), etc.

This architecture can allow multiple users to review aspects of the control project 306 in operation within a virtualized version of the physical environment in which the project 306 will operate. This review can be performed prior to commissioning of the control project 306. In an example scenario, control code defined as part of the control project 306 can be reviewed and approved by designated personnel within a project approval chain. This virtual code review process can be tied to in-house code validation requirements, in which multiple designated reviewers must review and sign off on new control code before deployment of the code in the field. Implementation of this virtual code review can be driven by user-defined review policies defined and stored on the customer repository 324.

In some embodiments, the IDH repository system 202 can prevent deployment of a control project 306 until all appropriate approvals have been received by all designated reviewers defined by the code review policies. For example, the defined review policies for a given industrial enterprise may define that the plant's safety manager and lead plant engineer must approve of new control code before the new code is put into service on the plant floor. Accordingly, the simulation component 218 and emulation component 216 can simulate operation of industrial assets (as defined by virtualized plant 1602) under control of this new control code, as described above in connection with FIGS. 8 and 18, and user interface component 204 can allow the reviewers to observe this simulated operation either individually or simultaneously. If satisfied with operation of the new control code, each reviewer may then submit approval of the new code (e.g., in the form of digital signatures, as described above in connection with FIG. 10) to the system 202 via user interface component 204, and these approvals are stored in association with the control project 306 on the customer repository 324 assigned to the plant. IDH repository system 202 can prevent commissioning of the control project 306 (e.g., the commissioning procedure described above in connection with FIG. 13) until all required approvals defined by the in-house code review policy have been received.

In another example, the multi-user simulation environment can be used to perform a virtual walk-through of a proposed automation system design (e.g., a mechanical system and associated control system) being proposed by an OEM for a customer. In such scenarios, the OEM may use the design tools supported by the repository system 202 to generate a virtualized plant 1602 representing the proposed automation system and corresponding control project 306 for monitoring and controlling the automation system. Prior to beginning construction of the automation system, the OEM and personnel from the plant for which the system is being built can simultaneously interface with the virtualized plant 1602 and observe simulated operation of the proposed automation system within the virtual environment, affording the customer an opportunity to provide feedback or propose design changes before construction of the automation system begins.

Multi-user simulation can also be used in connection with operator training. For example, a trainee operator can interface with the virtualized environment together with a trainer, and different operator training scenarios can be simulated by the repository system 202 within the virtualized plant environment. In such embodiments, various training scenarios (e.g., alarm or downtime situations requiring operator intervention) can be defined in the customer repository 324, and the simulation component 218 can be configured to virtually enact these scenarios within the simulated VR environment. The simultaneous multi-user simulation can allow the trainer to provide guidance and feedback within the virtualized environment.

The virtual environment can also be used to perform virtual validation of maintenance or upgrade actions. For example, a maintenance person may submit a proposed change to controller code (e.g., as a new project version, as discussed above in connection with FIG. 11), and others can access the repository system 202 to validate the proposed change before allowing the modified code to be commissioned to the industrial controller for execution. In some embodiments, simulation component 218 can also be configured to perform predictive (or "what if") analysis on the modified code relative to the virtualized plant 1602 to predict changes in operation of the automation system that will result from commissioning the modified code, and generate recommendations for further code modifications based on these predicted outcomes. These recommendations can be generated based on similar criteria used to assess new control projects (e.g., recommendations 702), including deviation from defined project standards, improper control code formatting, impact of the code modification the lifecycle of a device, recognition of an unused device feature that may improve or simplify the control modification being implemented, or other such criteria.

Some embodiments of simulation component 218 can also be configured to test new or modified control projects 306 by simulating various stress test scenarios for the project. This can include simulating such scenarios as component failures (e.g., predicting the system's response to a valve failure), improper or insufficient operator workflows (e.g., predicting the outcome if an operator reacts too slowly to a critical event), or other such scenarios. Based on an inference of the system's response to such stress test scenarios, the simulation component 218 can generate recommendations for modifying the control project 306 in a manner that better anticipates fault scenarios and mitigates undesirable outcomes in response to such scenarios.

After deployment of the finalized project modification, simulation component 218 can perform a subsequent simulation that focuses on the modification to the project, such that the simulation compares actual machine response to the response previously expected to result from the code change. The user interface component 204 can highlight any such deviations in a VR or AR presentation delivered to a wearable appliance 1802. If the project or code modification only affects a limited portion of the plant (e.g., a single machine), simulation component 218 may perform only a partial simulation of the virtualized plant 1602 in this scenario, focusing the simulation only on the affected portion of the plant and any necessary context relating to the affected portion. Simulation component 218 can determine a scope for this follow-up simulation based on a determination of the scope of the control project modification.

Figure 19:
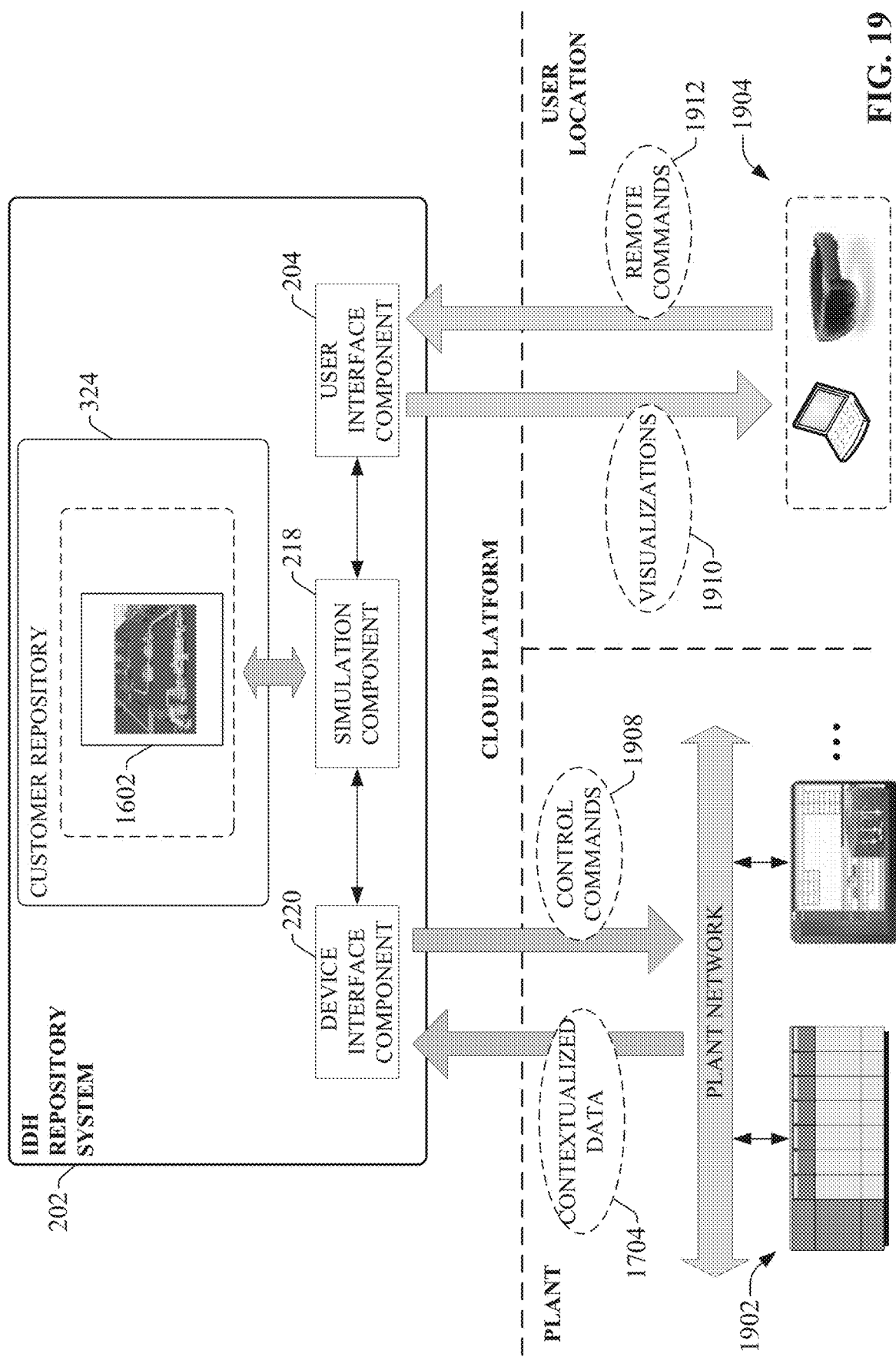
FIG. 19 is a diagram illustrating an architecture in which industrial assets operating within a plant environment can be remotely viewed and controlled via an IDH repository system.

In some embodiments, the IDH repository system 202 can also use the virtualized plant 1602 as a platform for remote interactions with the physical system. FIG. 19 is a diagram illustrating an architecture in which industrial assets 1902 operating within a plant environment can be remotely viewed and controlled via IDH repository system 202. After deployment of a control project 306, device interface component 220 can obtain contextualized data 1704 generated by the industrial assets 1902 during operation. This contextualized data 1704 can represented operational or status data for the industrial assets 1902 over time, and can be collected, contextualized, and streamed to the repository system 202 by a smart gateway device 1202, as described above in connection with FIG. 17. Based on this received contextualized data and the virtualized plant 1602 (comprising one or more digital twins 810), user interface component 204 can deliver substantially real-time visualizations 1910 of the industrial assets' operation to authorized client devices 1904 authorized to access the plant data. These visualizations can comprise, for example, VR presentations delivered to a wearable appliance and comprising an animated three-dimensional virtual environment defined by the virtualized plant 1602 and animated in accordance with the live contextualized data 1704. Animated behaviors of the various industrial assets 1902 in synchronization with their corresponding subsets of contextualized data 1704 can be defined by the digital twins 810 representing those assets and included in the virtualized plant 1602. The visualizations 1910 can also superimpose, within these VR environments, selected subsets of contextualized data 1704 on or near relevant asset representations (e.g., values representing speeds, flows, pressures, product throughput, etc.), as well as calculated or predicted performance metrics generated by simulation component 218. In some embodiments, as an alternative to alphanumeric or iconographic information overlays, visualizations 1910 can use chatbots to provide verbal audio feedback during simulation.

If the user is located within the plant facility and is viewing the industrial assets through a wearable appliance serving as client device 1904, the visualization 1910 may comprise an AR presentation that superimposes relevant status information and performance statistics within the user's field of view, such that the information is positioned within the field of view on or near the relevant industrial assets. As an alternative to VR or AR presentations, the visualizations 1910 may comprise two-dimensional presentations rendered on the display of another type of client device 1904.

In addition to permitting remote viewing of operation or performance statistics for the industrial assets 1902, repository system 202 can also permit regulated issuance of remote commands 1912 to the automation system from client devices 1904. Remote commands 1912 that can be initiated from the client devices 1904 via repository system 202 can include, but are not limited to, control setpoint modifications, instructions to start or stop a machine, instructions to change a current operating mode of a machine, or other such commands In the case of VR-based visualizations, these remote commands 1912 can be issued via the user's interaction with virtualized representations of the relevant industrial assets or their corresponding control panels (e.g., interaction with virtual control panel I/O device or HMIs). In response to receiving such remote commands 1912, simulation component 218 can either permit or deny issuance of the control command 1908 to the relevant plant floor devices based on a determination of whether the received command is permitted to be issued remotely given current circumstances. Factors that can be considered by the repository system 202 when decided whether to issue the requested control commend 1908 can include, for example, authorization credentials of the person issuing the remote command 1912, a determination of whether the target machinery is in a state that permits the control command 1908 to be issued safely, defined regulations regarding which types of control commands 1908 are permitted to be issued remotely (which may be stored on customer repository 324 as part of plant standards 314, or other such criteria.

Also, for some types of remote interactions—e.g., issuance of remote commands 1912 or remote deployment of control project changes—safety considerations may require that the repository system 202 confirm that the person attempting to perform the remote interaction via the cloud platform is in a location within the plant that affords clear line-of-sight visibility to the affected industrial assets 1902 before initiating the requested operation. For example, if a user is attempting to upgrade the firmware on an industrial device, implement a change to control programming, or issue a certain type of remote command 1912 via the repository system 202, the device interface may first correlate geolocation information for the user with known location information for the affected industrial asset, and will deny issuance of the requested interaction of the user's current location is not within a defined area relative to the asset that is known to permit clear visibility to the asset. Definitions of which types of remote interactions require clear line-of-sight to the asset can be stored as part of the plant standards 314, and may include remote operations having a certain degree of risk of causing machine damage or injury when implemented, and therefore should be visually monitored directly by the user while the interaction is being performed.

In some implementations, the IDH repository system 202 and its associated digital design tools and repositories described above can operate in conjunction with a cloud-based industrial information hub (IIH) system that serves as a multi-participant ecosystem for equipment owners, equipment vendors, and service providers to exchange information and services. The IIH system is driven by digital representations of industrial assets on the secure cloud platform and can leverage asset models 312 and other tools provided by the IDH repository system 202. While there is considerable potential value in digitizing industrial assets, obtaining the most benefit from digital models would require participation from multiple partners, including industrial customers, OEMs, equipment vendors, system integrators, etc.

Several challenges may be preventing customers or service providers from embracing wide-scale digital deployments. For example, existing industrial assets require ad hoc development effort to organize and collect data. Moreover, contextualization of data from multiple assets and data sources into actionable data can be difficult and costly. Security and data ownership concerns can also limit the collaboration between OEMs and their customers, particularly given that industrial customers often require a complete solution encompassing content from multiple OEMs. Also, most OEMs and system integrators have limited domain expertise for creating digital content, and there is a similar lack of expertise on the part of equipment owners to maintain solutions based on this digital content. Operational technology (OT) use cases need to be solved across both edge and cloud architectures with flexibility around the varying levels of connectivity. There are also strongly held beliefs regarding the separation of OT and IT technologies, including a perceived need for physical separation of OT from the IT network and cloud.

To address these and other issues, the IIH system described herein—in conjunction with tools and repositories supported by the IDH—can serve as a single industrial ecosystem platform where multiple participants can deliver repeatable and standardized services relevant to their core competencies. The IIH system is centered around the development of an ecosystem that creates and delivers value to users—including industrial enterprises, OEMs, system integrators, vendors, etc.—through the aggregation of digital content and domain expertise. The IIH system can serve as a trusted information broker between the ecosystem and the OT environments of plant facilities, and provides a platform for connecting assets, contextualizing asset data and providing secure access to the ecosystem. Additionally, the IIH system can provide tools and support to OEMs and other subject matter experts, allowing those experts to enable their digital assets for use in the ecosystem. The IIH system can reduce the cost and risks for digital modeling of industrial assets so that vendors, OEMs, and end users can collaborate to improve operational efficiency and asset performance.

Figure 20:
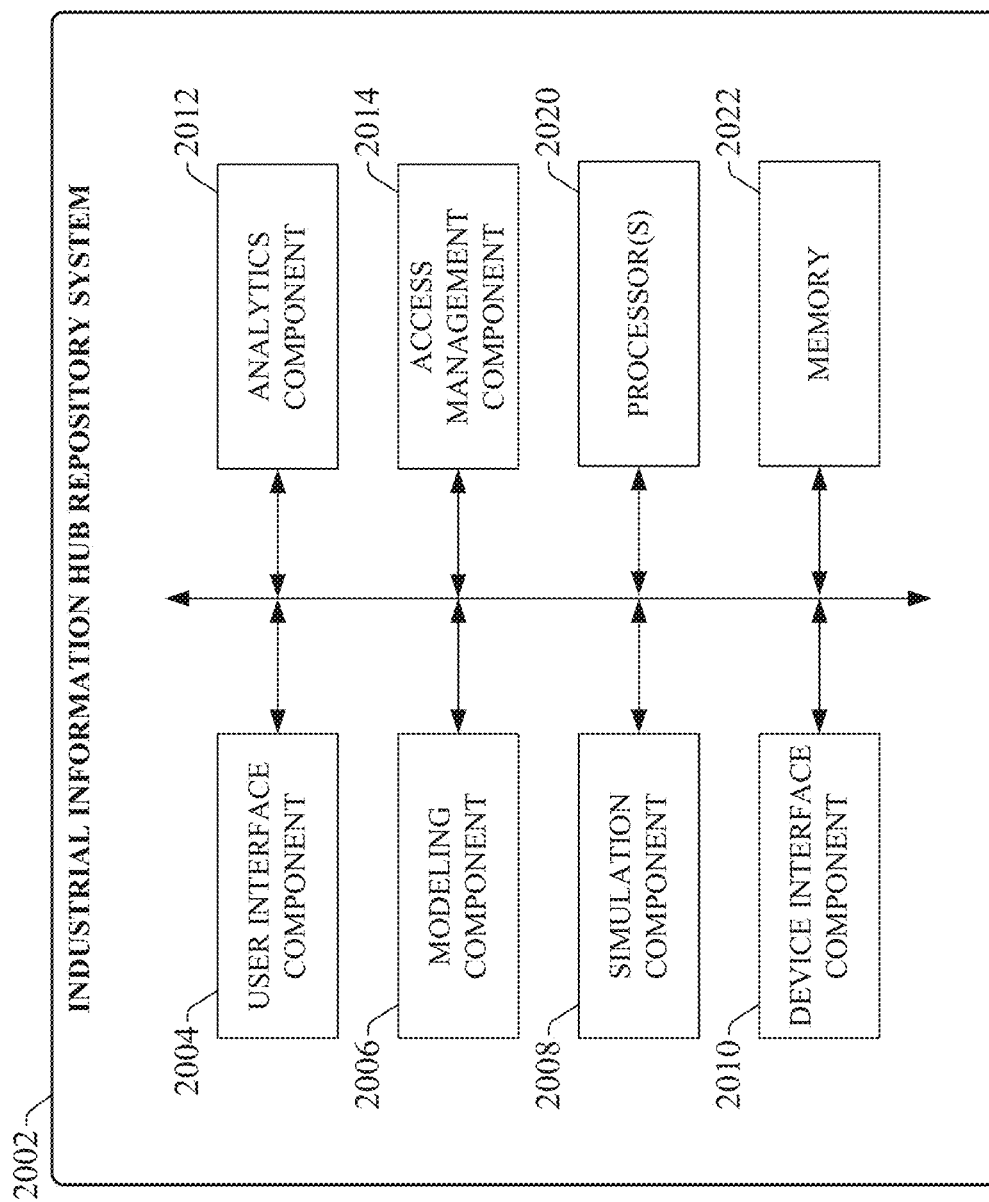
FIG. 20 is a block diagram of an example industrial information hub (IIH) repository system.

FIG. 20 is a block diagram of an example industrial information hub (IIH) system 2002 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IIH system 2002 can include a user interface component 2004, a modeling component 2006, a simulation component 2008, a device interface component 2010, an analytics component 2012, an access management component 2014, one or more processors 2020, and memory 2022. In various embodiments, one or more of the user interface component 2004, modeling component 2006, simulation component 2008, device interface component 2010, analytics component 2012, access management component 2014, the one or more processors 2020, and memory 2022 can be electrically and/or communicatively coupled to one another to perform one or more of the functions of the IIH system 2002. In some embodiments, components 2004, 2006, 2008, 2010, 2012, and 2014 can comprise software instructions stored on memory 2022 and executed by processor(s) 2020. IIH system 2002 may also interact with other hardware and/or software components not depicted in FIG. 20. For example, processor(s) 2020 may interact with one or more external user interface devices, such as a keyboard, a mouse, a display monitor, a touchscreen, or other such interface devices.

Like the IDH repository system 202, IIH system 2002 can be implemented on a cloud platform as a set of cloud-based services to facilitate access by a diverse range of users having business or technical relationships, including industrial equipment owners (e.g., industrial enterprise entities or plant owners), equipment vendors, original equipment manufacturers (OEMs), system integrators, or other such user entities. The cloud platform on which the system 2002 executes can be any infrastructure that allows shared computing services to be accessed and utilized by cloud-capable devices. The cloud platform can be a public cloud accessible via the Internet by devices having Internet connectivity and appropriate authorizations to utilize the IIH services. In some scenarios, the cloud platform can be provided by a cloud provider as a platform-as-a-service (PaaS), and the IIH system 2002 can reside and execute on the cloud platform as a cloud-based service. In some such configurations, access to the cloud platform and associated IIH services can be provided to customers as a subscription service by an owner of the IIH system 2002. Alternatively, the cloud platform can be a private cloud operated internally by the industrial enterprise (the owner of the plant facility). An example private cloud platform can comprise a set of servers hosting the IIH system 2002 and residing on a corporate network protected by a firewall.

User interface component 2004 can be configured to receive user input and to render output to the user in any suitable format (e.g., visual, audio, tactile, etc.). In some embodiments, user interface component 2004 can be configured to communicatively interface with a client device (e.g., a laptop computer, tablet computer, smart phone, etc.) that is communicatively connected to the IIH system 2002 (e.g., via a hardwired or wireless connection). The user interface component 2004 can then serve an IIH interface environment to the client device, through which the system 2002 receives user input data and renders output data. In other embodiments, user interface component 2004 can be configured to generate and serve suitable interface screens to the client device (e.g., program development screens, project submission screens, analysis result screens, etc.), and exchange data via these interface screens.

Modeling component 2006 can be configured to generate digital asset models or device models based on modeling input submitted by a user via the user interface, or to aggregate multiple digital asset models into larger digital twins or virtualized plants representing an end user's industrial systems or environment. Simulation component 2008 can be configured to simulate operation of a virtualized model of an industrial automation system based on the asset models, digital twins, or virtualized plants. Simulation component 2008 can function similarly to simulation component 218 of the IDH repository system 202.

Device interface component 2010 can be configured to interface with industrial devices or assets on the plant floor, either directly or via a smart gateway device 1202, and receive real-time operational and status data from these assets for the purposes of analysis, simulation, or visualization. Device interface component 2010 can also retrieve device identification information or credential information from smart gateway devices 1202 as part of a procedure to securely provisioning asset models. Analytics component 2012 can be configured to perform various types of analytics on collected industrial asset data in view of corresponding asset models or digital twins. Access management component 2014 can be configured to securely connect client devices to industrial assets inside a plant facility from remote locations without the need to open inbound ports on the plant's corporate firewall.

The one or more processors 2020 can perform one or more of the functions described herein with reference to the systems and/or methods disclosed. Memory 2022 can be a computer-readable storage medium storing computer-executable instructions and/or information for performing the functions described herein with reference to the systems and/or methods disclosed.

Figure 21:
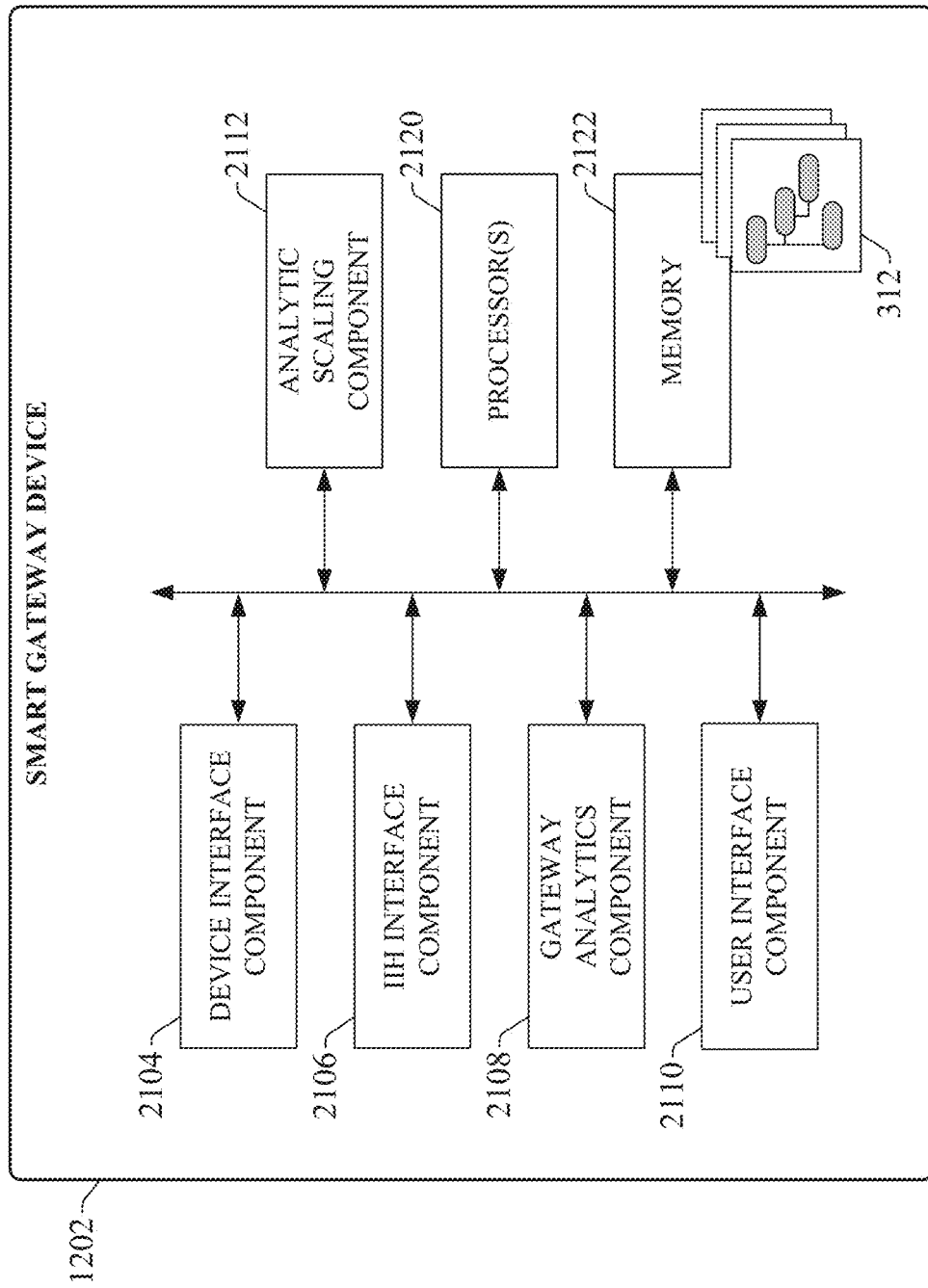
FIG. 21 is a block diagram of an example smart gateway device.

FIG. 21 is a block diagram of an example smart gateway device 1202 according to one or more embodiments of this disclosure. Smart gateway device 1202 can include a device interface component 2104, an IIH interface component 2106, a gateway analytics component 2108, a user interface component 2110, an analytic scaling component 2112, one or more processors 2120, and memory 2122. In various embodiments, one or more of the device interface component 2104, IIH interface component 2106, gateway analytics component 2108, user interface component 2110, analytic scaling component 2512, the one or more processors 2120, and memory 2122 can be electrically and/or communicatively coupled to one another to perform one or more of the functions of the smart gateway device 1202. In some embodiments, components 2104, 2106, 2108, 2110, and 2112 can comprise software instructions stored on memory 2122 and executed by processor(s) 2120. Smart gateway device 1202 may also interact with other hardware and/or software components not depicted in FIG. 21. For example, processor(s) 2120 may interact with one or more external user interface devices, such as a keyboard, a mouse, a display monitor, a touchscreen, or other such interface devices.

Device interface component 2104 can be configured to communicatively interface with industrial devices and assets within a plant facility and exchange data therewith. IIH interface component 2106 can be configured to communicatively interface with the IIH system 2002 via a cloud platform. Gateway analytics component 2108 can be configured to apply edge-level analytics to data collected from the industrial devices and assets. In some scenarios, these analytics can be based on asset models 312 or machine learning models stored on the smart gateway device 1202. User interface component 2110 can be configured to send data to and receive data from client devices via one or more public or private networks. Analytic scaling component 2112 can be configured to scale selected analytic processing to the IIH system 2002 on the cloud platform and to coordinate distributed analytics between the IIH system 2002 and the smart gateway device 1202.

The one or more processors 2120 can perform one or more of the functions described herein with reference to the systems and/or methods disclosed. Memory 2122 can be a computer-readable storage medium storing computer-executable instructions and/or information for performing the functions described herein with reference to the systems and/or methods disclosed.

Figure 22:
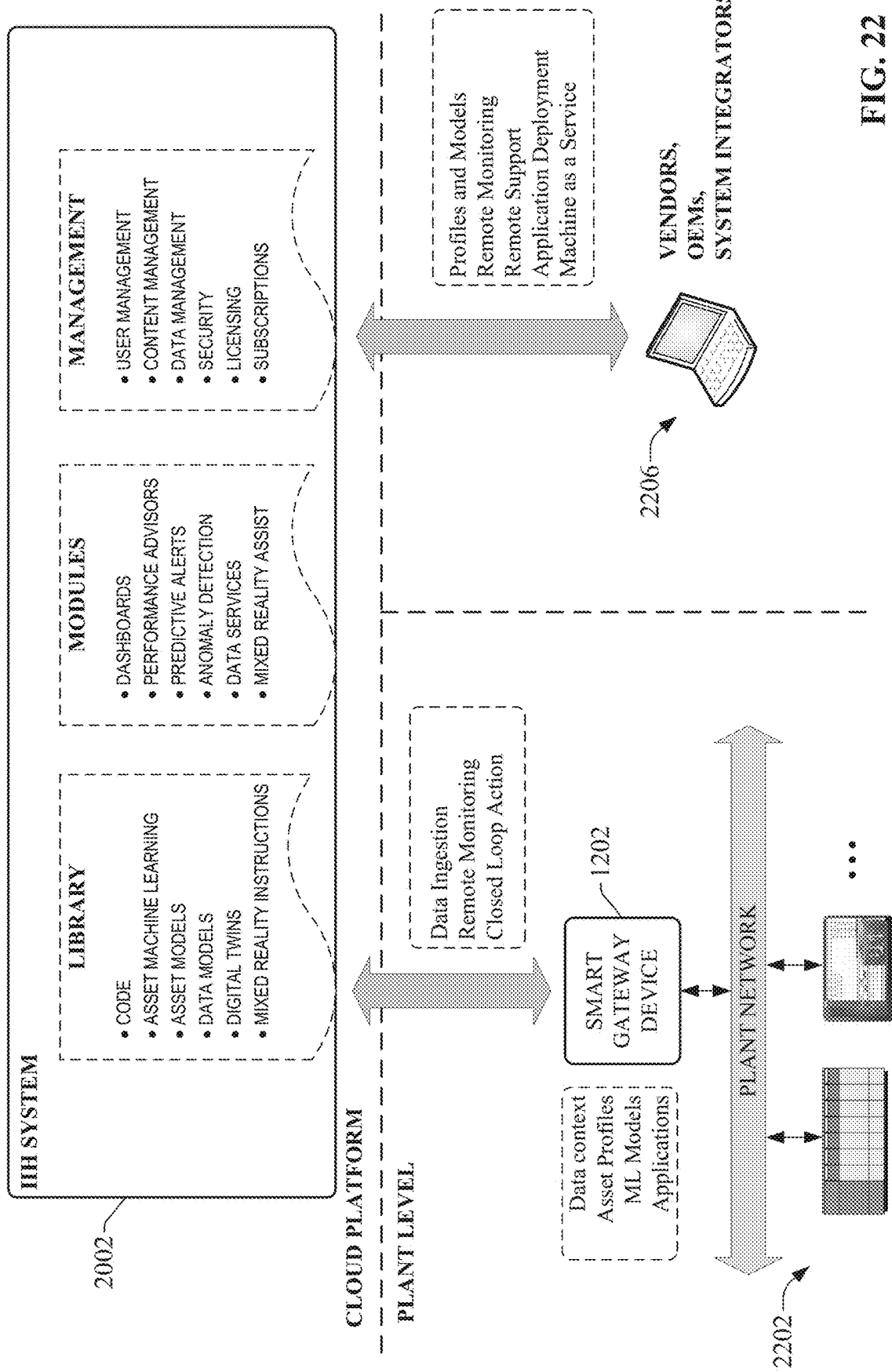
FIG. 22 is a generalized conceptual diagram of an ecosystem facilitated by an IIH system.

FIG. 22 is a generalized conceptual diagram of the ecosystem facilitated by the IIH system 2002. In general, the IIH system 2002 supports a cloud-based environment and associated tools that allows vendors, OEMs, system integrators, or other industrial service providers to create and deploy digital services for use by owners of industrial assets 2202 at plant facilities. The IIH system 2002 can provide a number of capabilities, including standardized easy connectivity solutions to move information from plant assets 2202 to the cloud platform; common data models (asset models, data models, digital twins, asset machine learning models, etc.) to build and maintain context from multiple sources and reduce time to value; support for information-ready assets from OEMs with pre-built digital twins, machine learning models, analytics and mixed reality experiences; secure architectures that allow end users provide safe access to their OT assets 2202 and information, and leverage domain expertise and content from the ecosystem; and a technology platform that enables ecosystem partners to deliver value and monetize services and for their customers to easily consume this value.

Each ecosystem partner can benefit from key outcomes by participation in the IIH ecosystem. For example, owners of industrial assets 2202 will see improved operational efficiency and asset performance by leveraging data and insights, as well as higher returns on equipment investments and faster analytics rollouts through standardized deployments. OEMs will see new revenue streams throughout the lifecycle of their assets through remote monitoring, predictive maintenance, performance contracts, and "Machine as a Service" offerings. System integrators and independent software vendors (ISVs) will see rapid application development and lower integration costs from system simulation and validation.

To support a large number of diverse participants, the IIH system 2002 can utilize trusted information connectivity sources to provide core asset-to-cloud connectivity, data governance, and access administration between end users and the ecosystem, including secure and validated architectures. These services can cover a wide spectrum of connectivity use cases, from completely on-premises and disconnected to intermittent and always connected. Addressing disconnected or intermittent connectivity use cases while proving the value of connectivity can accelerate digital maturity and remove barriers to cloud adoption.

The cloud infrastructure on which the IIH system 2002 is built can provide components that enable the ecosystem to rapidly develop standardized and repeatable solutions, including native connectors, common data models for contextualization, data repositories or data lakes, digital twin profile builders, and pre-built machine learning reference solutions for critical use cases. These components can enable the ecosystem to deliver predictive maintenance, remote monitoring, expert assistance, and digital workforce productivity (including AR and VR).

The IIH system 2002 can also provide scalable compute offerings from the edge to the cloud, which operate in conjunction with a portfolio of hardware offerings that include simple gateways, edge compute (e.g., smart gateway device 1202), data center and cloud compute capabilities that offer the best of near machine, on-premises and cloud compute capabilities.

Figure 23:
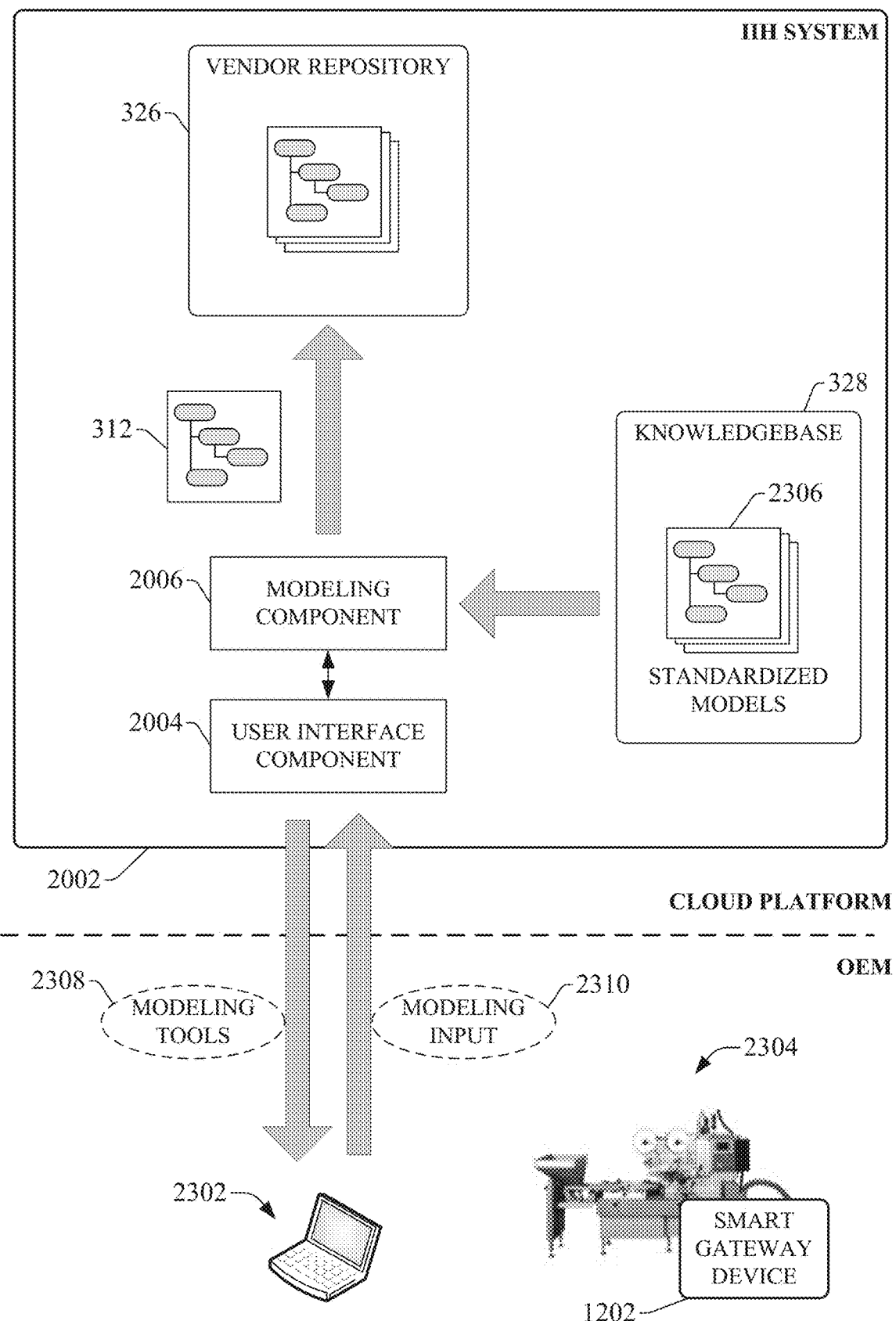
FIG. 23 is a diagram illustrating creation and registration of an asset model by an OEM for a machine being built for delivery to a customer.

The IIH platform can allow asset models 312 to be created, registered, and tied to an asset, either by a customer, an OEM, or another participant of the ecosystem. FIG. 23 is a diagram illustrating creation and registration of an asset model by an OEM for a machine 2304 being built for delivery to a customer. Asset models 312 can be built using the IIH system's data modeling services and made available for deployment from the cloud to an edge or to a plant floor device (e.g., smart gateway device 1202 or an industrial controller). To this end, the IIH system's modeling component 2006 can generate and serve (via user interface component 2004) model development interfaces including modeling tools 2308 to client devices 2302 associated with the OEM, and designers can submit modeling input 2310 via interaction with these tools 2308. These modeling tools 2308 allow OEM designers to define one or more digital asset models 312 to be associated with the machine 2304 being built, which can be leveraged by the purchaser of the machine 2304 for the purposes of cloud-level or edge-level analytics (e.g., performance assessments or predictive analytics), virtual simulations of the machine 2304, VR/AR visualizations, or other such digital engineering functions.

The asset model 312 can model various aspects of its corresponding machine 2304. For example, the asset model 312 can define the devices and components that make up the machine 2304 (e.g., industrial controllers, drives, motors, conveyors, etc.), including functional specifications and configuration parameters for each device. In some cases, the asset model 312 can define these machine devices and components hierarchically, or otherwise define the functional relationships between the devices. The asset model 312 can also define visual characteristics and three-dimensional animation properties of the machine 2304, which can be used to visualize the machine within a simulation or VR presentation. For asset models 312 capable of supporting simulations of the machine 2304, the asset model 312 can also define physical, kinematic, or mechatronic properties that determine how the machine 2304 behaves within a simulation environment (e.g., frictions, inertias, degrees of movement, etc.). Asset model 312 can also include analytic models designed to process runtime data produced by the machine 2304 to yield insights or predictions regarding the machine's operation.

Figure 24:
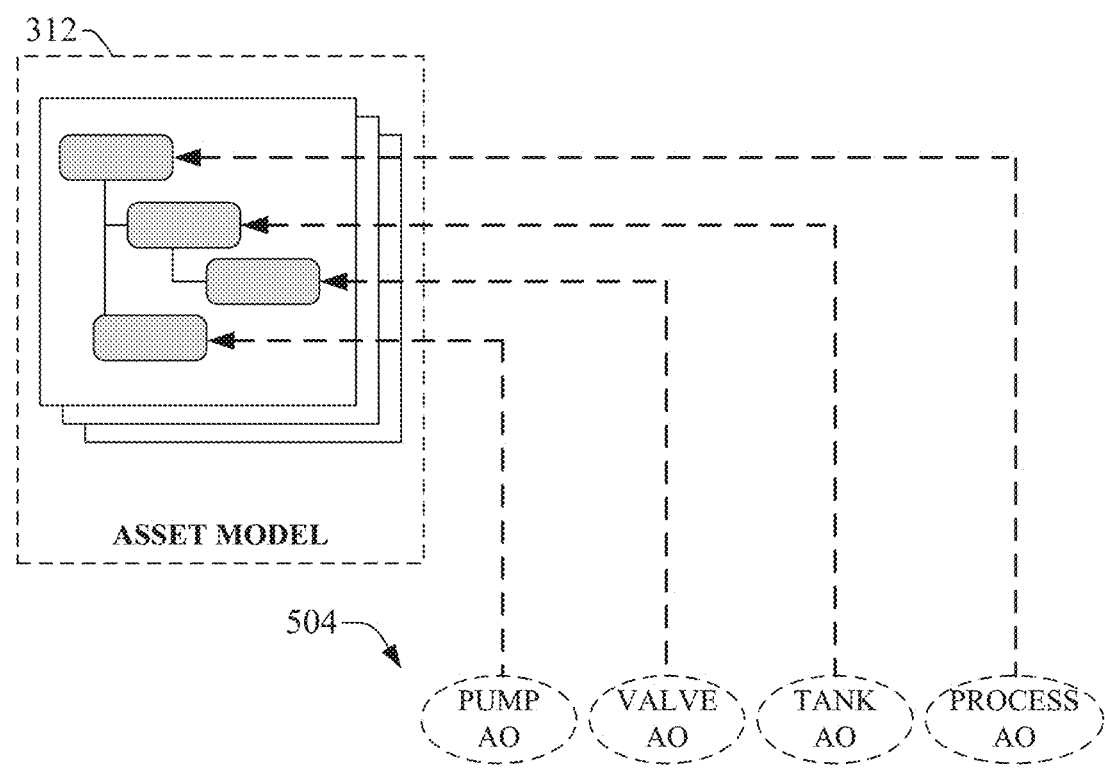
FIG. 24 is a diagram illustrating an example asset model that incorporates automation objects.

Some aspects of the asset model 312 can be built in accordance with an object-based architecture that uses automation objects 504 as building blocks. FIG. 24 is a diagram illustrating an example asset model 312 that incorporates automation objects 504. In this example, various automation objects 504 representing analogous industrial devices, components, or assets of the machine 2304 (e.g., processes, tanks, valves, pumps, etc.) have been incorporated into the asset model 312. The asset model 312 also defines hierarchical relationships between these automation objects 504. According to an example relationship, a process automation object representing a batch process may be defined as a parent object to a number of child objects representing devices and equipment that carry out the process, such as tanks, pumps, and valves. Each automation object 504 has associated therewith object properties or attributes specific to its corresponding industrial asset (e.g., those discussed above in connection with FIG. 5), including analytic models, performance assessment models, predictive models, visualization properties, or other such properties. At least some of the automation objects 504 referenced in the asset model 312 can correspond to automation objects 504 defined in one or more industrial control programs used to monitor and control the machine 2304.

At least some of the attributes of each automation object 504 are default properties based on encoded industry expertise pertaining to the asset represented by the objects 504, or the OEM's expertise pertaining to the machine 2304 as a whole. Other properties can be modified or added as needed (via design input 512) to customize the object 504 for the particular machine 2304 being built. This can include, for example, associating customized control code, visualizations, AR/VR presentations, or help files associated with selected automation objects 504. In this way, automation objects 504 can be created and augmented for consumption or execution by applications designed to add value to the machine's operation. The use of automation objects 504 to create asset models 312 can allow a common data nomenclature to be used for creation of shared asset models 312, allowing different vendors and protocols to be easily integrated.

In some embodiments, modeling component 2006 can allow the designer to select and incorporate predefined standardized models 2306 into the asset model 312. These standardized models 2306 can be stored on knowledgebase 328 and can encode any of the asset properties or analytic models discussed above for respective types of industrial assets. Model properties defined in the standardized models 2306 can be based on industrial expertise regarding their corresponding industrial assets. These can include, for example, analytic algorithms designed to calculate and assess key performance indicators (KPIs) for the corresponding industrial asset, predictive algorithms designed to predict future operational outcomes or abnormal conditions for the asset, or other such asset-specific models or properties.

Asset models 312 can also define which of the corresponding asset's available data items (e.g., controller data tag values, device configuration parameters, etc.) are relevant for data collection and analysis purposes, as well as functional or mathematical relationships—e.g., correlations and causalities—between these selected data items. Some asset models 312 can also combine a business-view model of the machine—e.g., serial number, financial data, boilerplate data, etc.—with an automation representation of the machine to yield a composite model 312.

Once the OEM has developed an asset model 312 for the machine 2304 being built, the model 312 can be registered with the IIH system 2002 and stored on the vendor repository 326 designated to the OEM. The OEM can also register a smart gateway device 1202 with the IIH system 2002. The smart gateway device 1202 stores digital credentials that permit access to and use of the asset model 312. The machine 2304 can then be shipped to the customer facility for installation, together with the smart gateway device 1202.

Figure 25:
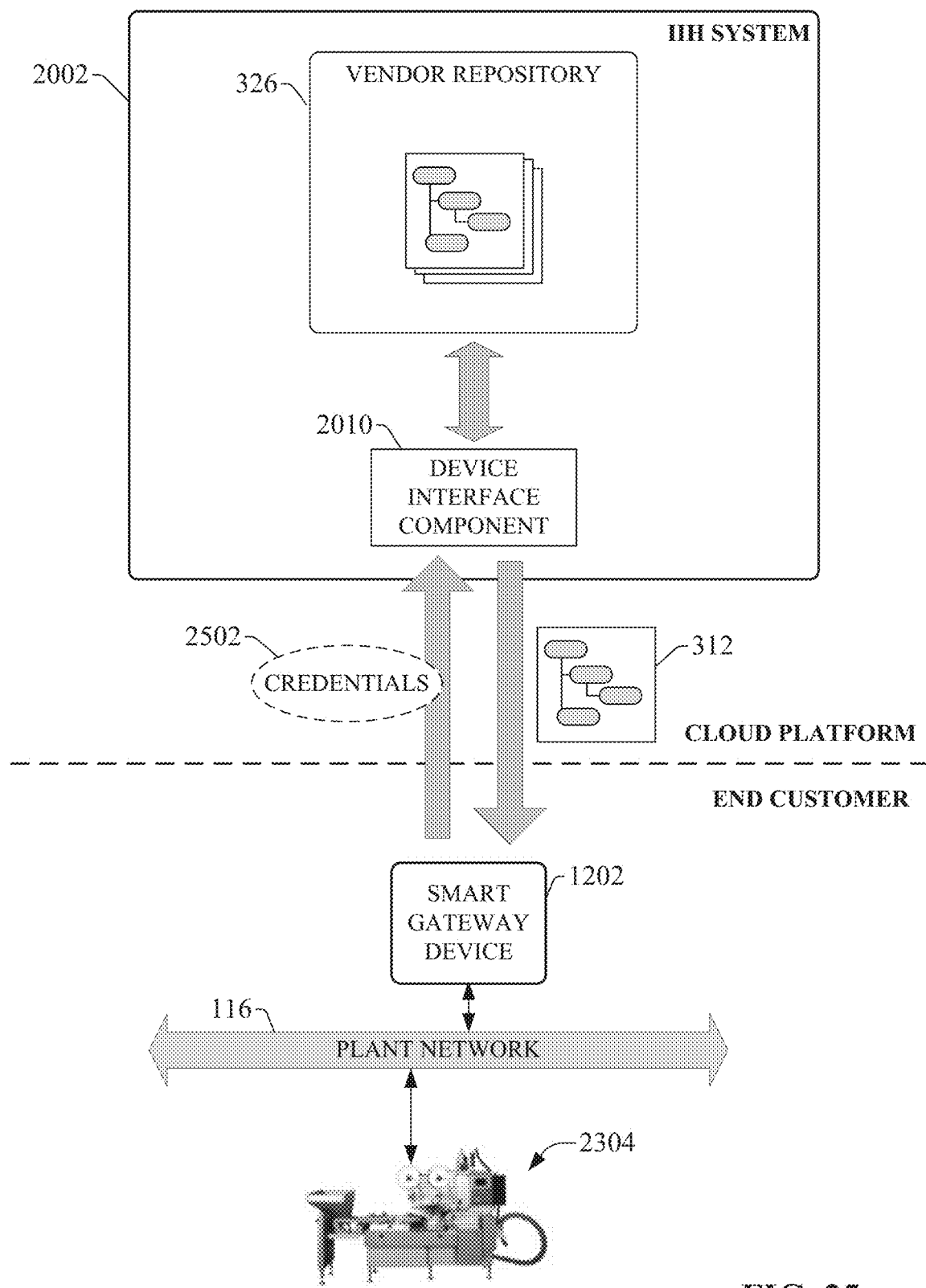
FIG. 25 is a diagram illustrating commissioning of a machine at a customer facility and registration of the machine with an IIH system.
Figure 26:
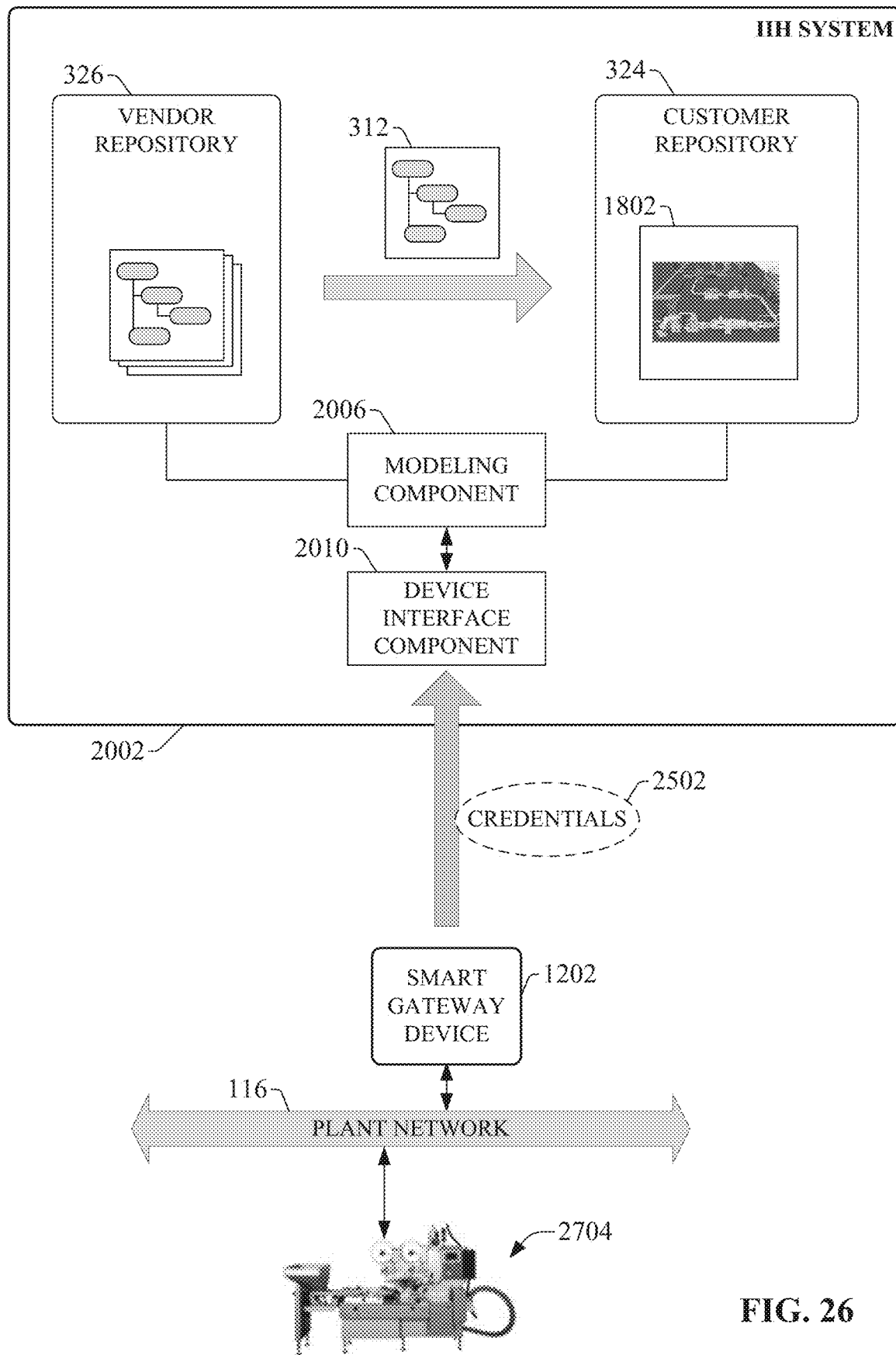
FIG. 26 is a diagram illustrating deployment of an asset model from a vendor repository to a customer repository of an IIH system.

FIG. 25 is a diagram illustrating commissioning of the machine 2304 at the customer facility and registration of the machine with the IIH system 2002. Once installed on the customer's plant network 116, personnel at the plant facility may choose to utilize the information services that are available for the machine 2304 and made possible by the asset model 312. Accordingly, the IIH interface component 2106 of the smart gateway device 1202 can communicatively connect to the cloud platform and send the credentials 2502 stored on the smart gateway device 1202 to the IIH system 2002. Upon validating the credentials 2502, the device interface component 2010 of the IIH system 2002 registers the smart gateway device 1202 with the system 2002 and provisions the asset model 312 to the customer. The manner in which the asset model 312 is provisioned can depend on the intended destination of the model 312. For example, the asset model 312 may be designed to execute on-premise on the smart gateway device 1202. Accordingly, the IIH system 2002 can provision the asset model 312 to the gateway device 1202 as shown in FIG. 26. Alternatively, the asset model 312 may be designed to execute on the cloud platform. In such scenarios, in response to validating the digital credentials 2502, the IIH system 2002 can provision the asset model 312 to the customer repository 324 assigned to the customer for cloud-based execution, as illustrated in FIG. 26. This manner of provisioning the asset model 312 may also involve integrating the asset model 312 for the machine 2304 into an existing virtualized plant 1602 representing the customer's facility. In this regard, the asset model 312 may be serve as a digital twin of the machine 2304, which can be aggregated with other digital twins 810 or other asset models to yield the virtualized plant 1602.

By providing digital asset modeling tools for creation of asset models 312, as well as a platform for securely distributing these models, the IIH system 2002 can enable OEMs or other equipment providers to build digital representations of their assets or machine types and add these representations to a cloud-based library. In this way, OEMs can progressively grow digital content that can be used to support new or existing installations of their equipment. The IIH system 2002 can manage this digital library for multiple OEMs, vendors, system integrators, or service providers, organizing the models according to industrial vertical (e.g., automotive, food and drug, oil and gas, mining, etc.), industrial application, equipment classes or types, or other categories.

Figure 27:
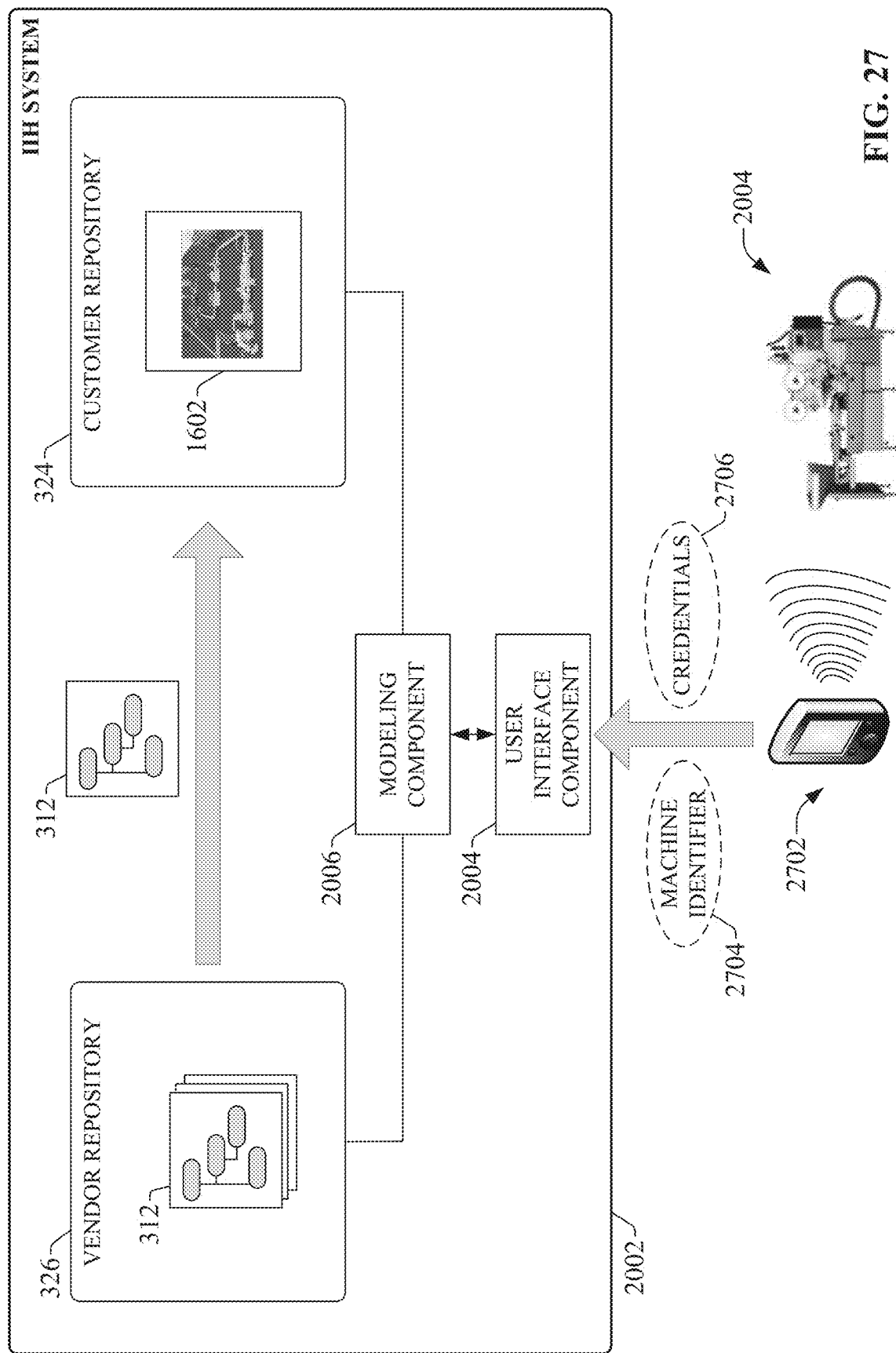
FIG. 27 is a diagram illustrating selection and integration of an asset model based on machine identity.

While FIGS. 23-26 illustrate a scenario in which asset models 312 are created by an OEM and registered with the IIH system 2002 for use by purchasers of their equipment, end users can also obtain and utilize asset models 312 in other ways in some embodiments. FIG. 27 is a diagram illustrating selection and integration of an asset model 312 based on machine identity. In this example, machine 2708 includes an optical code (e.g., two-dimensional barcode such as a QR code) representing a unique machine identifier that can be scanned by a user's client device 3102. The client device 2702 can then interface with the IIH system 2002 (via user interface component 2004) and submit the scanned machine identifier 2704 together with suitable credentials 2706 identifying the user of the client device 2702 as an authorized person with permission to modify the virtualized plant 1602. In response to receipt of the machine identifier 2704 and credentials 2706, the modeling component 2006 can retrieve an asset model 312 corresponding to the machine identifier 2704 from the appropriate library (e.g., from the vendor repository 326 corresponding to the maker of the machine) and integrate the retrieved model 312 into the customer's larger virtualized plant 1602.

In some embodiments, the modeling component 2006 can also prompt users for additional information about their collected industrial assets in order to fill in gaps in the topology of the virtualized plant 1602. For example, modeling component 2006 may send (via user interface component 2004) a request for information regarding where a machine 2304 is located within the plant facility, or what other undocumented devices and assets are connected to the machine 2304. Modeling component 2006 can incorporate this information into the customer's virtualized plant 1602 to yield a more accurate digital representation of their plant environment.

Figure 28:
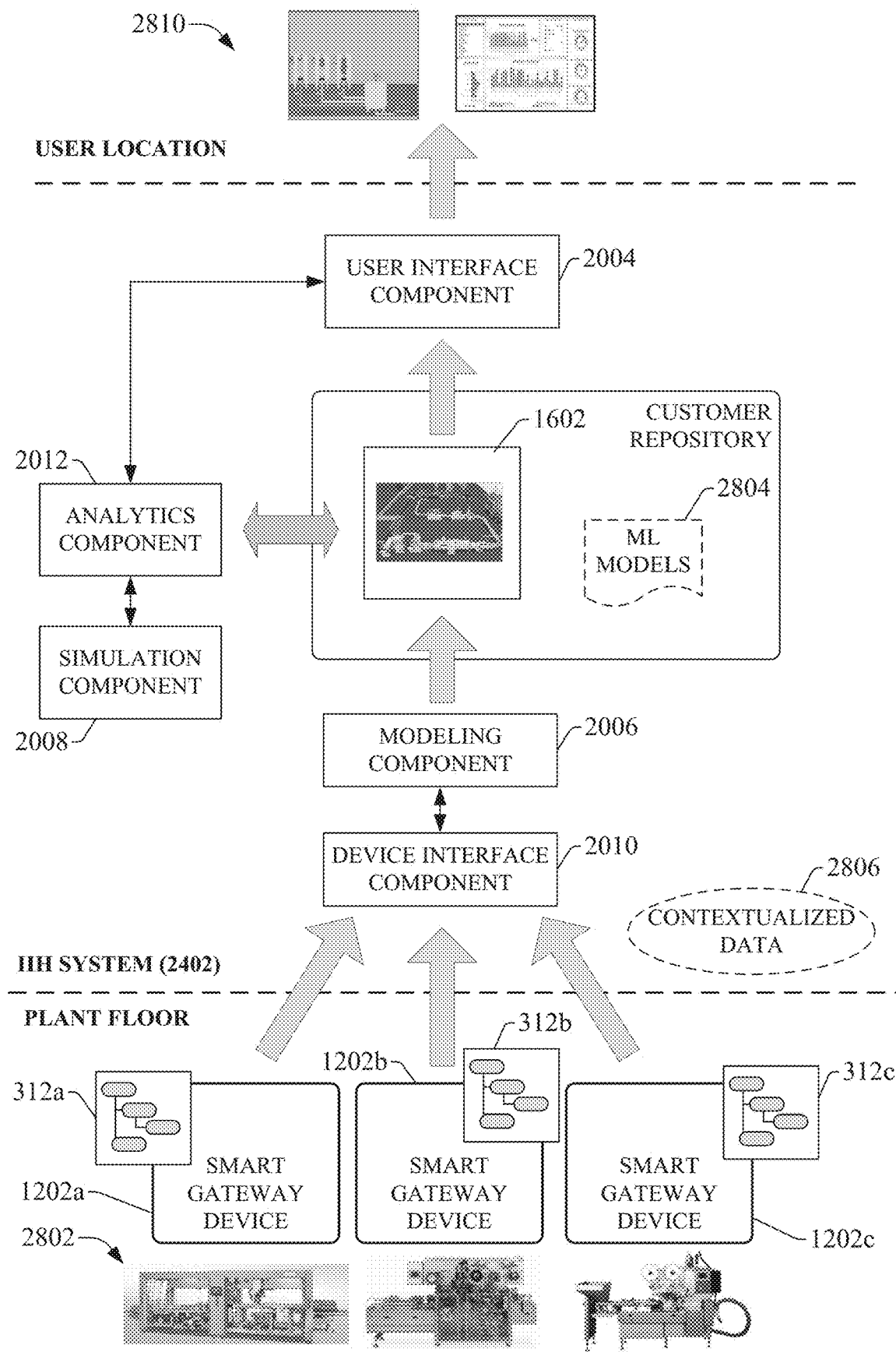
FIG. 28 is a diagram illustrating an architecture in which an IIH system provides industrial information services for a collection of industrial assets within a plant environment.

FIG. 28 is a diagram illustrating an architecture in which IIH system 2002 provides industrial information services for a collection of industrial assets 2802 within a plant environment. Connection services implemented by the device interface component 2010 can function to connect machines or other industrial assets to the cloud-based IIH system 2002. These connection services can offer an enterprise view of multiple automation systems operating within an industrial enterprise, aggregating contextualized data 2806 from multiple smart gateway devices 1202 and operating on this collected data 2806 from an OEM or customer perspective. In the example depicted in FIG. 28, three smart gateway devices 1202*a*-1202*c* are executing on the plant floor, each gateway device 1202 serving as an edge device that interfaces a set of industrial assets 2802 to the IIH system 2002. Modeling component 2006 can map all three gateway devices 1202 into a single virtual asset represented by virtualized plant 1602 on the cloud platform, and user interface component 2004 can create and render data presentations 2810 on end users' client devices based on the virtualized plant 1602 and the contextualized data 2806. This connection service can integrate smart gateway devices 1202 from different vendors or partners (e.g., robot manufacturers who provide their robots with their own gateway devices).

Once these multiple gateways have been integrated, the IIH system 2002 can provide a single view for the entire plant via data presentations 2810. In an example embodiment, the user interface component 2004 can deliver customized dashboards to authorized client devices that visualize selected portions of the virtualized plant 1602 and render selected subsets of the contextualized data 2806—or results of analysis performed on this data 2806—via the dashboards. In some embodiments, user interface component 2004 can deliver, to a wearable appliance or other type of client device, three-dimensional VR presentations depicting substantially real-time operation of the industrial assets 2802. These VR presentations can be generated based on the digital twins 810 and asset models 312 that make up the virtualized plant 1602 and animated using the contextualized data 2806. The IIH system 2002 can allow users to invoke asset-specific views of the plant by selecting assets of interest via the presentations.

Similar to the architecture described above in connection with FIG. 19, the IIH system 2002 can facilitate remote monitoring and interaction with the industrial assets 2802. That is, in addition to providing visualizations, IIH system 2002 can receive remote commands from the user via interaction with these visualizations directed to selected industrial assets 2802, and device interface component 2010 can deliver the requested commands to the assets 2802 contingent on asset-specific restrictions on issuance of remote commands.

For implementations in which asset models 312 are deployed on the smart gateway devices 1202, models 312 can be used by the gateway devices 1202 to add contextual metadata to items of operational data generated by their corresponding industrial assets 2802 to yield the contextualized data 2806. Contextualization metadata added to a given item of data can include, for example, a machine or asset identifier indicating the machine from which the data was obtained, values of other data items having a relationship with the data item as defined by the asset model 312 (as determined by correlations and causalities defined in the models 312), a synchronized time-stamp, or other such metadata. This data contextualization can help the IIH system's analytics component 2012 to more quickly converge on valuable insights into the performance of the industrial assets 2802 by pre-modeling the data at the gateway level in meaningful ways based on industrial expertise encoded in the asset models 312.

The IIH system's analytics component 2012 can perform analytics on the contextualized data 2806 based on the digital twins 810 and asset models 312 of the virtualized plant 1602, and generate notifications or recommendations based on results of this analysis. This analysis can, for example, identify when operational aspects of the industrial assets 2802 (e.g., speeds, pressures, flows, product throughputs, downtime occurrences, etc.) fall outside acceptable ranges as defined in the asset models 312 (e.g., by OEMs or other industrial experts). Based on these results, the analytics component 2012 may also generate recommendations for modifying control of the industrial assets 2802 to bring operation within the defined ranges; e.g., by modifying setpoints, changing a control sequence, etc. In addition or as an alternative to generating notifications, IIH system 2002 can send control commands to the industrial assets 2802 (via device interface component 2010) that alter operation of the assets 2802 in a manner predicted to bring the performance metrics back into compliance.

Some embodiments of analytics component 2012 can be configured to perform predictive analysis on the collected contextualized data 2806 and, in response to predicting a future operational issue based on results of this analysis, generate notifications or recommendations for modifying operation to mitigate the issue. This predictive analysis can be aided by the simulation component 2008, which can execute simulations of asset performance based on the virtualized plant 1602 and historical performance of the assets 2802 as determined from the contextualized data 2806. Analysis of the contextualized data 2806 can also be performed based on machine learning models 2804 designed specifically for the respective assets 2802, and obtained from either the vendor repository 326 or the knowledgebase 328. In this regard, the IIH system 2002 can maintain a library of machine learning models 2804 designed by equipment vendors to gain insight into operation of their equipment. Vendors can register these machine learning models 2804 in a similar manner to assets asset models 312, or may include these machine learning models 2804 as part of their corresponding asset models 312.

Smart gateway devices 1202 commissioned with asset models 312 can also be configured to perform local plant-level analytics on data collected from the assets 2802. To this end, each gateway device 1202 can include a gateway analytics component 2108 (see FIG. 21) capable of performing analytic functions similar to those of analytics component 2012 of the IIH system 2002. The gateway device 1202 can apply these analytics to data collected from the subset of industrial assets connected to that gateway device 1202. Based on results of these local analytics, the gateway device 1202 may send control feedback to one or more of their associated assets 2802 without the need to await analytic results from the cloud platform. Alternatively, the gateway device 1202 may selectively send plant-level analytic results to the IIH system 2002 for additional processing, storage, or notification purposes.

In some embodiments, the IIH system 2002 and smart gateway device 1202 can collaborate to manage division of computational resources between the cloud platform and the plant floor. For example, if a smart gateway device 1202 detects an asset-related event on the plant floor that requires additional computing capability, the gateway's analytic scaling component 2112 can package and send this data to the IIH system 2002 for higher-level processing. This can include collecting relevant data items needed for analysis and streaming these data items to the cloud platform while production continues (decentralized computing). In this way, complex computations can be automatically pushed to the IIH system 2002, where more robust analytics can be applied buy the analytics component 2012. Similarly, the analytics component 2012 of the IIH system 2002 may determine that an analytic result or simulation result obtained by the IIH system 2002 is relevant to operation of an industrial asset 2802 managed by a smart gateway device 1202. In response to this determination, the device interface component 2010 can send this analytic result to the relevant gateway device 1202 for further plant-level processing. Gateway analytics component 2108 of the gateway device 1202 can perform this additional processing based on the edge-level asset models 312 maintained on the gateway device 1202. Based on results of this further processing, the gateway device 1202 may deliver control signaling to the industrial asset to alter the asset's operation. The analytics component 2012 of the IIH system 2002 and the gateway analytics component 2108 of the smart gateway device 1202 can also collaborate to divide processing of an analytic task between the IIH system 2002 and the gateway device 1202. Determinations of when an analytic task or portion of an analytic task should be scaled to the IIH system 2002 or the gateway device 1202 can be based on a determination of where the results of the analysis will be consumed (e.g., by the industrial assets in the form of control feedback, or by the cloud-based system for reporting or visualization purposes).

Either cloud-level or gateway-level asset models 312 can also be used to model proposed modifications to an automation system and predict operational outcomes as a result of implementing the proposed modifications. Results of this predictive analysis can be delivered a client device in the form of predicted operating statistics or recommended alterations to the proposed modification that are more likely to produce an intended outcome of the modification.

With knowledge of customers' asset inventory, the IIH system 2002 can also send product announcements or product notices tailored to the equipment known to be used by the target customers. This can include sending recommendations based on product lifecycle (e.g., recommending a replacement device when an existing device is determined to be near the end of its lifecycle, as determined based on correlation of data generated by the device with lifecycle information recorded in the device's asset model). The IIH system 2002 can also offer to upload a device configuration and run simulations on the cloud platform to predict results of upgrading the firmware of the device (or the impact of another type of system modification). Notifications relevant to a particular type of industrial device can include rendered maps of the customer's enterprise overlaid with hotspots indicating where the relevant device is currently being used. This information can be used by the IIH system 2002 to notify local maintenance personnel at those locations that an upgrade should be performed.

Embodiments of the IIH system 2002, working in conjunction with the IDH repository system 202, can create a cloud-based ecosystem that creates and delivers value to both providers and owners of industrial equipment. The IIH system 2002 can play the role of a trusted information broker between the ecosystem and the customer's OT environment, and provides a platform for connecting assets, contextualizing data, and providing secure access to the ecosystem. Additionally, the IIH system 2002 can provide tools and support to OEMs and other subject matter experts, allowing those users to enable their digital assets for use in the ecosystem. The IIH system 2002 can reduce the cost and risks of industrial digital modeling so that vendors, OEMs, and End Users can collaborate to improve operational efficiency and asset performance.

Figure 29:
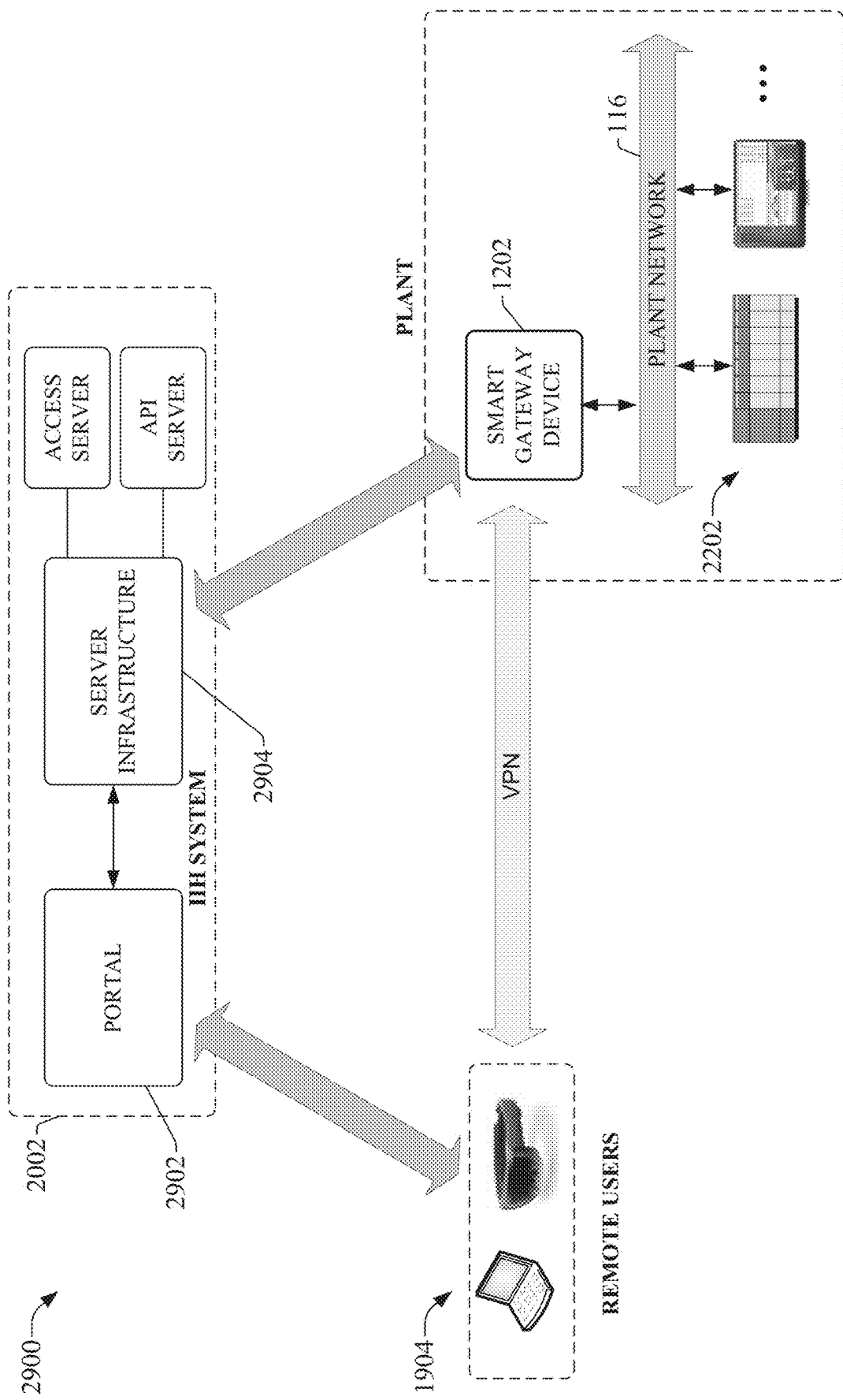
FIG. 29 is a high-level diagram illustrating a generalized architecture for providing secure remote access to a customer's industrial assets.

To facilitate secure remote access to a customer's plant-floor assets, the IIH system 2002 can include one or more access management components 2014 (see FIG. 20), which provide users with the ability to securely connect to assets inside their plant from remote locations without the need to open inbound ports on the plant's corporate firewall. FIG. 29 is a high-level diagram illustrating a generalized architecture 2900 for providing secure remote access to a customer's industrial assets 2202. As in previous examples, a smart gateway device 1202 resides on a plant network 166 and serves as a gateway or edge device. Smart gateway device 1202 can execute a runtime component (e.g., as part of the gateway device's IIH interface component 2106) that permits authorized devices to remotely access data on the industrial assets 2202 via the cloud-based infrastructure of the IIH system 2002. After smart gateway device 1202 has been deployed on the plant network 116 and interfaced with other industrial assets 2202 on the network 116, the gateway device 1202 can send its credential information to the IIH system 2002, which registers the gateway device 1202 and its associated assets 2202 and data (e.g., data tags on the industrial assets 2202 that are to be made available for remote access).

To access data on the industrial assets 2202 via gateway device 1202, the IIH system 2002 can execute a portal 2902 as a cloud-based service (implemented by the user interface component 2004). Portal 2902 can deliver a front-end interface to remote client devices 1904 that request access to the assets 2202 from their remote locations. This front-end interface allows a user at a remote client device 1904 to enter credential information that uniquely identifies the user and establishes the user's credentials, verifying that the user is permitted to access a particular set of industrial assets 2202 at one or more industrial facilities that are interfaced to the IIH system 2002 via smart gateway devices 1202.

The cloud-based IIH system 2002 can include a server infrastructure 2904 that collectively serves as the IIH system's access management component 2014, and which manages secure remote access to industrial assets 2202 at different locations via respective smart gateway devices 1202. The server infrastructure 2904 can include an access server (which may serve as the system's access management components 222, or may execute one or more access management components 222) that is responsible for managing access to registered resources, such as industrial assets 2202 that have been registered via gateway device 1202. Server infrastructure 2904 can also include an API server that exposes APIs for IIH system clients, as well as a distributed set of relay servers that execute algorithms for determining optimal or fastest connection paths between a set of industrial assets 2202 and a client device 1904 requesting access to those assets 2202. Server infrastructure 2904 may also include one or more database servers that serve as a backing data store for the access server and API server.

In an example scenario, a client device 1904 belonging to a user affiliated with an industrial enterprise can connect to the portal 2902, which delivers a public front-end interface display to the client device 1904 that permits the user to submit identification and credential data to the system 2002. Upon determining that the user's credential data is valid, the portal 2902 determines which subset of registered industrial assets 2202 (that is, assets 2202 that have been registered with and connected to the IIH system 2002 via a smart gateway device 1202) the user is permitted to access based on the user's identity and/or industrial enterprise affiliation. The portal 2902 can then deliver an enterprise-specific interface to the client device 1904 that lists the available assets that the user is permitted to access, and allows the user to select from among these available assets. Based on this selection, the server infrastructure 2904 establishes a virtual private network (VPN) connection between the remote client device 1904 and the selected assets 2202 via the gateway device 1202, facilitated by the secure remote access runtime services that execute on the gateway device 1202. The user interface component 2004 can then delivers a suitable data presentation to the client device 1904 that renders real-time or historical data retrieved from the assets 2202 (e.g., status data, operational data, performance data, health or diagnostic data, production statistics, etc.) via the VPN connection. The server infrastructure 2904 establishes this VPN connection without the need to open an inbound port through the corporate firewall at the plant.

Any of the IIH system's functionality described above that requires remote access to industrial assets 2202 can use the connection architecture 2900 depicted in FIG. 29 to manage customers' remote access to their industrial assets and associated data. For example, architecture 2900 can serve as the remote connection backbone for retrieving and delivering contextualized data 2806 to remote users as data presentations 2810, as described above in connection with FIG. 28. Thus, the VPN connection serves as the data channel that feeds real-time data from the assets 2202 to the data presentation 2810 at the client device 1904. The VPN connection can also serve as the data channel for delivering analytic results generated by the analytics component 2012 in addition to raw or contextualized data retrieved from the industrial assets via gateway devices 1202.

The secure remote connection architecture 2900 can also operate in conjunction with the modeling component 2006, which can map contextualized data from multiple gateway devices 1202 into a single virtualized plant 1602 as discussed above. This virtualized plant 1602 can then be visualized on a client device 1904 via the secure remote VPN connection as a unified data presentation 2810.

The VPN connection established by the secure remote access features of the IIH system 2002 can also permit the user to submit control commands to selected industrial assets 2202 via the server infrastructure 2904. This can include, for example, issuing commands via interaction with the dashboards on which the data presentations 2810 are rendered, as described above in connection with FIG. 28.

Figure 30:
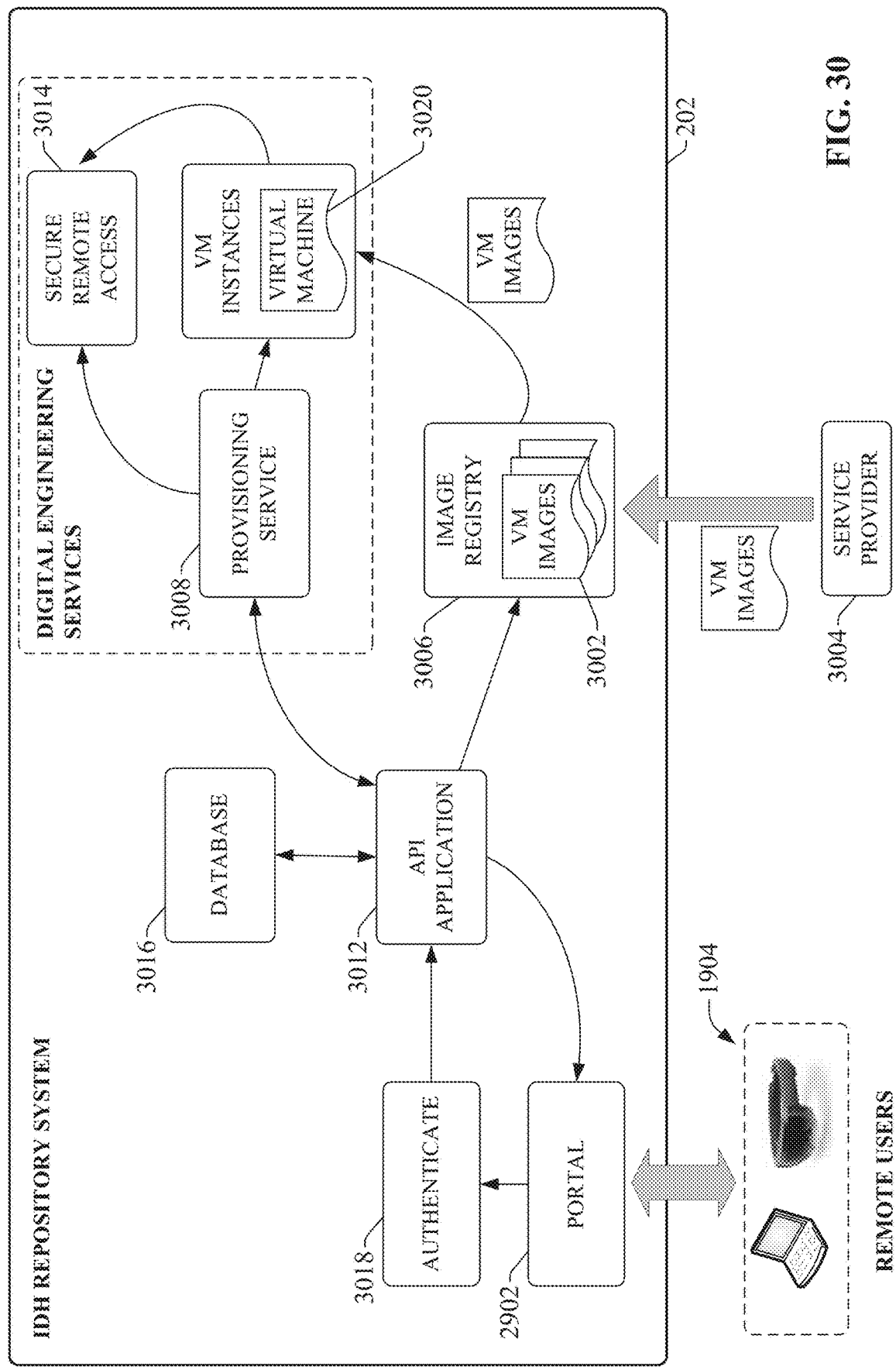
FIG. 30 is a diagram illustrating an example architecture for the IDH repository system that supports the ability to instantiate virtual machine instances on a cloud platform as part of the system's digital engineering services and to use secure remote access features to connect to these virtual machine instances.

Although FIG. 29 depicts the secure remote access technology being used during the operation phase of an industrial project to establish VPN connections between remote users' client devices and their running industrial assets 2202, the services that implement the secure remote access technology can also be used to provide a secure connection to customer-specific virtual machines instantiated by the IDH repository system 202 during project development. FIG. 30 is a diagram illustrating an example architecture for the IDH repository system 202 that supports the ability to instantiate virtual machine instances on the cloud platform as part of the system's digital engineering services, and to use secure remote access features to connect to these virtual machine instances. In this example, the IDH repository system 202 shares the portal 2902 and server infrastructure 2904 with the IIH system 2002, including the secure remote access features discussed above in connection with FIG. 29. IDH repository system 202 supports cloud-based digital engineering services, including those described above in connection with FIGS. 2-19. These digital engineering services also include features that allow users to create, on the cloud platform, instances of virtual machines 3020 that can be used to execute vendor-provided digital engineering applications that the users are entitled to use per their subscription contracts with those vendors.

In the example architecture of FIG. 30, the cloud-based system 202 is accessible by remote customers (owners of client devices 1904) who are authorized to access the digital engineering services implemented by the system 202. The system 202 is also accessible to one or more service providers 3004 who provide and maintain the digital engineering services. To support instantiation and execution of virtual machines 3020, system 202 can maintain various virtual machine images 3002 on an image registry 3006 (which can be a portion of memory 228). Virtual machine images 3002 can be vendor-specific, and as such each vendor repository 326 can include its own dedicated image registry 3006 for storage virtual machine images 3002 specific to a given vendor. System 202 allows software vendors to submit and register their own virtual machine images for use by their customers within the system's digital engineering environment.

Figure 31:
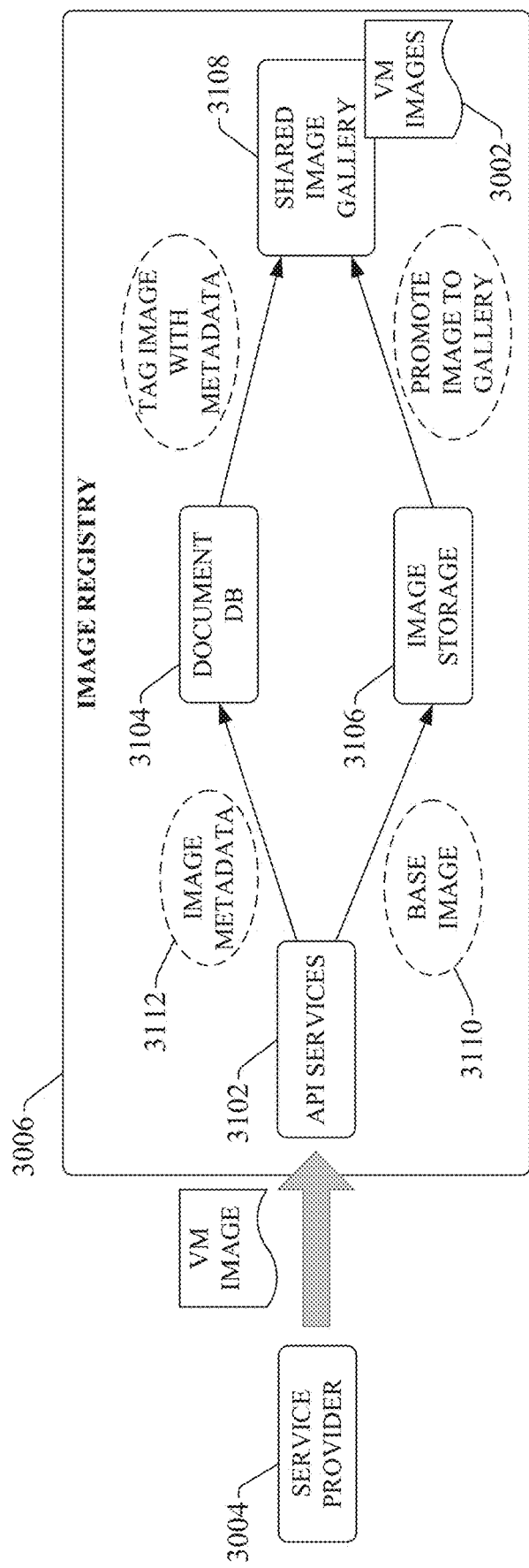
FIG. 31 is a diagram depicting registration of virtual machine images to the image registry.

The image registry 3006 serves as the initial storage location for virtual machine images 3002 to be hosted on the IDH repository system 202. The virtual machine images 3002 can be created, registered, and managed by service providers 3004 (e.g., control software vendors) who wish to offer their design software to authorized customers as a remote design service. FIG. 31 is a diagram depicting registration of virtual machine images 3002 to the image registry 3006 according to one or more embodiments. Each virtual machine image 3002 can comprise a base image 3110 and associated image metadata 3112 (e.g., stock keeping unit, version information, the date that the image 3002 was submitted, a bill of material, etc.). A service provider 3004 (e.g., a software vendor that offers digital engineering software) can submit a virtual machine image as a base image 3110 and associated image metadata 3112 to an API service 3102, which facilitates upload of images and associated metadata. The API service 3102 uploads the base image 3110 to image storage 3106 (e.g., blob storage). The API service 3102 also uploads the image metadata 3112 to a document database 3104 used to store the metadata associated with each image. From image storage 3106, the base image 3110 is promoted to a shared image gallery 3108, and the promoted image is tagged with the metadata 3112 from the document database 3104 to yield a shared virtual machine image 3002 that is ready for deployment as a virtual machine.

Returning now to FIG. 30, virtual machine images 3002 that have been registered within the image registry 3006 are exposed to the IDH repository system's digital engineering services, allowing customers to remotely access and deploy selected virtual machines 3020 for remote execution of automation design software and services. Remote users can access the digital engineering services by submitting their identity and credentials to the portal 2902 via client devices 1904 (as described above in connection with FIG. 29). In some embodiments, users can access the portal 2902 and the IDH repository system's services via their web browser. Once the user's identity and credential information has been authenticated by the system's authentication services 3018, the portal 2902 can render, on the user's client device 1904, a customized front-end interface that includes a list of available digital engineering services that the user is permitted access. The front-end interface can be user- or enterprise-specific, such that the services made available to a given user can depend on the user's identity or the industrial enterprise with which the user is affiliated.

An API application 3012 serves a framework for managing access to the digital engineering services, allowing authenticated users to browse, select, and deploy virtual machine images 3002 as running virtual machines 3020, which can be used to remotely visualize and operate design software that the user is permitted to access and use. In this regard, each virtual machine image 3002 can be designed by its vendor to remotely execute an industrial design application or service offered by the vendor. These design applications and services can include, but are not limited to, control logic development software or platforms, HMI development software, industrial controller emulators, industrial asset or plant simulators, project analysis software, engineering drawing applications, or other such design applications.

Once a user has been authenticated by the system's authentication services 3018, the user can interact with the list of available services presented via the front-end interfaces to select one or more virtual machine images 3002 to be deployed and executed in the user's dedicated digital engineering space. The system 202 designates a remote digital engineering space to each participating customer entity, within which users affiliated with that customer entity can deploy and run virtual machines 3020 for the purposes of designing and testing their control system project and associated software (control programs, HMIs, digital twins, analytics, data collection, control simulations, etc.). When a user selects a virtual machine image 3002 from the image registry 3006, provisioning services 3008 (e.g., services implemented by one or more provisioning components 224) deploy an instance of the virtual machine image 3002 as an executable virtual machine 3020 within the user's designated digital engineering space. Once deployed, the user can remotely access the virtual machine 3020 via client device 1904 and use the digital engineering functionality supported by the selected virtual machine 3020. This can include, for example, creating and testing industrial control code or HMI applications using virtual machines 3020 that serve as development platforms, using a virtual machine 3020 to emulate execution of a control program uploaded to the digital engineering space by the user, building and running a digital twin of one or more industrial assets on a virtual machine 3020 that supports plant simulations (which may involve interfacing the digital twin with an emulated industrial control program executing on an emulation virtual machine 3020), testing industrial device configuration parameters, developing engineering drawings, or other such engineering functions. Some virtual machine images 3002 may be preconfigured with the design software those images are designed to support, such that the deployed virtual machines 3020 are preinstalled with the desired design software.

Secure remote access services 3014 can be used to connect the remote client devices 1904 to the provisioning services 3008 and the deployed virtual machines 3020. These remote access services 3014 can be realized using the secure remote access architecture discussed above in connection with FIG. 29 (e.g., server infrastructure 2904 and its associated servers), and can provide a secure connection between the remote client devices 1904 and the virtual machines 3020 hosted by the IDH repository system 202. In an example implementation, the virtual machines 3020 can be provisioned with runtime services similar to those that execute on the smart gateway devices 1202 that manage secure remote connections to physical assets on the plant floor. This allows the secure remote access server infrastructure 2904 to be used to create a similar secure remote connection to the virtual machines 3020 hosted on the customer's digital engineering space.

Figure 32:
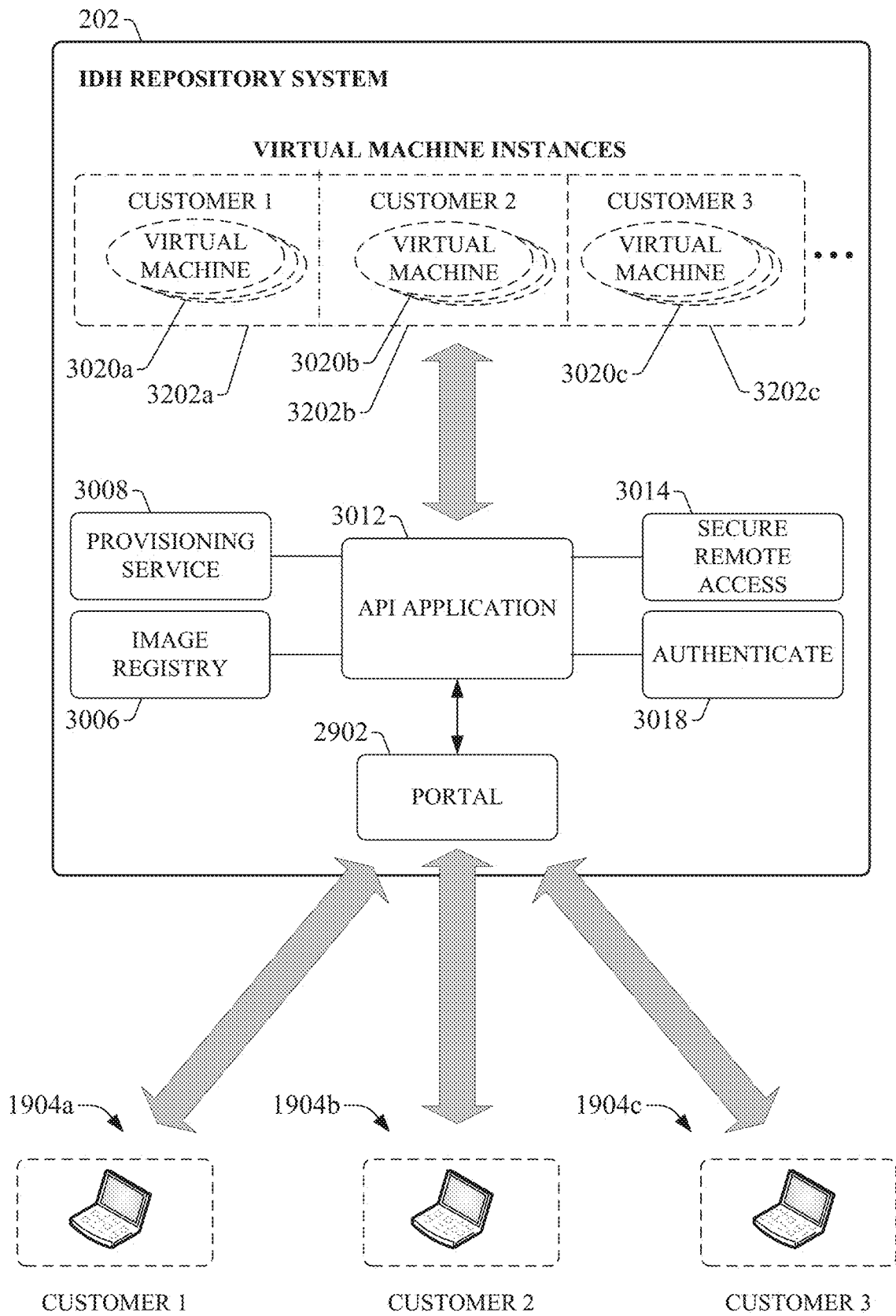
FIG. 32 is a diagram illustrating multi-tenant execution of virtual machines on an IDH repository system.

As noted above, customer entities that are registered to access and use the digital engineering services supported by the IDH repository system 202 can be assigned respective digital engineering spaces within the system's cloud architecture. FIG. 32 is a diagram illustrating multi-tenant execution of virtual machines 3020 on IDH repository system 202. Multiple customers can deploy, execute, and access their own set of virtual machines 3020 on respective segregated, customer-specific digital engineering spaces 3202 designated to the customers. These digital engineering spaces 3202 can be part of each customer repository 324. This architecture allows each customer to log into the system 202 and execute selected industrial design functions on demand within their own design space without the need to install and configure the desired design software on their own machine. The architecture allows the users to visualize and interact with these virtualized design functions remotely via their client devices 1904 using the secure remote access services 3014, perform desired engineering tasks, and de-commission the instantiated virtual machines 3020 upon completion.

When a user remotely requests provisioning of a virtual machine 3020 to their digital engineering space 3202, the provisioning service 3008 creates an instantiation of the virtual machine 3020 from the corresponding virtual machine image 3002 and tags the virtual machine 3020 with a tenant identifier that associates the virtual machine with the user's digital engineering space 3202. The provisioning service 3008 can also tag the virtual machine 3020 with a stock-keeping unit (SKU) associated with the customer entity (e.g., industrial enterprise) with which the user is affiliated, a version number of the associated SKU, and a user identity of the user. The virtual machine 3020 is also registered to the secure remote access architecture so that the user can securely connect to the virtual machine 3020 from their remote client device 1904. A domain for the virtual machine 3020 is then created within the digital engineering space 3202 if not already created, and the user requesting the virtual machine 3020 is added to the domain and granted domain administrative rights. The provisioning service 3008 then completes the registration process between the virtual machine's runtime services and the secure remote access services so that the user's client device 1904 can securely access and execute commands against the virtual machine 3020 and its pre-installed design software. The user can remotely start, stop, destroy, or re-image the virtual machine 3020 from remote client device 1904. In an example embodiment, the portal 2902 (implemented by the user interface component 204) can remotely visualize the digital engineering software or application executing on the virtual machine 3020 on the user's client device via the VPN connection established by the secure remote access architecture 3014. This connection allows the user to remotely utilize the engineering software from their client device 1904, offering a user experience similar to local execution of the engineering software on the client device 1904.

This approach allows users to instantiate a gallery of virtual machines 3020 that execute a variety of digital engineering functions and to remotely interface with these virtual machines 3020 to carry out remote digital engineering tasks, before de-commissioning the virtual machines 3020 upon completion of the tasks. Each virtual machine image 3002 represents a virtual machine class and instantiates a virtual machine 3020 that is already configured with the design software corresponding to the image's class. The system 202 also provides an ecosystem for software vendors to create and register virtual machine images 3002 of their content in the image registry 3006 so that their customers can use the system's provisioning services 3008 to deploy corresponding virtual machine instances from the registry 3006 and connect to these instances using the secure remote access architecture.

In some scenarios, a user may deploy and execute multiple virtual machines 3020 within their digital engineering space 3202 and configure two or more of these virtual machines 3020 to interact with one another to carry out a digital engineering task. For example, a first virtual machine 3020 provisioned with industrial simulation platform can be configured to interface with a second virtual machine 3020 provisioned with controller emulator. The user can configure these two virtual machines 3020 to exchange simulated I/O signaling to thereby simulate operation of a plant (using a digital twin of the plant) under the control of an industrial control program emulated by the controller emulator. The user can remotely control this simulation (results of which are rendered on the user's client device), modify the control program as needed until correct control operation is confirmed, then decommission the virtual machines 3020 upon completion of the control program testing.

For auditing purposes, IDH repository system 202 can also maintain a database 3016 (see FIG. 30) that records all transactions generated through the API application 3012. Information that can be logged in the database 3016 can include, for example, records of virtual machines 3020 that were instantiated; timestamps indicating times that the virtual machines 3020 were instantiated; identities of users who instantiated each virtual machine 3020; records of when each virtual machine 3020 was started, stopped, re-imaged, or destroyed; or other such information.

Figure 33:
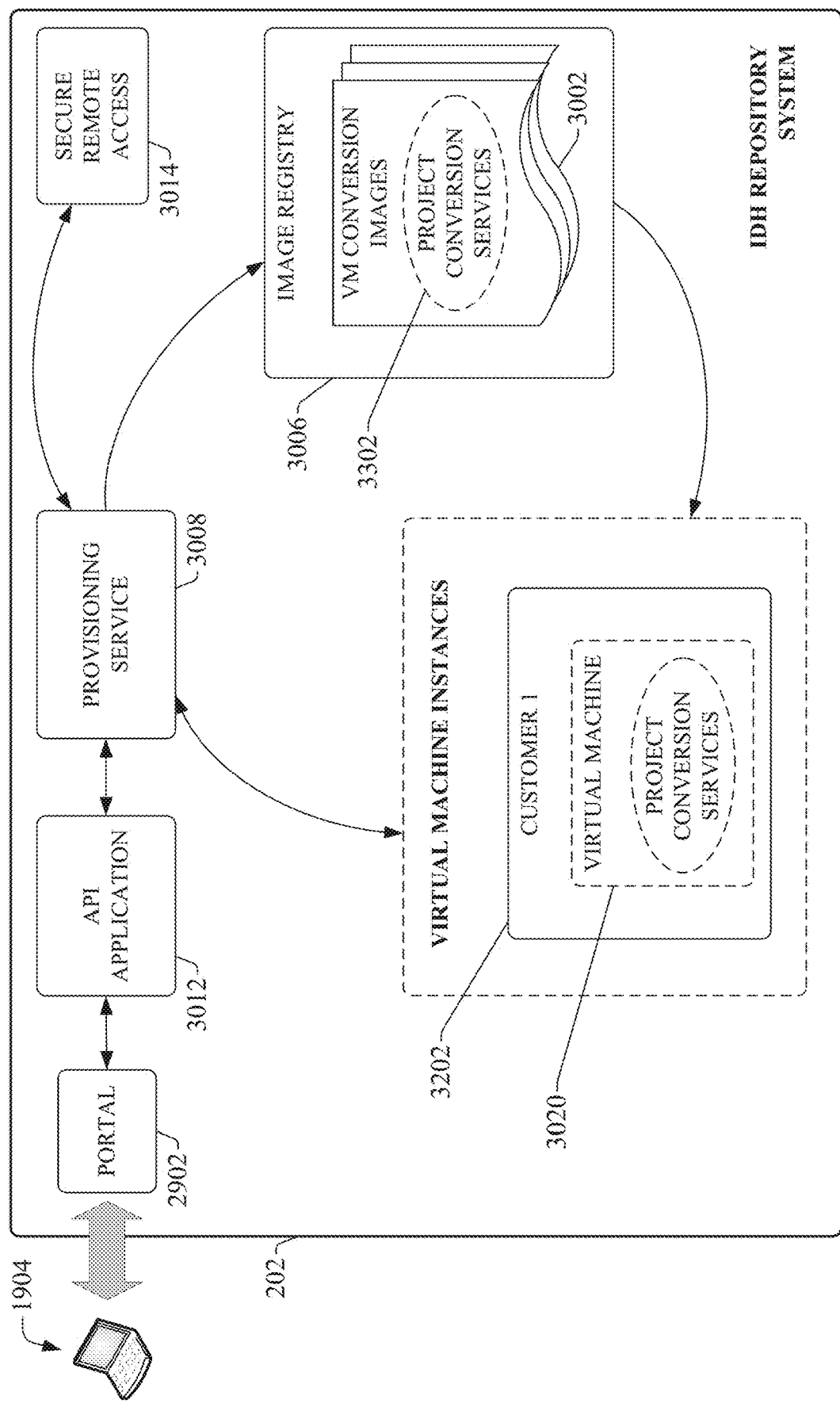

In some embodiments, some of the virtual machine images 3002 can be preconfigured with project conversion services 3302 designed to upgrade and convert control programming files from a first version to a second version. FIG. 33 is a diagram of an example embodiment of the IDH repository system 202 that can provision virtual machines 3020 having preinstalled project conversion services. Similar to the example scenarios described above in connection with FIGS. 30-32, a remote user of a client device 1904 can remotely access the system's provisioning service 3008 to selectively deploy and run virtual machines 3020 on their designated design space 3202 from virtual machine images 3002 stored on the image registry 3006. Included among the available virtual machine images 3002 are images that are preconfigured with project conversion services 3302 designed to upgrade or convert industrial control program files or other aspects of a control project 306 from a first version to a second version.

Figure 34:
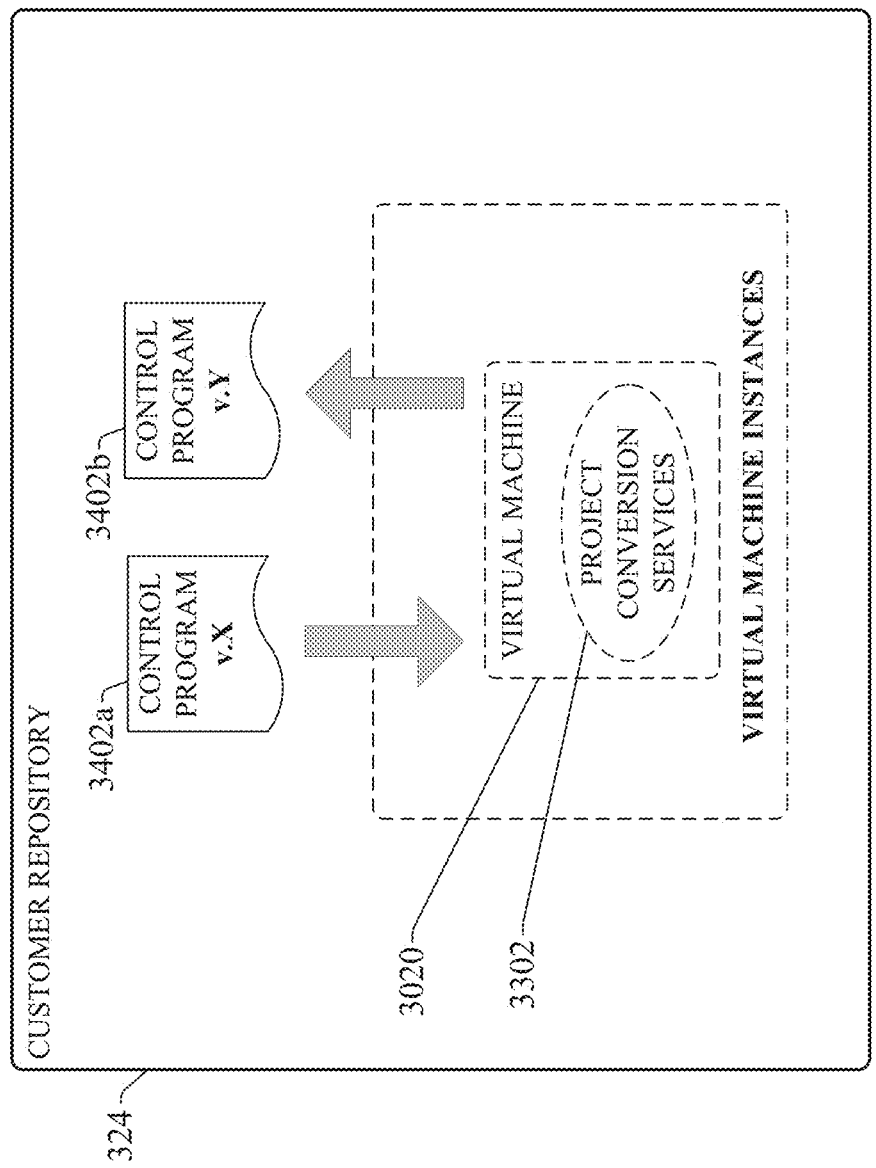
FIG. 34 is a diagram illustrating conversion of a control program file using a deployed virtual machine running project conversion services.

FIG. 34 is a diagram illustrating conversion of a control program file using a deployed virtual machine 3020 running project conversion services. In this example scenario, a user has instantiated a virtual machine 3020 with preconfigured project conversion services 3302 within the dedicated digital engineering space of their affiliated customer entity's customer repository 324. The user can deploy the virtual machine 3020 as an instance of a corresponding virtual machine image 3002 preconfigured with the conversion services 3302. Once instantiated, the virtual machine 3020 can apply its project conversion services 3302 to a control program file 3402a stored in the customer repository 324 (e.g., a ladder logic file or another type of control program file) to upgrade or convert the file from a first version (v.X) to a second version (v.Y), yielding a new, upgraded control program file 3402b. The resulting converted control program file 3402b can be stored on the user's customer repository 324, downloaded to the user's client device 1904, or deployed to a plant-floor controller for execution. The original program file 3402a can be saved on the customer repository as an archived project version 310.

In some embodiments, the project conversion services 3302 executed by the virtual machines 3020 can function in a manner similar to the project conversion functions of the asset recovery component 214 described above in connection with FIG. 11. Some project conversion services 3302 can also be configured to apply any of the project analytics discussed above (e.g., similar to those applied by the project analysis component 210) to the control program file 3402a and, upon completion of the conversion, provide the upgraded control program file 3402b together with recommendations (e.g., project recommendations 702 described above) for improving operation of the control program or optimizing resource utilization by the control program itself.

In some scenarios, as part of the conversion of control program file 3402a, the project conversion services 3302 can replace portions of the control program defined in the file 3402a with equivalent automation objects 504 to yield the upgraded program file 3402b Although FIG. 34 depicts the initial program file 3402a residing on the customer repository 324, users may also upload program files directly to the virtual machine 3020 for conversion by the conversion services 3302 in some scenarios. Also, some virtual machines 3020 can be configured with project conversion services 3302 that are designed to convert other aspects of a system project 306 other than control code, including but not limited to an HMI application, an industrial AR/VR visualization application, industrial device firmware, or other such control project aspects.

Figure 35:
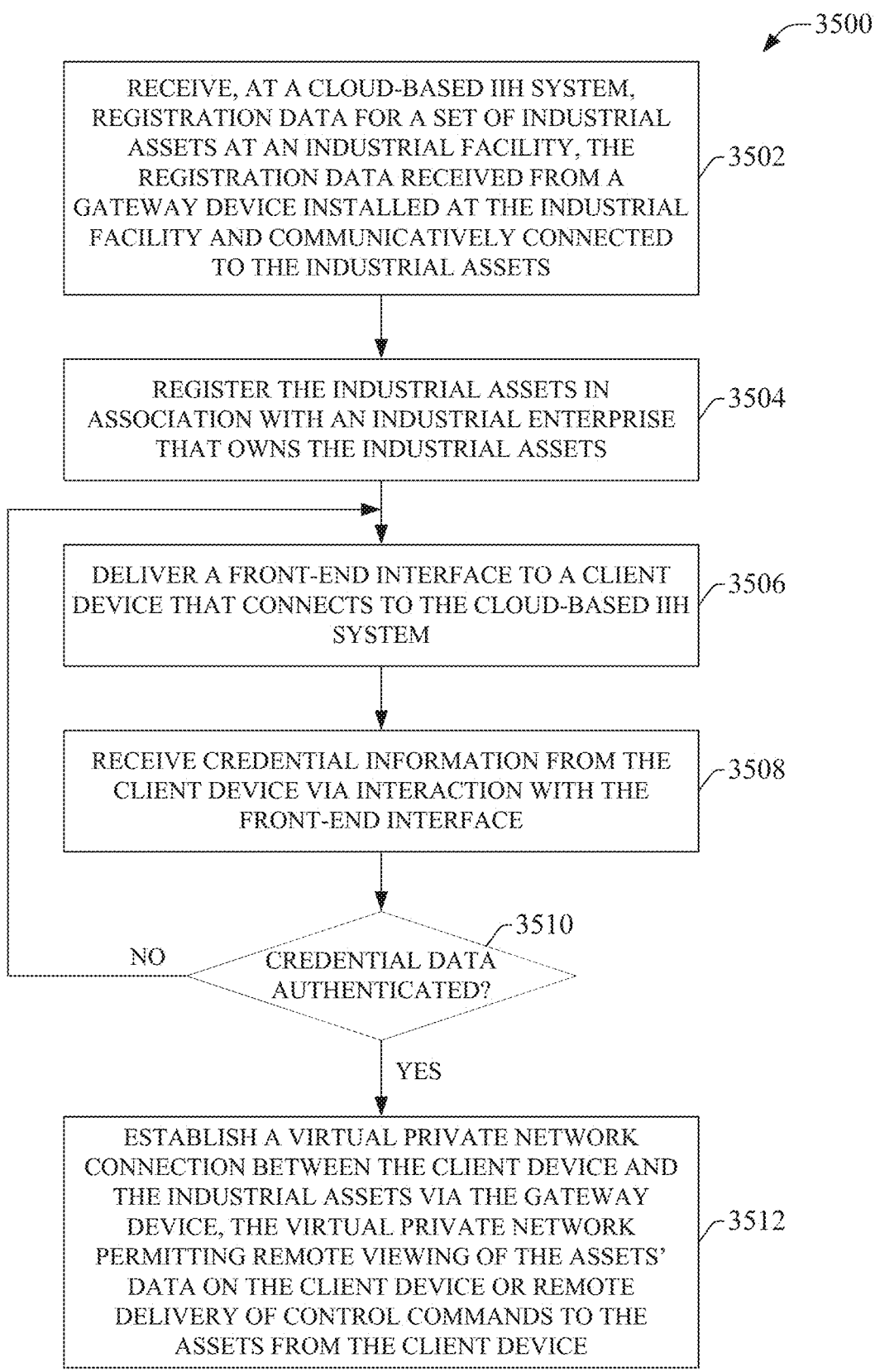
FIG. 35 is a flowchart of an example methodology for establishing secure remote access to data on industrial assets operating in a plant facility.
Figure 36A:
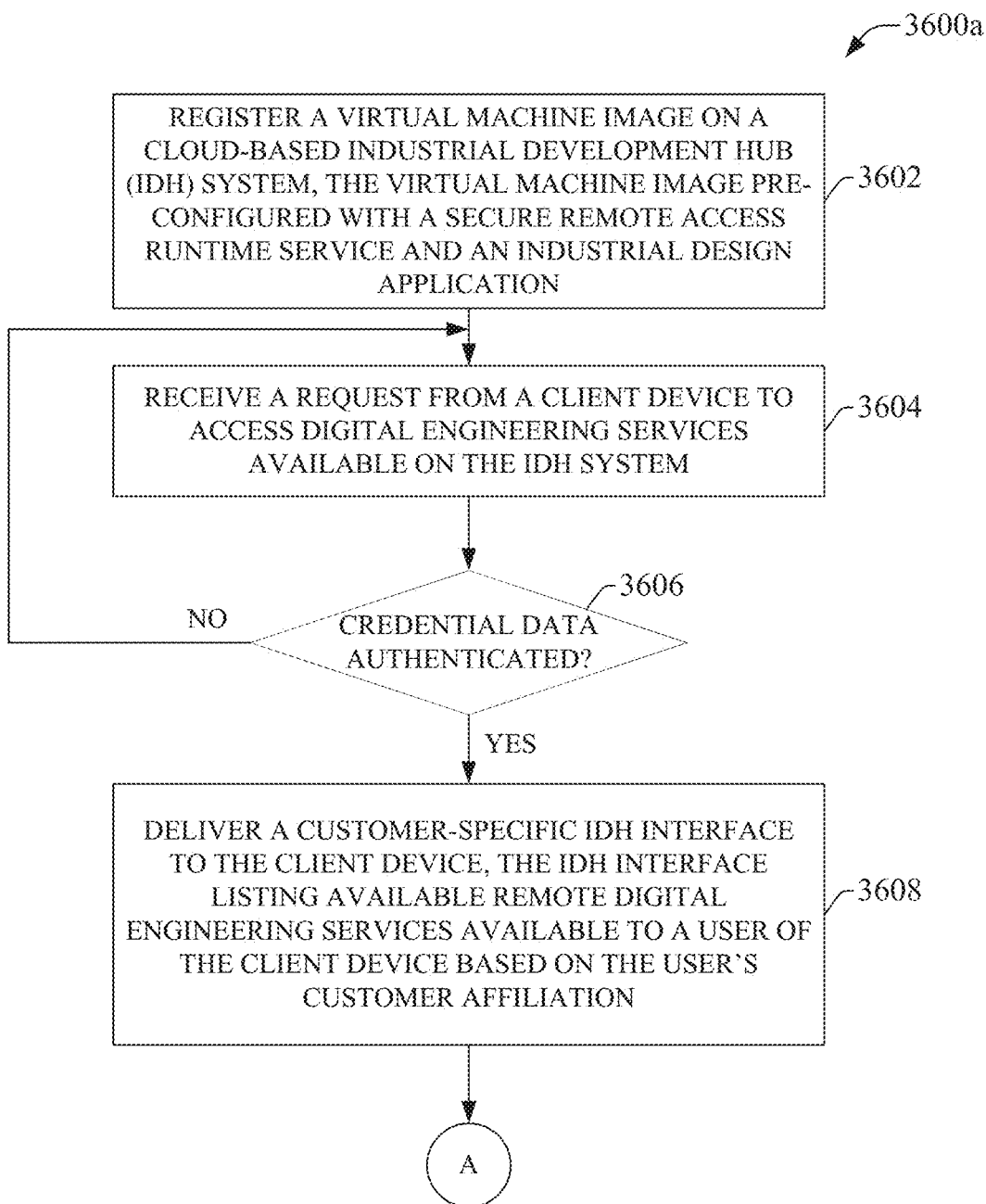
FIG. 36a is a flowchart of a first part of an example methodology for remotely deploying and securely accessing virtual machines that are preinstalled with digital design applications for designing and testing industrial projects.
Figure 36B:
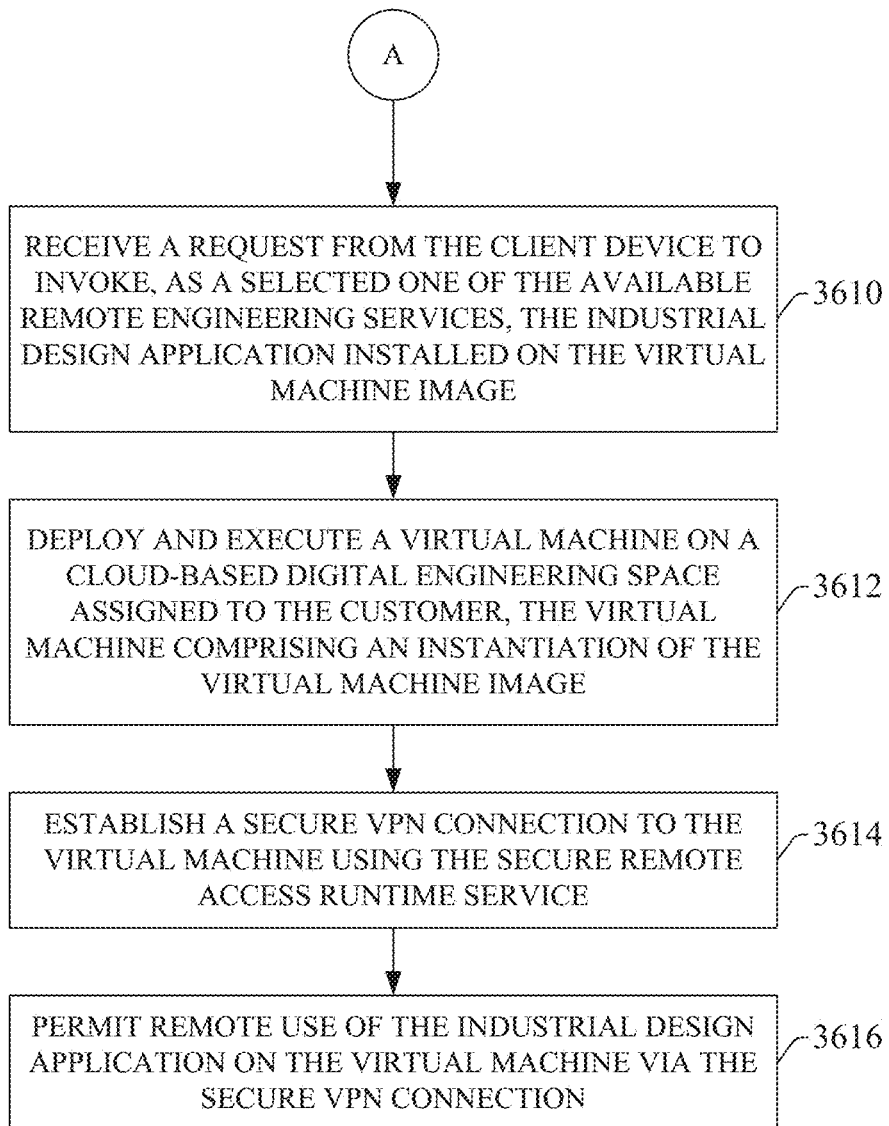
FIG. 36b is a flowchart of a second part of an example methodology for remotely deploying and securely accessing virtual machines that are preinstalled with digital design applications for designing and testing industrial projects.

FIGS. 35-36b illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 35 illustrates an example methodology 3500 for establishing secure remote access to data on industrial assets operating in a plant facility. Initially, at 3502, registration data for a set of industrial assets at an industrial facility is received at a cloud-based industrial information hub (IIH) system. The registration data is received from a gateway device installed at the industrial facility and communicatively connected to the industrial assets (e.g., over a plant network). At 3504, the industrial assets are registered with the IIH system in association with an industrial enterprise that owns the industrial assets.

At 3506, a front-end interface is delivered to a client device that connects to the cloud-based IIH system. The front-end interface can include prompts for identification or authentication data that will be used to determine the scope of secure remote access to be afforded to the user of the client device. At 3508, credential information is received from the client device via interaction with the front-end interface. The credential information can be, for example, a username and password, biometric information, output of a scanned optical code, or other such data. At 3510, a determination is made as to whether the credential data is authenticated. If the credential data is not authenticated (NO at step 3510), the methodology returns to step 3506. Alternatively, if the credential data is authenticated (YES at step 3510), the methodology proceeds to step 3512, where a virtual private network (VPN) connection is established between the client device and the industrial assets via the gateway device. The VPN connection permits remote viewing of data on the industrial assets (e.g., operational, status, or health data) and, in some cases, remote delivery of control commands to one or more of the assets form the client device. The VPN connection can be established based on interactions between the IIH system and a secure remote access runtime service that executes on the gateway device.

FIG. 36a illustrates a first part of an example methodology 3600a for remotely deploying and securely accessing virtual machines that are preinstalled with digital design applications for designing and testing industrial projects. Initially, at 3602, a virtual machine image is registered on a cloud-based industrial development hub (IDH) system. The virtual machine images can be registered by vendors who develop industrial digital engineering applications (e.g., an industrial control code development platform, an HMI development application, industrial device configuration software, an industrial controller emulator, an industrial simulation platform, etc.), and can be pre-configured with a secure remote access runtime service. Each virtual machine image can also be pre-configured with an industrial design application.

At 3604, a request is received from a client device to access digital engineering services available on the IDH system. The request can be received via interaction with a front-end interface served to the client device by the IDH system. At 3606, a determination is made as to whether credential information received from the client devices as part of the request is authenticated. If the credential data is not authenticated (NO at step 3606), the methodology returns to step 3604. Alternatively, if the credential data is authenticated (YES at step 3606), the methodology proceeds to step 3608, where a customer-specific IDH interface is delivered to the client device. The customer-specific IDH interface lists available remote digital engineering services available to the user of the client device based on the user's identity or customer affiliation.

The methodology proceeds to the second part 3600b illustrated in FIG. 36b. At 3610, a request is received from the client device to invoke, as a selected one of the available remote digital engineering services, the industrial design application installed on the virtual machine image. At 3612, in response to the request, a virtual machine is deployed and executed on a cloud-based digital engineering space assigned to the customer with which the user is affiliated. The virtual machine comprises an instantiation of the virtual machine image and is capable of executing the industrial design application installed on its parent virtual machine image.

At 3614, a secure VPN connection is established between the client device and the virtual machine using the secure remote access runtime service that executes on the virtual machine. At 3616, remote use of the industrial design application executing on the virtual machine is permitted via the secure VPN connection.

In some scenarios, the industrial design application that executes on the virtual machine can be a project conversion application designed to upgrade or convert a submitted industrial project file—e.g., a controller program file, an HMI application file, etc.—from a first version to a second version.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, Open Platform Communications Unified Architecture (OPC-UA), and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 37:
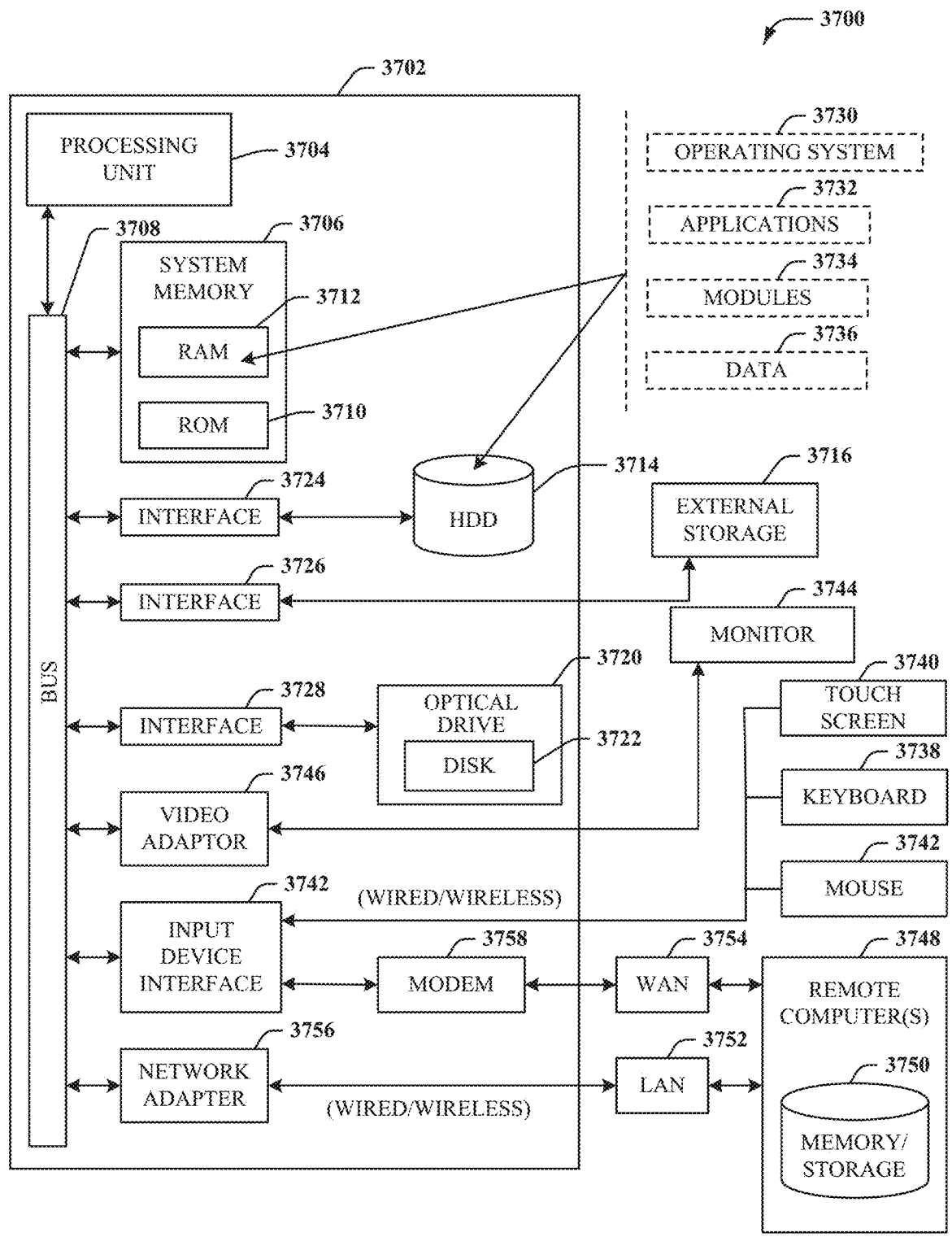
FIG. 37 is an example computing environment.
Figure 38:
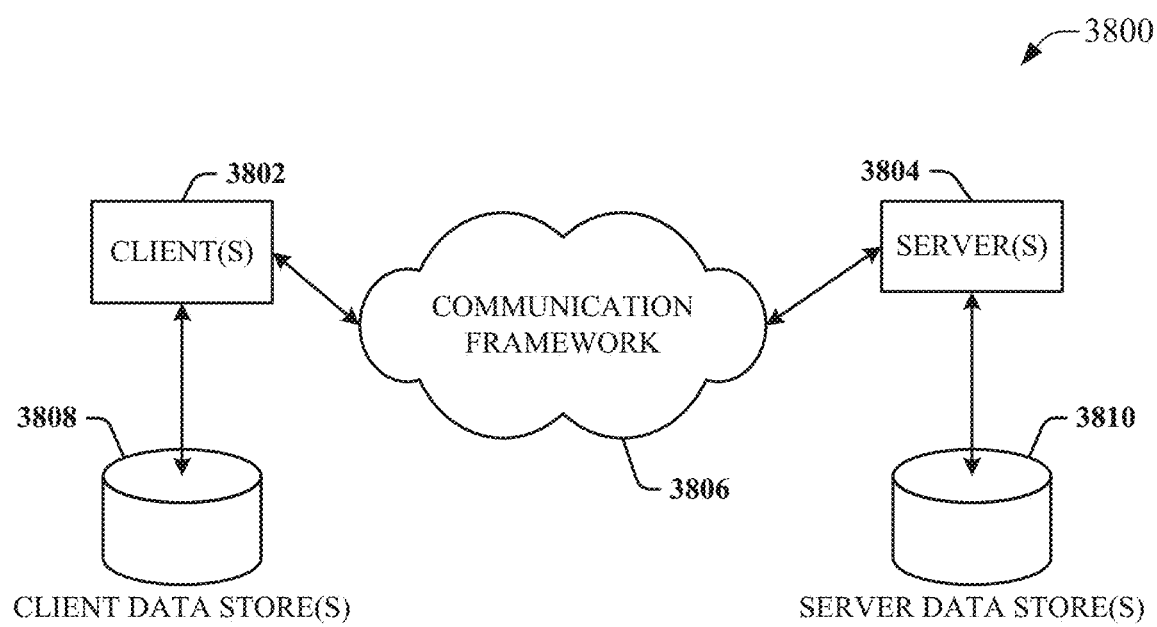
FIG. 38 is an example networking environment.

In order to provide a context for the various aspects of the disclosed subject matter, FIGS. 37 and 38 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 37, the example environment 3700 for implementing various embodiments of the aspects described herein includes a computer 3702, the computer 3702 including a processing unit 3704, a system memory 3706 and a system bus 3708. The system bus 3708 couples system components including, but not limited to, the system memory 3706 to the processing unit 3704. The processing unit 3704 can be any of various commercially available processors. Dual microprocessors and other multi-processor architectures can also be employed as the processing unit 3704.

The system bus 3708 can be any of several types of bus structure that can further interconnect to a memory bus (with or without a memory controller), a peripheral bus, and a local bus using any of a variety of commercially available bus architectures. The system memory 3706 includes ROM 3710 and RAM 3712. A basic input/output system (BIOS) can be stored in a non-volatile memory such as ROM, erasable programmable read only memory (EPROM), EEPROM, which BIOS contains the basic routines that help to transfer information between elements within the computer 3702, such as during startup. The RAM 3712 can also include a high-speed RAM such as static RAM for caching data.

The computer 3702 further includes an internal hard disk drive (HDD) 3714 (e.g., EIDE, SATA), one or more external storage devices 3716 (e.g., a magnetic floppy disk drive (FDD) 3716, a memory stick or flash drive reader, a memory card reader, etc.) and an optical disk drive 3720 (e.g., which can read or write from a CD-ROM disc, a DVD, a BD, etc.). While the internal HDD 3714 is illustrated as located within the computer 3702, the internal HDD 3714 can also be configured for external use in a suitable chassis (not shown). Additionally, while not shown in environment 3700, a solid state drive (SSD) could be used in addition to, or in place of, an HDD 3714. The HDD 3714, external storage device(s) 3716 and optical disk drive 3720 can be connected to the system bus 3708 by an HDD interface 3724, an external storage interface 3726 and an optical drive interface 3728, respectively. The interface 3724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 3702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 3712, including an operating system 3730, one or more application programs 3732, other program modules 3734 and program data 3736. All or portions of the operating system, applications, modules, and/or data can also be cached in the RAM 3712. The systems and methods described herein can be implemented utilizing various commercially available operating systems or combinations of operating systems.

Computer 3702 can optionally comprise emulation technologies. For example, a hypervisor (not shown) or other intermediary can emulate a hardware environment for operating system 3730, and the emulated hardware can optionally be different from the hardware illustrated in FIG. 37. In such an embodiment, operating system 3730 can comprise one virtual machine (VM) of multiple VMs hosted at computer 3702. Furthermore, operating system 3730 can provide runtime environments, such as the Java runtime environment or the .NET framework, for application programs 3732. Runtime environments are consistent execution environments that allow application programs 3732 to run on any operating system that includes the runtime environment. Similarly, operating system 3730 can support containers, and application programs 3732 can be in the form of containers, which are lightweight, standalone, executable packages of software that include, e.g., code, runtime, system tools, system libraries and settings for an application.

Further, computer 3702 can be enable with a security module, such as a trusted processing module (TPM). For instance with a TPM, boot components hash next in time boot components, and wait for a match of results to secured values, before loading a next boot component. This process can take place at any layer in the code execution stack of computer 3702, e.g., applied at the application execution level or at the operating system (OS) kernel level, thereby enabling security at any level of code execution.

A user can enter commands and information into the computer 3702 through one or more wired/wireless input devices, e.g., a keyboard 3738, a touch screen 3740, and a pointing device, such as a mouse 3742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 3704 through an input device interface 3744 that can be coupled to the system bus 3708, but can be connected by other interfaces, such as a parallel port, an IEEE 1394 serial port, a game port, a USB port, an IR interface, a BLUETOOTH® interface, etc.

A monitor 3744 or other type of display device can be also connected to the system bus 3708 via an interface, such as a video adapter 3746. In addition to the monitor 3744, a computer typically includes other peripheral output devices (not shown), such as speakers, printers, etc.

The computer 3702 can operate in a networked environment using logical connections via wired and/or wireless communications to one or more remote computers, such as a remote computer(s) 3748. The remote computer(s) 3748 can be a workstation, a server computer, a router, a personal computer, portable computer, microprocessor-based entertainment appliance, a peer device or other common network node, and typically includes many or all of the elements described relative to the computer 3702, although, for purposes of brevity, only a memory/storage device 3750 is illustrated. The logical connections depicted include wired/wireless connectivity to a local area network (LAN) 3752 and/or larger networks, e.g., a wide area network (WAN) 3754. Such LAN and WAN networking environments are commonplace in offices and companies, and facilitate enterprise-wide computer networks, such as intranets, all of which can connect to a global communications network, e.g., the Internet.

When used in a LAN networking environment, the computer 3702 can be connected to the local network 3752 through a wired and/or wireless communication network interface or adapter 3756. The adapter 3756 can facilitate wired or wireless communication to the LAN 3752, which can also include a wireless access point (AP) disposed thereon for communicating with the adapter 3756 in a wireless mode.

When used in a WAN networking environment, the computer 3702 can include a modem 3758 or can be connected to a communications server on the WAN 3754 via other means for establishing communications over the WAN 3754, such as by way of the Internet. The modem 3758, which can be internal or external and a wired or wireless device, can be connected to the system bus 3708 via the input device interface 3742. In a networked environment, program modules depicted relative to the computer 3702 or portions thereof, can be stored in the remote memory/storage device 3750. It will be appreciated that the network connections shown are example and other means of establishing a communications link between the computers can be used.

When used in either a LAN or WAN networking environment, the computer 3702 can access cloud storage systems or other network-based storage systems in addition to, or in place of, external storage devices 3716 as described above. Generally, a connection between the computer 3702 and a cloud storage system can be established over a LAN 3752 or WAN 3754 e.g., by the adapter 3756 or modem 3758, respectively. Upon connecting the computer 3702 to an associated cloud storage system, the external storage interface 3726 can, with the aid of the adapter 3756 and/or modem 3758, manage storage provided by the cloud storage system as it would other types of external storage. For instance, the external storage interface 3726 can be configured to provide access to cloud storage sources as if those sources were physically connected to the computer 3702.

The computer 3702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 38 is a schematic block diagram of a sample computing environment 3800 with which the disclosed subject matter can interact. The sample computing environment 3800 includes one or more client(s) 3802. The client(s) 3802 can be hardware and/or software (e.g., threads, processes, computing devices). The sample computing environment 3800 also includes one or more server(s) 3804. The server(s) 3804 can also be hardware and/or software (e.g., threads, processes, computing devices). The servers 3804 can house threads to perform transformations by employing one or more embodiments as described herein, for example. One possible communication between a client 3802 and servers 3804 can be in the form of a data packet adapted to be transmitted between two or more computer processes. The sample computing environment 3800 includes a communication framework 3806 that can be employed to facilitate communications between the client(s) 3802 and the server(s) 3804. The client(s) 3802 are operably connected to one or more client data store(s) 3808 that can be employed to store information local to the client(s) 3802. Similarly, the server(s) 3804 are operably connected to one or more server data store(s) 3810 that can be employed to store information local to the servers 3804.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for provisioning industrial project conversion services, comprising:
   a memory that stores executable components; and
   a processor, operatively coupled to the memory, that executes the executable components, the executable components comprising:
      an image registry configured to store, on a cloud platform, virtual machine images; and
      a provisioning component configured to instantiate a virtual machine image, selected from the multiple virtual machine images, on which a project conversion service is installed to yield a virtual machine that executes the project conversion service on the cloud platform,
   wherein
      the project conversion service is configured to perform a conversion of an industrial control project from a first version to a second version,
      the industrial control project comprises at least an industrial controller program file,
      the project conversion service is configured to, as part of the conversion, replace a portion of industrial control code defined in the industrial controller program file with an automation object, and
      the automation object represents an industrial asset and has associated therewith at least one of an input, an output, an analytic routine, an alarm, a security feature, or a graphical representation of the industrial asset.

2. The system of claim 1, wherein the industrial control project further comprises at least one of a human-machine interface application file, an industrial augmented reality application, an industrial virtual reality application, or industrial device firmware.

3. The system of claim 1, wherein
   the executable components further comprise a user interface component configured to receive, from a client device via the cloud platform, a request to utilize the project conversion service, and the provisioning component is configured to instantiate the virtual machine image in response to receipt of the request.

4. The system of claim 3, wherein
the project conversion service is further configured to perform an analysis of the industrial control project as part of the conversion, and
the user interface component is further configured to render, on the client device, a recommendation for improving operation of the industrial control project based on a result of the analysis.

5. The system of claim 4, wherein the recommendation comprises at least one of an indication that the industrial control project will cause an industrial device to operate near or above their rated operating thresholds, a recommendation to replace an industrial device referenced in the industrial control project with another industrial device having a higher I/O capacity, a recommendation to utilize an unused feature of an industrial device referenced in the industrial control project, an estimation of a life cycle of an industrial device controlled by the industrial control project, or a recommendation of a modification to the industrial control project that will increase the life cycle of the industrial device.

6. The system of claim 3, wherein the project conversion service is configured to store the first version of the industrial control project and the second version of the industrial control project in a customer repository of the cloud platform designated to a customer affiliation of a user of the client device.

7. The system of claim 3, wherein
the system maintains segregated digital engineering spaces on the cloud platform designated to respective different customer affiliations, and
the provisioning component is configured to deploy and execute the virtual machine on a digital engineering space, of the digital engineering spaces, corresponding to a customer affiliation of a user of the client device.

8. The system of claim 7, wherein the provisioning component is configured to tag the virtual machine with at least one of a tenant identifier that associates the virtual machine with the digital engineering space, a stock-keeping unit associated with the customer affiliation, a version number, or a user identifier of the user.

9. A method, comprising:
storing, by a system comprising a processor, virtual machine images on a cloud platform;
instantiating, by the system, a virtual machine image, selected from the multiple virtual machine images, on which a project conversion service is installed to yield a virtual machine that executes the project conversion service on the cloud platform; and
converting, by the system using the project conversion service, an industrial control project from a first version to a second version, wherein
the industrial control project comprises at least an industrial control code file,
the converting comprises at least replacing a portion of industrial control code defined in the industrial control code file with an automation object, and
the automation object represents an industrial asset and has associated therewith at least one of an input, an output, an analytic routine, an alarm, a security feature, or a graphical representation of the industrial asset.

10. The method of claim 9, wherein the industrial control project further comprises at least one of a human-machine interface application file, an industrial augmented reality application, an industrial virtual reality application, or industrial device firmware.

11. The method of claim 9, wherein the instantiating comprises instantiating the virtual machine image in response to receipt, from a client device via the cloud platform, of a request to utilize the project conversion service.

12. The method of claim 11, wherein
the converting comprises performing an analysis of the industrial control project, and
the method further comprises rendering, by the system, a recommendation on the client device for improving operation of the industrial control project based on a result of the analysis.

13. The method of claim 12, wherein the recommendation comprises at least one of an indication that the industrial control project will cause an industrial device to operate near or above their rated operating thresholds, a recommendation to replace an industrial device referenced in the industrial control project with another industrial device having a higher I/O capacity, a recommendation to utilize an unused feature of an industrial device referenced in the industrial control project, an estimation of a life cycle of an industrial device controlled by the industrial control project, or a recommendation of a modification to the industrial control project that will increase the life cycle of the industrial device.

14. The method of claim 11, further comprising storing, by the system the first version of the industrial control project and the second version of the industrial control project in a customer repository of the cloud platform designated to a customer affiliation of a user of the client device.

15. The method of claim 11, further comprising
defining, by the system, segregated digital engineering spaces on the cloud platform; and
assigning, by the system, the digital engineering spaces to respective different customer affiliations,
wherein the instantiating comprises deploying and executing the virtual machine on a digital engineering space, of the digital engineering spaces, corresponding to a customer affiliation of a user of the client device.

16. The method of claim 15, wherein the instantiating further comprises tagging, by the system, the virtual machine with at least one of a tenant identifier that associates the virtual machine with the digital engineering space, a stock-keeping unit associated with the customer affiliation, a version number, or a user identifier of the user.

17. A non-transitory computer-readable medium having stored thereon instructions that, in response to execution, cause a system executing on a cloud platform and comprising a processor to perform operations, the operations comprising
storing virtual machine images on a cloud platform;
instantiating, on the cloud platform, a virtual machine image, selected from the multiple virtual machine images, on which a project conversion service is installed, yielding a virtual machine that executes the project conversion service on the cloud platform; and
converting, using the project conversion service, an industrial control project from a first version to a second version, wherein
the industrial control project comprises at least an industrial control code file, the converting comprises at least replacing a portion of industrial control code defined in the industrial control code file with an automation object, and the automation object represents an industrial asset and has associated therewith at least one of an input, an output, an analytic routine, an alarm, a security feature, or a graphical representation of the industrial asset.

18. The non-transitory computer-readable medium of claim 17, wherein the industrial control project further comprises at least one of a human-machine interface application file, an industrial augmented reality application, an industrial virtual reality application, or industrial device firmware.

19. The non-transitory computer-readable medium of claim 17, wherein the instantiating comprises instantiating the virtual machine image in response to receipt, from a client device via the cloud platform, of a request to utilize the project conversion service.

20. The non-transitory computer-readable medium of claim 19, wherein the converting comprises performing an analysis of the industrial control project, and the operations further comprise rendering a recommendation on the client device for improving operation of the industrial control project based on a result of the analysis.

* * * * *